United States Patent
Ikebuchi

(10) Patent No.: US 10,267,620 B2
(45) Date of Patent: Apr. 23, 2019

(54) OPTICAL THREE-DIMENSIONAL COORDINATE MEASURING DEVICE AND MEASUREMENT METHOD THEREOF

(71) Applicant: Keyence Corporation, Osaka (JP)

(72) Inventor: Masayasu Ikebuchi, Osaka (JP)

(73) Assignee: Keyence Corporation, Osaka (JP)

( * ) Notice: Subject to any disclaimer, the term of this patent is extended or adjusted under 35 U.S.C. 154(b) by 79 days.

(21) Appl. No.: 15/480,433

(22) Filed: Apr. 6, 2017

(65) Prior Publication Data

US 2017/0314910 A1    Nov. 2, 2017

(30) Foreign Application Priority Data

Apr. 27, 2016  (JP) ................. 2016-089951

(51) Int. Cl.
  *G06T 7/73* (2017.01)
  *G01B 11/00* (2006.01)
  *G06T 7/00* (2017.01)
  *G06T 7/60* (2017.01)

(52) U.S. Cl.
  CPC .......... *G01B 11/005* (2013.01); *G06T 7/0004* (2013.01); *G06T 7/60* (2013.01); *G06T 7/73* (2017.01); *G06T 2207/30164* (2013.01); *G06T 2207/30204* (2013.01)

(58) Field of Classification Search
  CPC .......... G06T 7/73; G06T 7/60; G06T 7/0004; G06T 2207/30204; G06T 2207/30164; G01B 11/005
  USPC ......................................................... 348/135
  See application file for complete search history.

(56) References Cited

U.S. PATENT DOCUMENTS

| | | | |
|---|---|---|---|
| 5,440,392 A | 8/1995 | Pettersen et al. | |
| 5,805,287 A | 9/1998 | Pettersen et al. | |
| 6,166,809 A | 12/2000 | Pettersen et al. | |
| 2003/0063292 A1* | 4/2003 | Mostafavi | A61B 6/463 356/614 |
| 2008/0177417 A1* | 7/2008 | Kasuga | G05B 19/41805 700/213 |
| 2013/0027546 A1* | 1/2013 | Hayashi | 348/135 |
| 2015/0276377 A1 | 10/2015 | Ikebuchi | |
| 2015/0276389 A1 | 10/2015 | Osaki et al. | |

(Continued)

FOREIGN PATENT DOCUMENTS

JP    2015-206644    11/2015

*Primary Examiner* — Tung T Vo
(74) *Attorney, Agent, or Firm* — Kilyk & Bowersox, P.L.L.C.

(57) ABSTRACT

An optical three-dimensional coordinate measuring device of the present invention ensures both the measurement range and the measurement accuracy. The optical three-dimensional coordinate measuring device includes an imaging device, a table that is displaceable from an original position, a probe for designating a measurement position of a measurement object, a probe marker that is disposed on the probe, and a stage marker that is disposed on the table. The position and the attitude of the probe with respect to the imaging device are identified on the basis of the probe marker included in a captured image. The position and the attitude of the table with respect to the imaging device are identified on the basis of the stage marker included in a captured image. Relative position coordinates of a measurement position designated by the probe are obtained.

10 Claims, 54 Drawing Sheets

(56) References Cited

U.S. PATENT DOCUMENTS

2015/0300808 A1   10/2015  Osaki et al.
2015/0345932 A1   12/2015  Wakai
2016/0223316 A1*  8/2016  Jordil .................. G01B 11/005
2017/0314911 A1   11/2017  Futami

* cited by examiner

OPTICAL THREE-DIMENSIONAL COORDINATE MEASURING DEVICE AND MEASUREMENT METHOD THEREOF

CROSS-REFERENCE TO RELATED APPLICATIONS

The present application claims foreign priority based on Japanese Patent Application No. 2016-089951, filed Apr. 27, 2016, the contents of which is incorporated herein by reference.

BACKGROUND OF THE INVENTION

1. Field of the Invention

The present invention relates to an optical three-dimensional coordinate measuring device and a measurement method thereof.

2. Description of Related Art

There is known a three-dimensional coordinate measuring device which detects three-dimensional coordinates of an outer contour of an object (workpiece). Mechanical three-dimensional coordinate measuring devices such as a portal type three-dimensional coordinate measuring device which has a rigid frame structure and an arm type three-dimensional coordinate measuring device which is provided with a probe on the tip of a multi-articulated arm have become widespread. For example, the portal type three-dimensional coordinate measuring device is manufactured on the basis of a design idea that enables coordinate detection with high accuracy in view of hardware. Thus, the portal type three-dimensional coordinate measuring device is typically installed inside a thermostatic chamber to be used, and expertise is required for the operation of the device.

When the three-dimensional coordinate measuring device is applied to quality control for industrial products, there is a request to measure finished products at a manufacturing site. In order to accept the request, the applicant of the present application has proposed an optical three-dimensional coordinate measuring device in JP 2015-206644 A.

The optical three-dimensional coordinate measuring device of JP 2015-206644 A includes a camera, a probe which is held and operated by an operator with his/her hand for designating a measurement position, and a table on which a workpiece is fixed. The probe is provided with a marker. The optical three-dimensional coordinate measuring device acquires an image by capturing an image of the marker installed in the probe using the camera. Then, coordinates of a measurement point of the workpiece can be obtained by image processing.

According to the optical three-dimensional coordinate measuring device, a predetermined measurement accuracy can be ensured when the relative relationship, that is, the optical relationship between the probe and the camera is fixed only at the instant of timing of capturing an image by the camera. Thus, since the measurement accuracy can be ensured without depending on hardware, the optical three-dimensional coordinate measuring device is manufactured in a small size. Thus, the optical three-dimensional coordinate measuring device can be installed in any place of a manufacturing site where desired products are manufactured.

Further, measurement data (measurement coordinates) can be acquired by calculation including image processing. Thus, it is possible to provide convenience such that even a worker at the manufacturing site can easily operate the optical three-dimensional coordinate measuring device by improving a graphical user interface (GUI).

The optical three-dimensional coordinate measuring device disclosed in JP 2015-206644 A has an advantage that a site worker can perform control over whether a finished product has been completed as designed at the manufacturing site.

If the optical three-dimensional coordinate measuring device disclosed in JP 2015-206644 A is applied to measurement of a large workpiece, it is necessary to design the optical three-dimensional coordinate measuring device so as to have a wide measurement range. However, there is a problem in expanding the measurement range such that it is difficult to maintain the measurement accuracy when expanding the measurement range. However, a certain degree of measurement accuracy is required to perform control over whether a finished product has been completed as designed.

SUMMARY OF THE INVENTION

It is an object of the present invention to provide an optical three-dimensional coordinate measuring device that enables both the measurement range and the measurement accuracy to be ensured and a measurement method thereof.

According to one embodiment of the invention, an optical three-dimensional coordinate measuring device includes: a fixed imaging device; a table for placing a measurement object thereon, the table being displaceable from an original position; a probe for designating a measurement position of a measurement object on the table; a probe marker disposed on the probe, an image of the probe marker being capturable by the imaging device; a stage marker disposed on the table, an image of the stage marker being capturable by the imaging device; a probe identifying unit that identifies a position and an attitude of the probe with respect to the imaging device on the basis of the probe marker included in a first captured image of the imaging device; a table identifying unit that identifies a position and an attitude of the table with respect to the imaging device on the basis of the stage marker included in a second captured image of the imaging device; and a calculation unit that obtains relative position coordinates of a measurement position designated by the probe with respect to the table on the basis of the position and the attitude of the probe and a current position and a current attitude of the table with respect to the imaging device.

That is, when the table is viewed from the fixed main imaging device, displacement of the table can be understood from a captured image. On the other hand, even when the table is displaced, the relationship between the table and the measurement object placed on the table is unchanged. Thus, even when the table is displaced from the original position, relative measurement coordinates with respect to the table are unchanged. The present invention provides the optical three-dimensional coordinate measuring device based on this principle.

According to one embodiment of the invention, a measurement method of an optical three-dimensional coordinate measuring device, the optical three-dimensional coordinate measuring device including: an imaging device; a stage base whose relative positional relationship with the imaging device is fixed; a table for placing a measurement object thereon, the table being displaceable with respect to the stage base; a probe for designating a measurement position of a measurement object on the table; a probe marker disposed on the probe, an image of the probe marker being capturable by the imaging device; a stage marker disposed on the table, an image of the stage marker being capturable by the imaging device, includes: a first calculation step of obtaining first relative position coordinates of a measurement position designated by the probe with respect to the table when the table is at a first position and attitude; a second calculation step of obtaining second relative position coordinates of a measurement position designated by the probe with respect to the table when the table is at a second position and attitude displaced from the first position and attitude; and a measurement step of measuring, on the basis of the first relative position coordinates, a previously set first geometrical element defined on the basis of the first relative position coordinates, the second relative position coordinates, and a previously set second geometrical element defined on the basis of the second relative position coordinates, relative positions of the first geometrical element and the second geometrical element.

Effects and other objects of the invention will become apparent from the following detailed description of a preferred embodiment of the invention.

BRIEF DESCRIPTION OF THE DRAWINGS

FIGS. 37(A) and 37(B) are diagrams for describing a state of the lock pin when the operation lever is located at an unlocking position, in which FIG. 37(A) is a plan view of the lock pin and FIG. 37(B) is a sectional view of the lock pin;

FIGS. 38(A) and 38(B) are diagrams for describing a state of the lock pin immediately after the operation lever is positioned at a locking position, in which FIG. 38(A) is a plan view of the lock pin and FIG. 38(B) is a sectional view of the lock pin;

FIGS. 39(A) and 39(B) are diagrams for describing a state in which the operation lever is positioned at the locking position and the table remains fixed by the lock pin, in which FIG. 39(A) is a plan view of the lock pin and FIG. 39(B) is a sectional view of the lock pin;

FIGS. 40A and 40B are diagrams for describing a step of, when the distance between one end face and the other end face of a workpiece is measured, obtaining a first measurement plane which indicates the one end face, in which FIG. 40A is a diagram illustrating a step of bringing a contactor of the probe into contact with the one end face and FIG. 40B is a diagram for describing bringing the contactor into contact with four points on the one end face;

FIGS. 41A and 41B are diagrams for describing a step of, when the distance between the one end face and the other end face of the workpiece is measured, obtaining a second measurement plane which indicates the other end face, in which FIG. 41A is a diagram illustrating a step of bringing the contactor of the probe into contact with the other end face and FIG. 41B is a diagram for describing bringing the contactor into contact with four points on the other end face;

DETAILED DESCRIPTION OF PREFERRED EMBODIMENT

Embodiment

Hereinbelow, a preferred embodiment of the present invention will be described with reference to the accompanying drawings.

Figure 1:
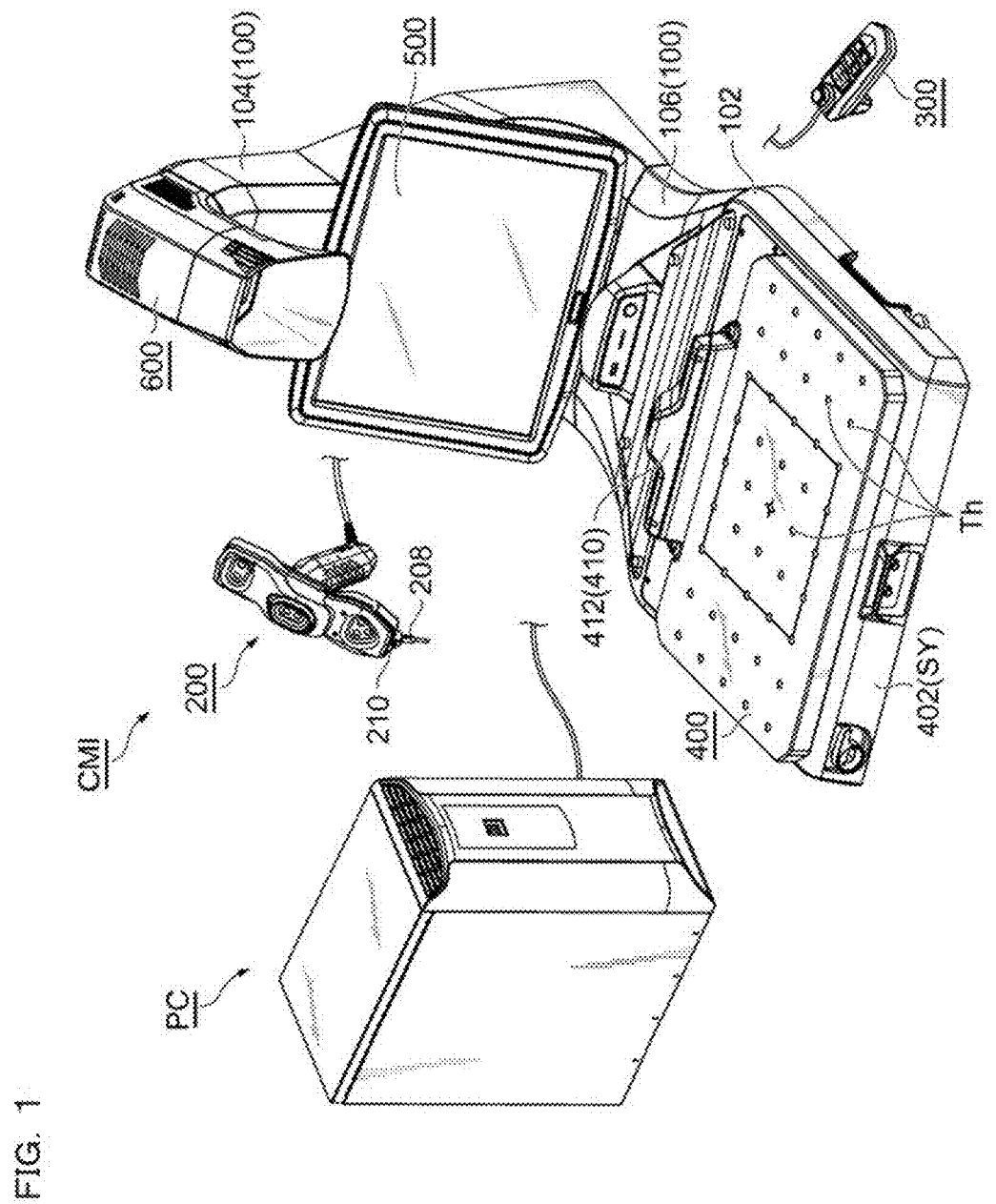
FIG. 1 is a perspective view of a system which includes an optical three-dimensional coordinate measuring device of an embodiment.

Entire Configuration of System:

FIGS. 1 to 17 are diagrams for describing the entire outline of a measuring system. FIG. 1 is a perspective view of the three-dimensional coordinate measuring system which includes an optical three-dimensional measuring device CMI of an embodiment. The optical three-dimensional coordinate measuring device CMI is designed so as to be operable even by a worker in a manufacturing site. Referring to FIG. 1, the optical three-dimensional coordinate measuring device CMI includes a main body 100, a probe 200, and a main body operation unit 300. The probe 200 and the main body operation unit 300 are connected to the main body 100 by wire or wirelessly. The probe 200 is operated by an operator to designate a measurement position. The optical three-dimensional coordinate measuring device CMI is connected to a personal computer PC to be used. A printer may be connected to the personal computer PC so that a measurement result can be printed out.

Figure 2:
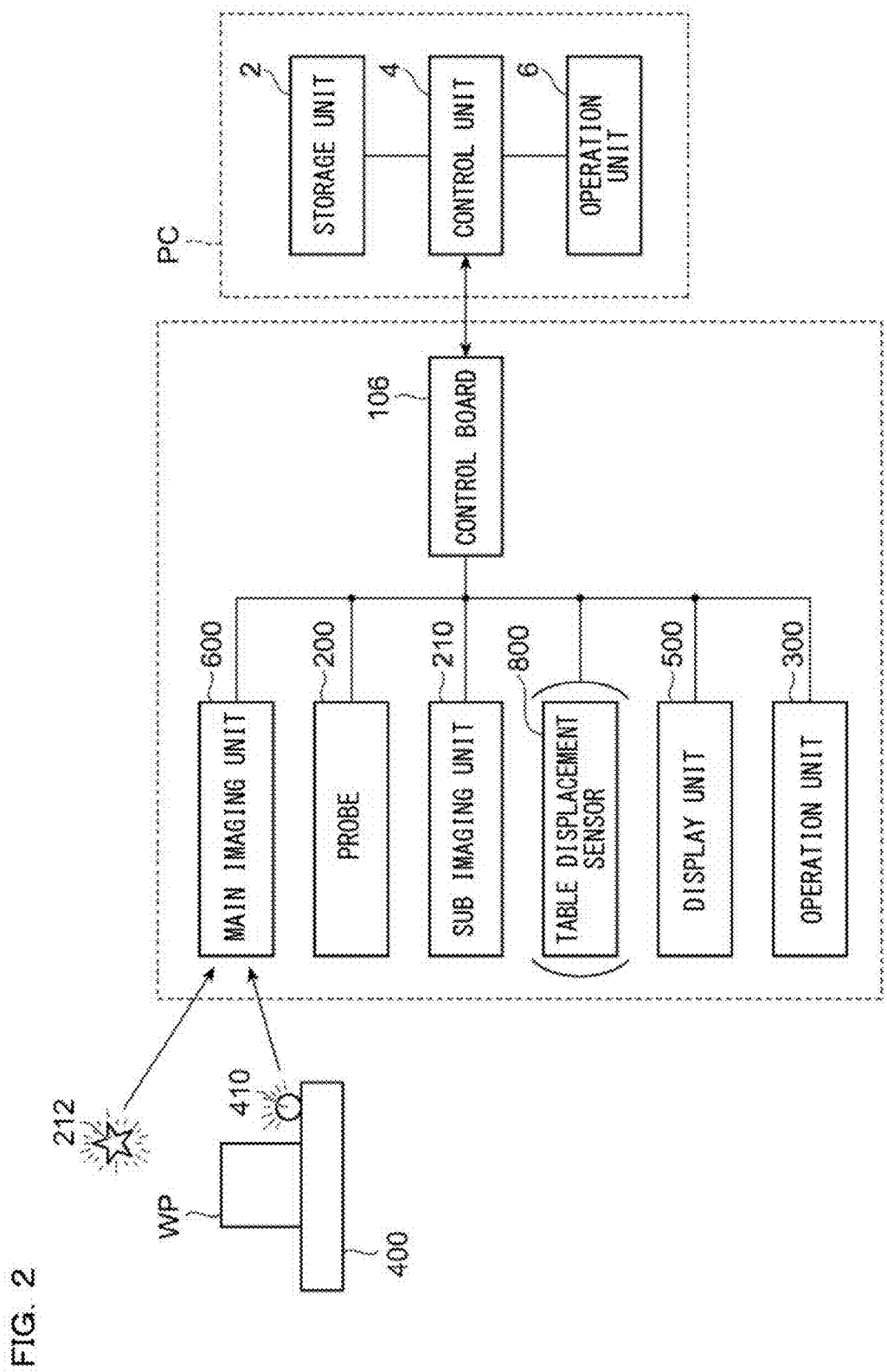
FIG. 2 is a functional block diagram of the three-dimensional coordinate measuring system which includes a personal computer and the optical three-dimensional coordinate measuring device.

FIG. 2 illustrates the entire configuration of the three-dimensional coordinate measuring system which includes the personal computer PC and the optical three-dimensional coordinate measuring device CMI. Referring to FIG. 2, as is well known, the personal computer PC is provided with a storage unit 2, a control unit (CPU) 4, and an operation unit 6 such as a keyboard and a mouse.

Referring back to FIG. 1, the main body 100 includes a horizontal part 102 and a standing part 104 which stands from one end of the horizontal part 102. A rectangular table 400 is displaceably mounted on the other end of the horizontal part 102. Further, a display unit 500 is disposed in a tilted state in a connected part between the horizontal part 102 and the standing part 104. The display unit 500 displays information relating to three-dimensional coordinate measurement of a measurement object.

Although not illustrated in FIG. 1 due to drawing reasons, a control board (106 of FIGS. 2 and 9) is incorporated in the horizontal part 102 at a position near the standing part 104, that is, between the table 400 and the standing part 104. An analog/digital converter (A/D converter) and a first in, first out (FIFO) memory (both not illustrated) are mounted on the control board 106.

Main Imaging Unit (Fixed Camera):

A main imaging unit 600 is disposed on the upper end of the standing part 104. Although the main imaging unit 600 may be integrated with the standing part 104, the main imaging unit 600 is preferably detachably attached to the standing part 104. The detachable structure of the main imaging unit 600 enables the main imaging unit 600 to be conveyed in a detached state. Thus, it is not necessary to convey the entire optical three-dimensional coordinate measuring device CMI for the calibration of the main imaging unit 600. The main imaging unit 600 is preferably equipped with a memory (not illustrated). Calibration data can be stored in the memory.

Figure 3:
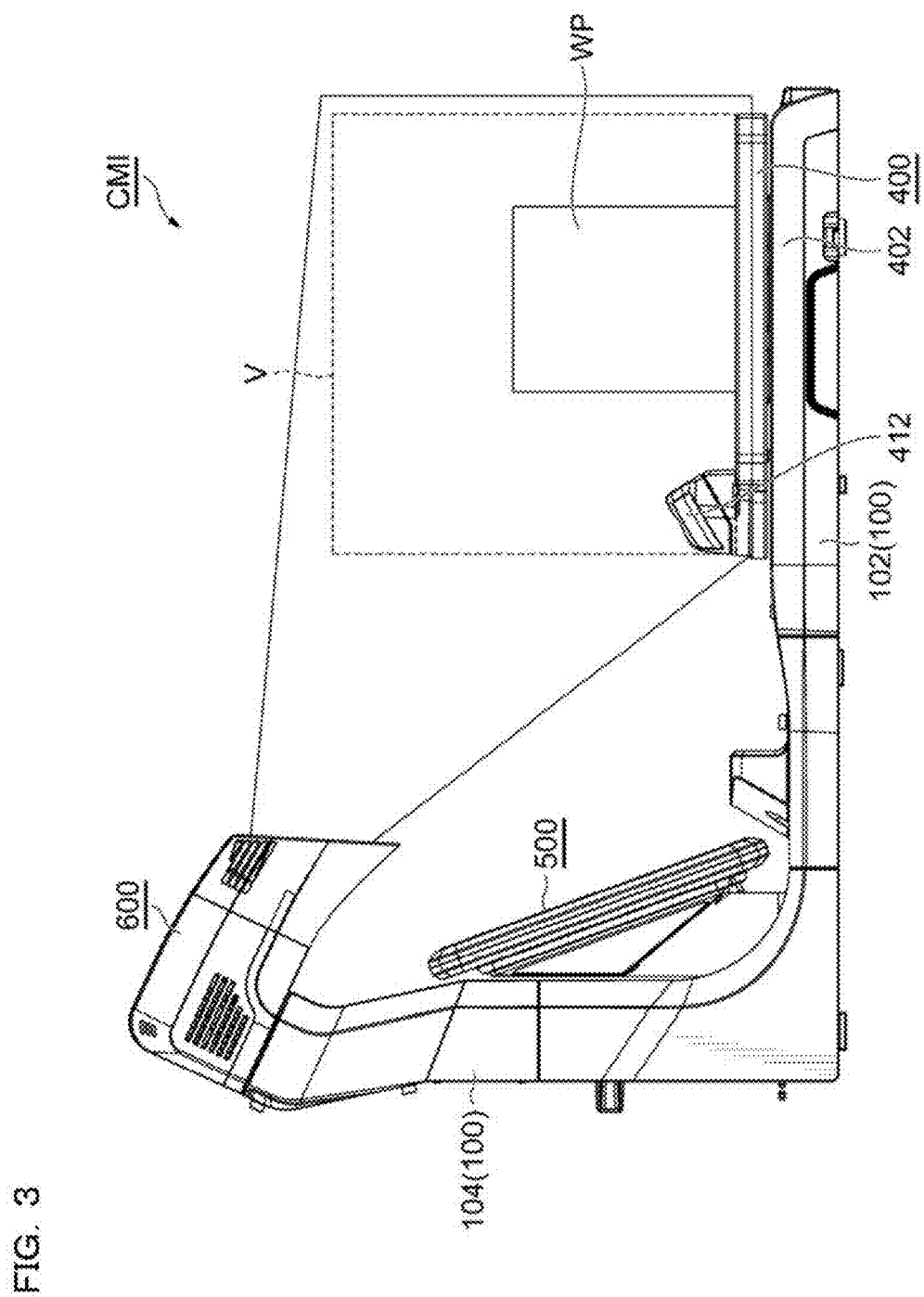
FIG. 3 is a side view of the optical three-dimensional coordinate measuring device of the embodiment.

The main imaging unit 600 is, for example, a charged coupled device (CCD) camera. When a marker (described below) emits infrared rays, an imaging element of the electronic camera is preferably a complementary metal oxide semiconductor (CMOS) image sensor which is capable of detecting infrared rays. The main imaging unit 600 is fixed to the standing part 104 at a fixed attitude so as to capture an image of a predetermined imaging space V (FIG. 3 described below). Specifically, the fixed main imaging unit 600 is positioned in a manner to face the table 400 with an optical axis of the camera tilted downward (FIG. 3).

The display unit 500 desirably includes a flat display, for example, a liquid crystal display panel or an organic EL panel. The display unit 500 displays, for example, an image generated by the personal computer PC, an operating procedure screen, that is, a guidance screen for the optical three-dimensional coordinate measuring device CMI, or a measurement result on the basis of control by the control board 106 (FIG. 2).

Figure 4:
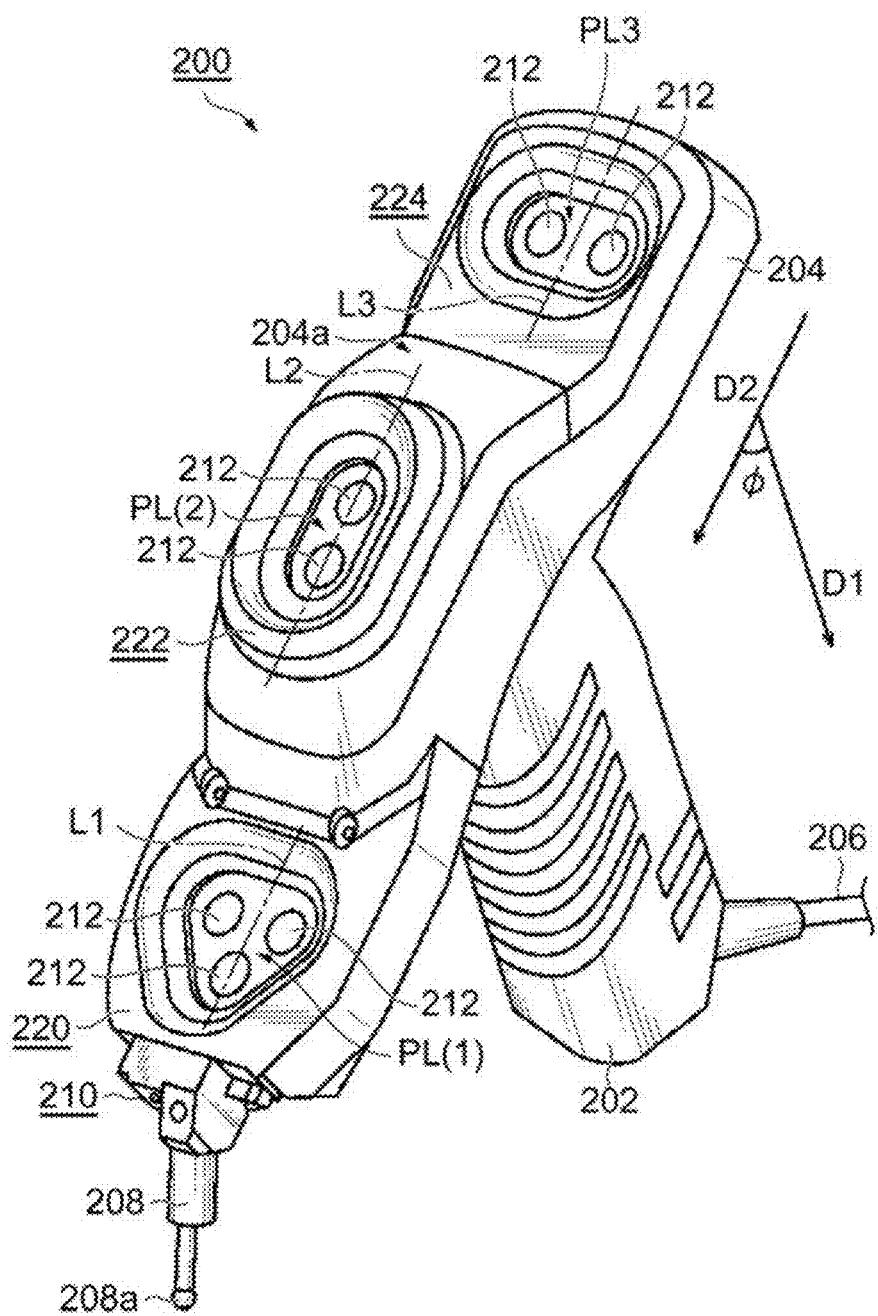
FIG. 4 is a perspective view of a probe which is included in the optical three-dimensional coordinate measuring device of the embodiment.

Probe:

Referring to FIG. 4 which illustrates the probe 200 in an enlarged manner, the probe 200 has a generally T outer shape. That is, the probe 200 includes a grip part 202 which is gripped by an operator with his/her hand to operate the probe 200 and a marker installation part 204 which intersects one end of the grip part 202 and linearly extends. The probe 200 has a shape in which one end of the grip part 202 is connected to the central part in the longitudinal direction of the marker installation part 204. More specifically, in the outer shape of the probe 200, the grip part 202 extends in a first direction D1, and the marker installation part 204 extends in a second direction D2 which intersects the first direction D1. When an angle formed by the first direction D1 and the second direction D2 is defined as an angle $\phi$ formed by the grip part 202 and the marker installation part 204, the angle $\phi$ is preferably an acute angle.

Power is supplied to the illustrated probe 200 through a wiring line 206 which is connected to the lower end of the grip part 202. As a modification, a battery may be incorporated in the probe 200. Although not illustrated due to drawing reasons, a memory is incorporated in the probe 200. Calibration data of the probe 200 is stored in the memory.

The probe 200 is a contact type probe and includes a stylus 208 which is attached to one end face of the marker installation part 204. The stylus 208 includes a spherical contactor 208a on the tip thereof. As a modification, the contactor 208a may have a needle shape. Of course, the probe 200 may be a contactless type probe.

Words "front and rear" and "up and down" are used for making description easy to understand. The words "front and rear" and "up and down" are defined by a state of the probe 200 gripped by an operator. The stylus 208 is located at the front end of the marker installation part 204. The marker installation part 204 extends in the front-rear direction. The grip part 202 extends downward from the central part in the longitudinal direction of the marker installation part 204.

A sub imaging unit (probe camera) 210 is installed on the front end face of the marker installation part 204. The sub imaging unit 210 includes, for example, a charged coupled device (CCD) camera, and an optical axis thereof is directed to the front. A resolution of the sub imaging unit 210 may be lower than a resolution of the main imaging unit 600. The sub imaging unit 210 is disposed at a position whose positional relationship with the contactor 208a of the stylus 208 is known. A light reception signal is output from each pixel of the sub imaging unit 210 to the control board 106 (FIG. 2).

The marker installation part 204 includes an upper face 204a. The upper face 204a is located opposite to the grip part 202. When an operator grips the probe 200 and performs a measurement operation, the operator can turn the upper face 204a toward the main imaging unit (fixed camera) 600.

A plurality of first markers 212 are disposed at intervals on the upper face 204a of the marker installation part 204. The first marker 212 is referred to as a "probe marker". FIG. 4 illustrates, as an example, a preferred arrangement mode of the plurality of first probe markers 212.

Continuingly referring to FIG. 4, seven probe markers 212 in total are disposed in separate three blocks on the upper face 204a which extends in the front-rear direction. A first block 220 is located at the front end part of the upper face 204a, and three probe markers 212 are disposed in the first block 220. A second block 222 is located at the central part of the upper face 204a, and two probe markers 212 are disposed in the second block 222. A third block 224 is located at the rear end part of the upper face, and two probe markers 212 are disposed in the third block 224.

In regard to a longitudinal direction axis of the marker installation part 204, L1, L2, and L3 in FIG. 4 respectively denote the longitudinal direction axes of the blocks 220, 222, and 224. The three probe markers 212 in the first block 220 are disposed at three vertexes of a regular triangle (although it is arbitrary) and disposed line symmetrically with respect to the longitudinal direction axis L1 of the upper face 204a. The two probe markers 212 in the second block 222 are disposed at an interval on the longitudinal direction axis L2 of the upper face 204a. The two probe markers 212 in the third block 224 are disposed at an interval on a line that is perpendicular to the longitudinal direction axis L3 of the upper face 204a.

A first plane PL (1) which is occupied by the three probe markers 212 in the first block 220, a second plane PL (2) which is occupied by the two probe markers 212 in the second block 222, and a third plane PL (3) which is occupied by the two probe markers 212 in the third block 224 are parallel to each other. There is a first height difference between the first plane PL (1) and the second plane PL (2). Similarly, there is a second height difference between the second plane PL (2) and the third plane PL (3). The first height difference and the second height difference may be equal to each other or difference from each other. In the probe 200 of the embodiment, as clearly understood from the drawing, the second block 222 projects to the outermost side.

As described above, it is possible to improve the detection accuracy for an orientation of the probe 200 (describe below) by disposing the plurality of probe markers 212 at intervals. Further, it is possible to further improve the detection accuracy for the orientation of the probe 200 by providing the height difference between the plurality of probe markers 212. Further, it is possible to further improve the detection accuracy for the orientation of the probe 200 by disposing the plurality of probe markers 212 in each of the plurality of blocks 220, 222, 224 and making the arrangement relationships between the probe markers 212 different from each other between the plurality of blocks 220, 222, 224.

Although the probe marker 212 may be a retroreflective marker, the probe marker 212 is preferably a self-luminous marker. In the embodiment, the probe marker 212 is a self-luminous marker which employs an infrared LED as a light source. Infrared rays having a wavelength of 860 nm are intermittently, preferably, periodically emitted from each of the probe markers 212. Images of infrared rays emitted from the plurality of probe markers 212 are captured by the main imaging unit 600.

Figure 5:
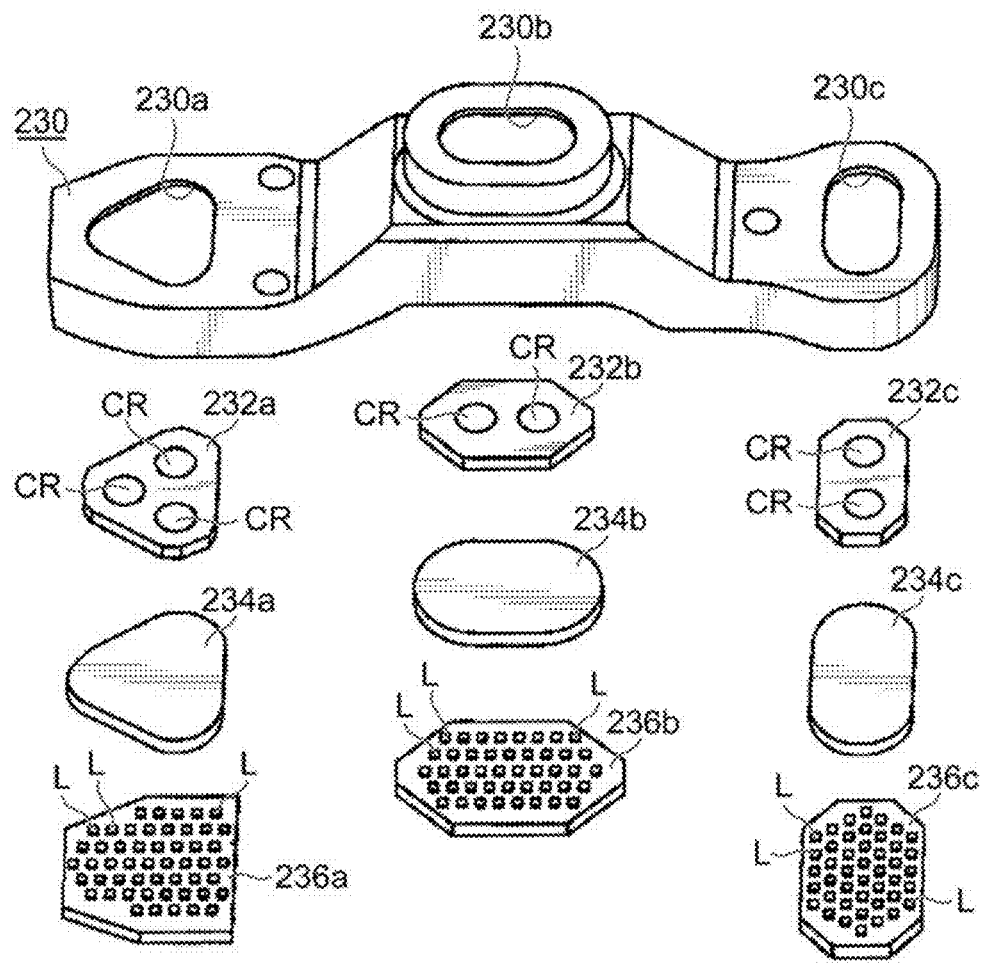
FIG. 5 is an exploded perspective view for describing a holding member which is housed in a case of the probe and an optical element which is housed in the holding member.
Figure 6:
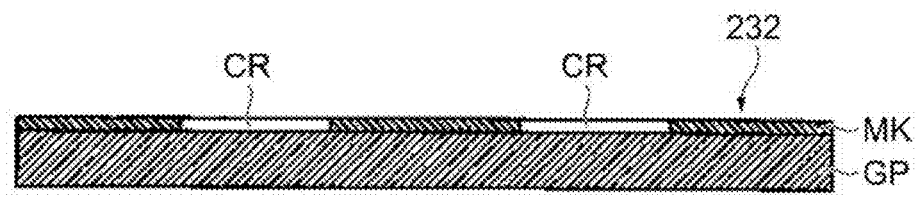
FIG. 6 is a sectional view of a marker member which is a principal element of a probe marker.
Figure 7:
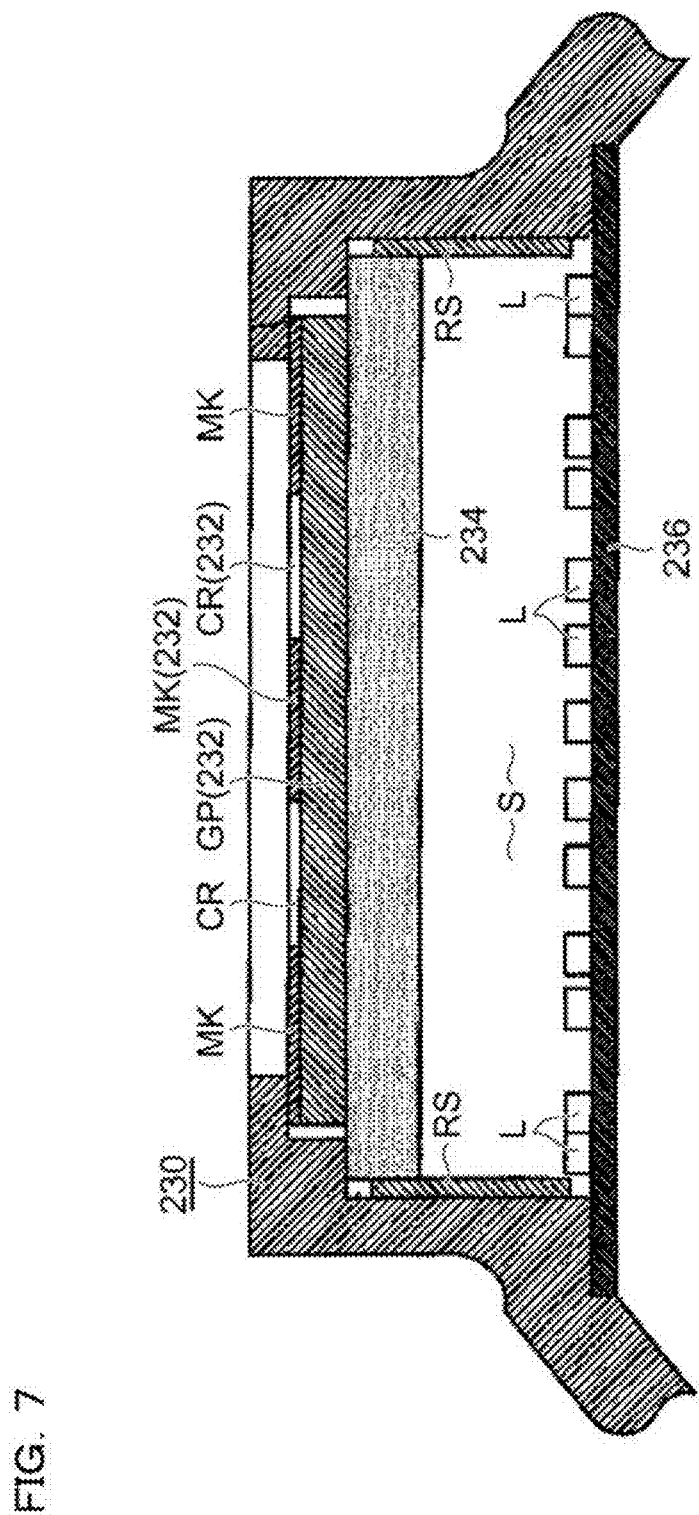
FIG. 7 is a partial sectional view of the holding member in which the optical element is incorporated.

FIGS. 5 to 7 are diagrams for describing the internal structure of the probe 200. The probe 200 includes a holding member 230 in a case which forms an outer contour of the probe 200. The holding member 230 is made of a material having a low hygroscopicity and a small linear expansion coefficient. The linear expansion coefficient of the holding member 230 is preferably $30 \times 10^{-6}$/K or less. For example, glass, ceramic, metal, an alloy, or glass ceramic is used as the material of the holding member 230. In particular, quartz glass which is lightweight and low cost is preferably used. The linear expansion coefficient of quartz glass is $0.5 \times 10^{-6}$/K.

The holding member 230 includes a generally triangular first window 230a which defines the first block 220, a second window 230b which defines the second block 222, and a third window 230c which defines the third block 224.

A first marker member 232a, a second marker member 232b, and a third marker member 232c are located respectively facing the first window 230a, the second window 230b, and the third window 230c. Further, first to third diffuser plates 234a, 234b, 234c are located under the first to third marker members 232a, 232b, 232c. Further, first to third light emitting substrates 236a, 236b, 236c are located under the first to third diffuser plates 234a, 234b, 234c.

The first to third marker members 232a, 232b, 232c basically have the same configuration. Thus, these marker members are collectively referred to as a marker member 232. FIG. 6 is a sectional view of the marker member 232. A circular light transmissive region CR corresponding to the probe marker 212 described above is formed on one face (the upper face of FIG. 6) of the marker member 232.

Referring to FIG. 6, a main material of the marker member 232 is a plate-like member GP which is made of a flat glass plate. The plate-like member GP has a high light transmittance. For example, quartz glass or soda glass is used as the material of the plate-like member GP. In particular, quartz glass having a low hygroscopicity and a small linear expansion coefficient is preferably used as the material of the plate-like member GP. The plate-like member GP is preferably made of the same material as the holding member 230 described above with reference to FIG. 5. Further, a smaller difference between the linear expansion coefficient of the plate-like member GP and the linear expansion coefficient of the holding member 230 (FIG. 5) is preferred because the smaller difference makes temperature correction easy. In this embodiment, both the holding member 230 and the plate-like member GP are made of quartz glass.

The light transmissive region CR is formed by printing a light blocking mask MK on one face of the plate-like member GP in a manner to surround the light transmissive region CR. That is, the light transmissive region CR is defined by the light blocking mask MK. The light blocking mask MK may be formed by sputtering or vapor deposition. A metal material having a high adsorptivity (high adhesion) with respect to glass is preferably used as the material of the mask MK. A concrete example of the metal material includes chromium. The mask MK may be formed of a single light blocking film, or formed by laminating a plurality of light blocking films. Although the plurality of light blocking films may be made of the same light blocking material, the plurality of light blocking films are preferably made of different light blocking materials. That is, it is preferred to form the mask MK of a laminated film having a high film strength by laminating a light blocking film of a first metal material which easily adheres to glass and a light blocking film of another metal material thereon. Further, the mask MK may be formed using emulsion ink or another organic ink.

The contour of the light transmissive region CR which transmits infrared rays is not limited to the above circular shape. The light transmissive region CR may have any contour shape. For example, the light transmissive region CR may have an arrow contour. The number of light transmissive regions CR can be reduced by employing a shape having directivity.

Although there has been described an example in which a flat glass plate is employed as the material of the plate-like member GP, the region CR may have a semicircular convex shape. The semicircular convex shape of the region CR enables the accuracy of identifying the position of the marker to be improved.

Continuingly referring to FIG. 6, the above first to third diffuser plates 234a, 234b, 234c basically have the same configuration. Thus, these diffuser plates are collectively referred to as a diffuser plate 234. FIG. 7 is a partial sectional view of the holding member 230. Referring to FIG. 7, the diffuser plate 234 is disposed under the plate-like member GP (the marker member 232). The diffuser plate 234 has a function of diffusing and transmitting light and is made of, for example, a resin material. The diffuser plate 234 preferably has a larger area than the marker member 232 and preferably has a larger area than the first window 230a, the second window 230b, and the third window 230c.

The above first to third light emitting substrates 236a, 236b, 236c basically have the same configurations. Thus, these light emitting substrates are collectively referred to as a light emitting substrate 236. A plurality of light emitting elements L are mounted on the upper face of the light emitting substrate 236. The plurality of light emitting elements L are substantially uniformly arranged on the entire light emitting substrate 236 which is disposed in a manner to overlap the diffuser plate 234. In this embodiment, each of the light emitting elements L is an infrared LED (light emitting diode). As a modification of the light emitting element L, an LED that emits light having another wavelength may be used or a filament may be used.

Continuingly referring to FIG. 7, the light emitting substrate 236 and the diffuser plate 234 are preferably disposed apart from each other. Further, peripheral walls of a space S therebetween preferably include a diffusion reflection sheet RS. The diffusion reflection sheet RS has a function of diffusing and reflecting light. The diffusion reflection sheet RS may adhere to the holding member 230 with an adhesive. As a modification, a mirror sheet may be used instead of the diffusion reflection sheet RS.

Stage Unit:

The table 400 will be described in detail with reference to FIGS. 8 to 14. The table 400 is supported by a stage base 402. The stage base 402 constitutes a part of the horizontal part 102 of the main body 100. The stage base 402 may have a structure integrated with the horizontal part 102. However, in this embodiment, the stage base 402 is detachably attached to the rest part of the horizontal part 102.

The table 400 is typically an optical surface plate. A workpiece, that is, a measurement object WP is placed on the table 400. In this example, the table 400 has a generally square shape. A plurality of threaded holes Th which are arranged at regular intervals in two directions which are perpendicular to each other are formed on the table 400. Accordingly, the workpiece WP can be fixed to the table 400 with an upper clamp member and a fixing screw.

A magnetic force or adhesion may be employed as a mechanism for fixing the workpiece WP to the table 400. That is, the table 400 may be a magnetic body or adhesiveness is imparted to the upper face of the table 400. For example, an adhesive plate or sheet may be fixed onto the table 400.

The table 400 includes a second marker 410. A structure that incorporates the second marker 410 into the table 400 may be employed. However, preferably, the second marker 410 is included in a single stage marker unit 412, and the stage marker unit 412 is detachably attached to the table 400 as in this embodiment. Hereinbelow, the second marker 410 is referred to as a "stage marker".

Figure 8:
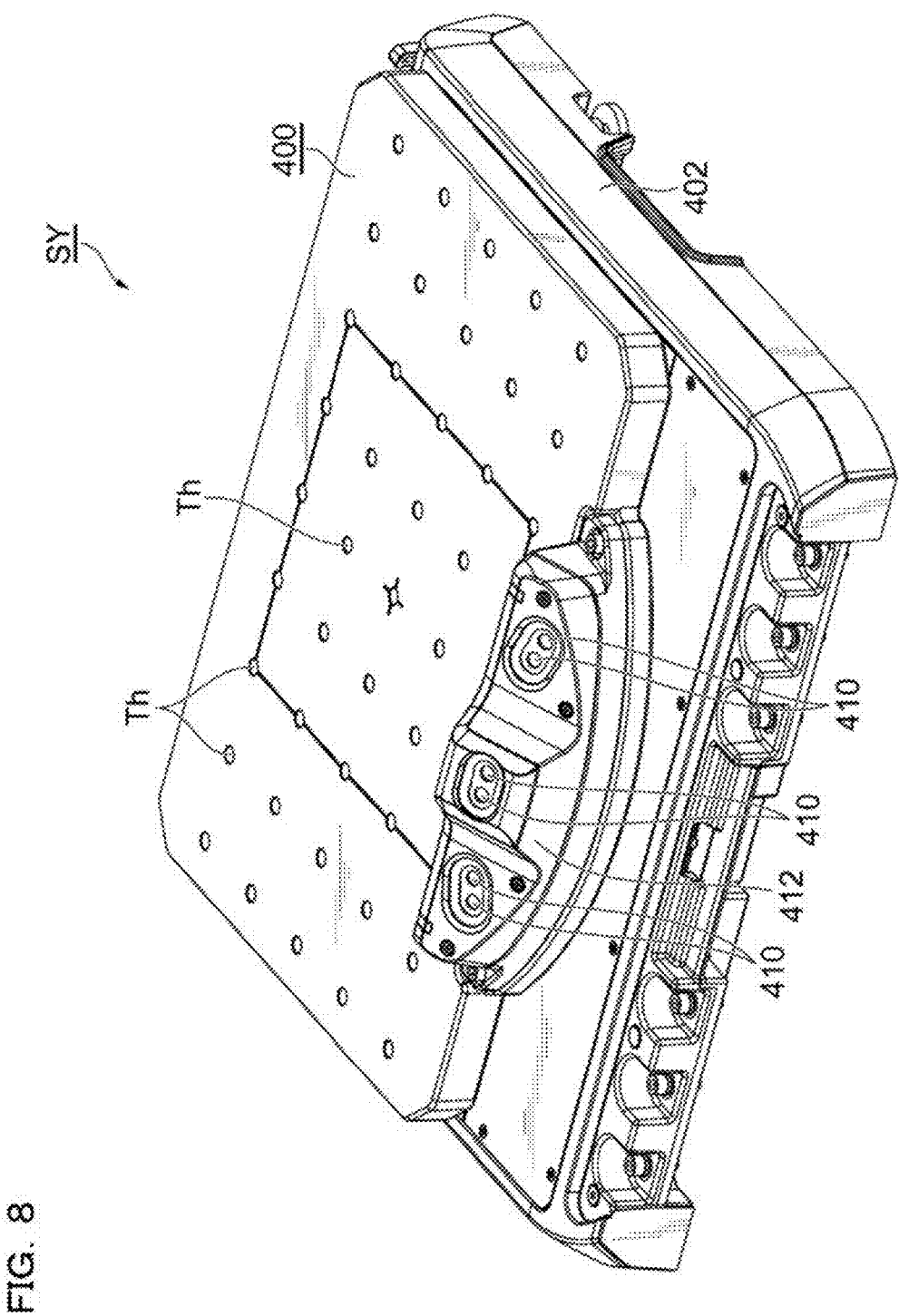
FIG. 8 is a perspective view of a stage unit which is included in the optical three-dimensional coordinate measuring device of the embodiment.
Figure 9:
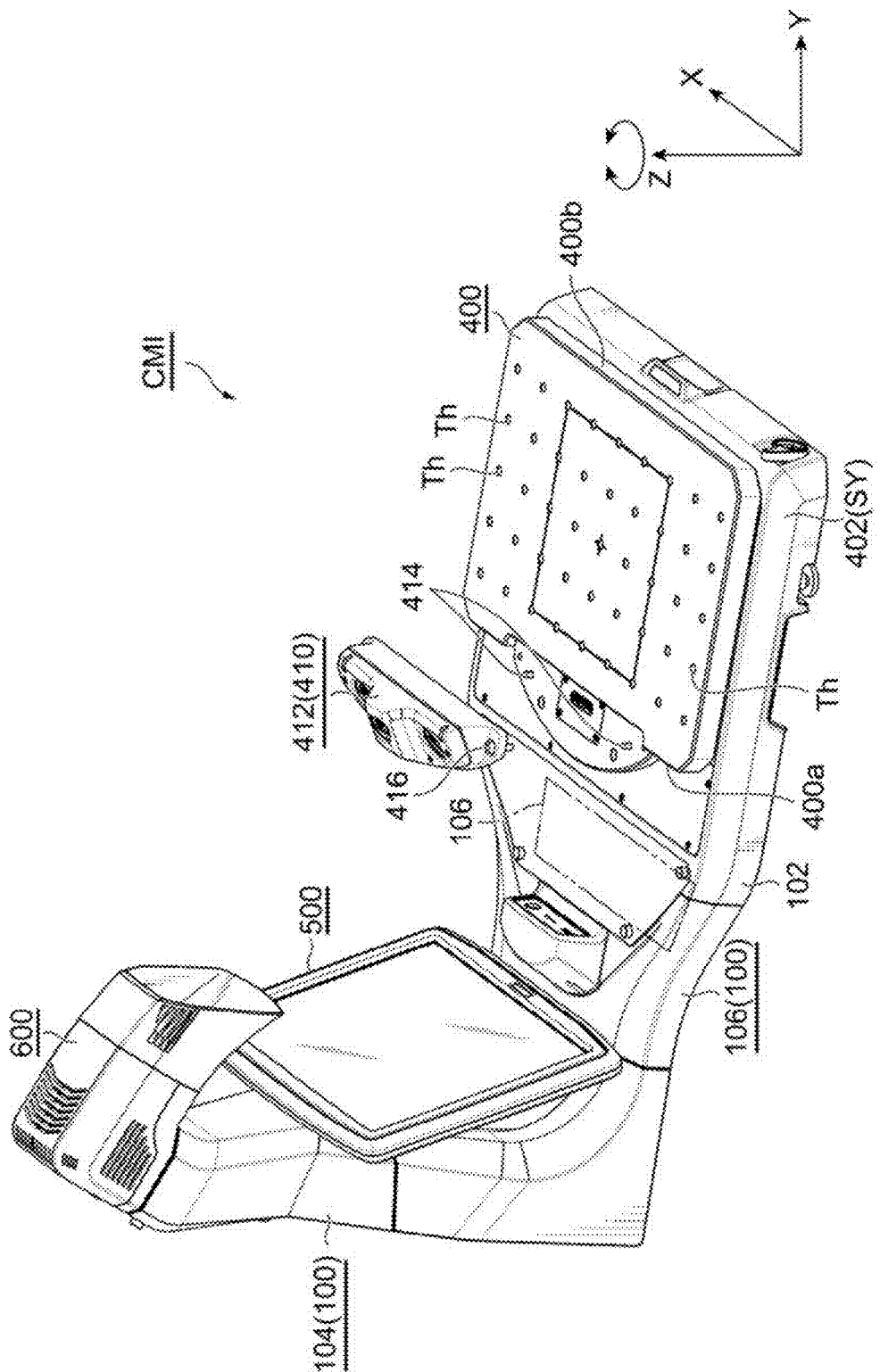
FIG. 9 is a perspective view of the optical three-dimensional coordinate measuring device of the embodiment and illustrates a state in which a displaceable table is located at an original position.

FIG. 8 illustrates a stage unit SY which includes the stage base 402 and the table 400 which is assembled to the stage base 402. The stage base 402 in this state is coupled to the horizontal part 102 of the main body 100. Referring to FIG. 9, the stage marker unit 412 is detachably attached to the table 400. The table 400 includes a plurality of positioning pins 414. The stage marker unit 412 is guided by the plurality of positioning pins 414 so as to be positioned, and fixed at a predetermined position in the table 400 using a fixing screw 416. Power is supplied to the stage marker unit 412 through the main body 100. As a modification, a battery for driving the stage marker unit 412 may be incorporated in the stage marker unit 412.

Referring to FIG. 9, there may be provided any number of stage marker units 412, and the stage marker unit 412 may be disposed at any position. A plurality of stage marker units 412 may be disposed on the table 400. However, in this embodiment, a single stage marker unit 412 is detachably attached to the table 400. Regarding the arrangement of the single stage marker unit 412, the stage marker unit 412 is most preferably disposed in a part of the rectangular table 400, the part being closest to the main imaging unit 600. The table 400 includes a first side edge 400a which is close to the main imaging unit 600 and a second side edge 400b which is far from the main imaging unit 600. The single stage marker unit 412 is preferably disposed in a central part of the first side edge 400a of the table 400.

The illustrated optical three-dimensional coordinate measuring device CMI is designed in such manner that an operator makes access to the optical three-dimensional coordinate measuring device CMI from a position opposite to the main imaging unit 600. That is, an operator makes access to the optical three-dimensional coordinate measuring device CMI from the side that is opposite to the standing part 104 of the main body 100 and corresponds to the second side edge 400b of the table 400.

Figure 10:
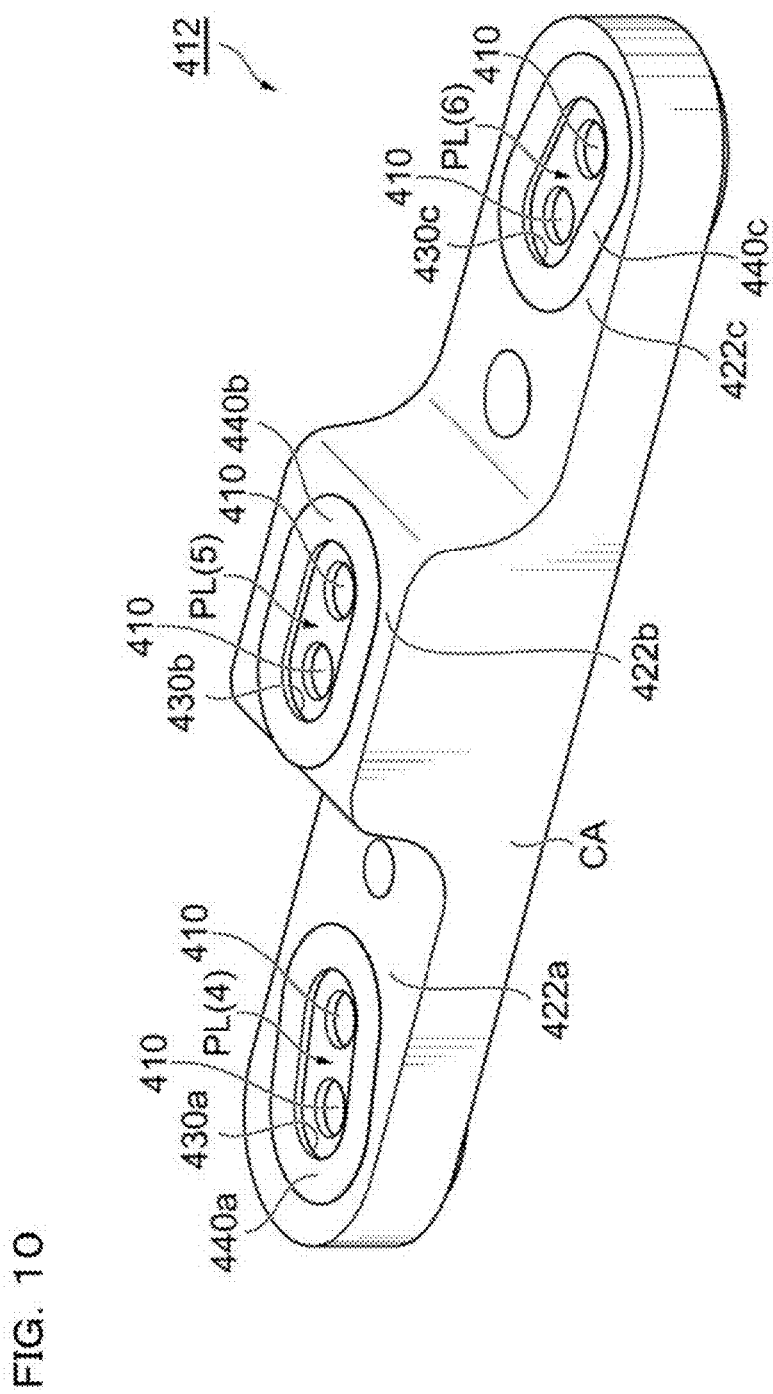
FIG. 10 is a perspective view of a stage marker unit which can be mounted on the stage unit.
Figure 11:
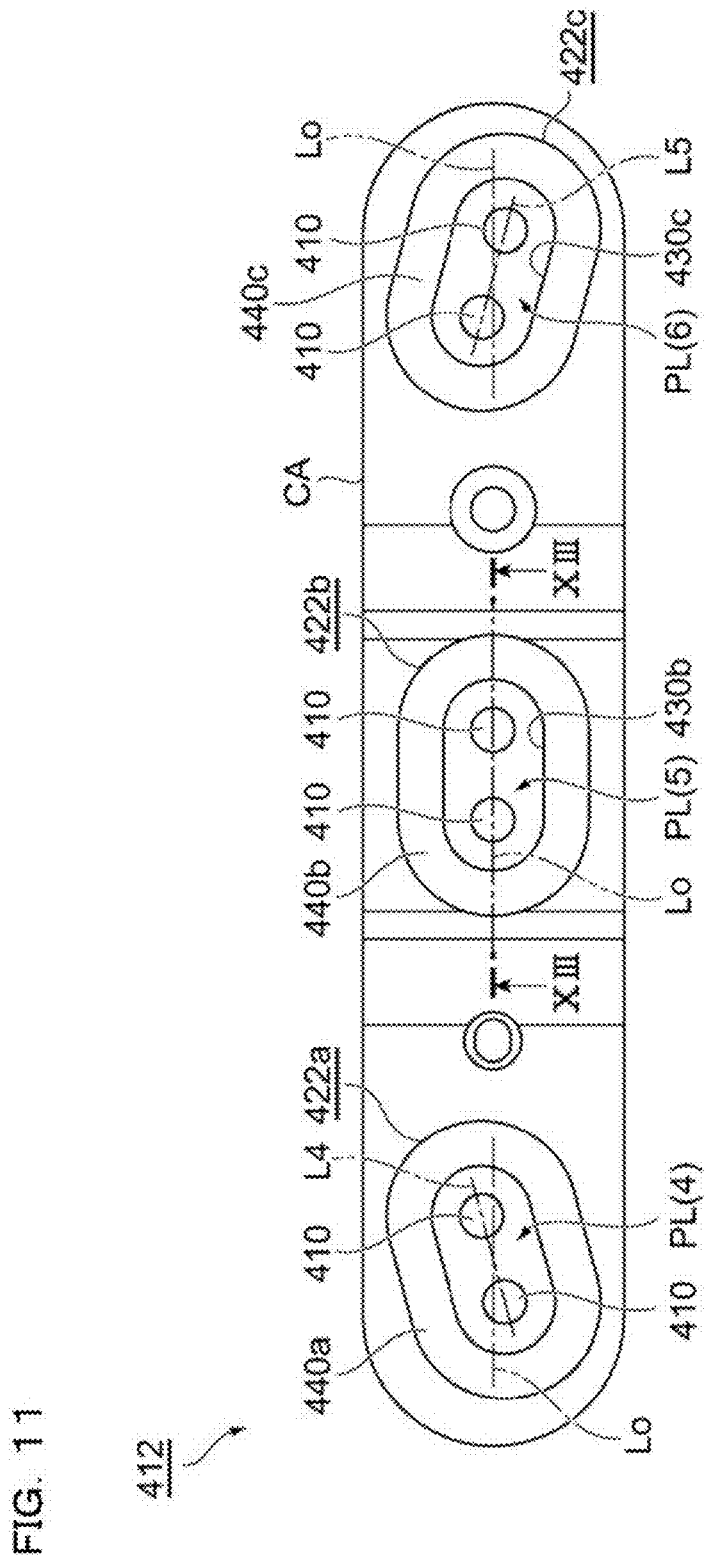
FIG. 11 is a plan view of the stage marker unit.
Figure 12:
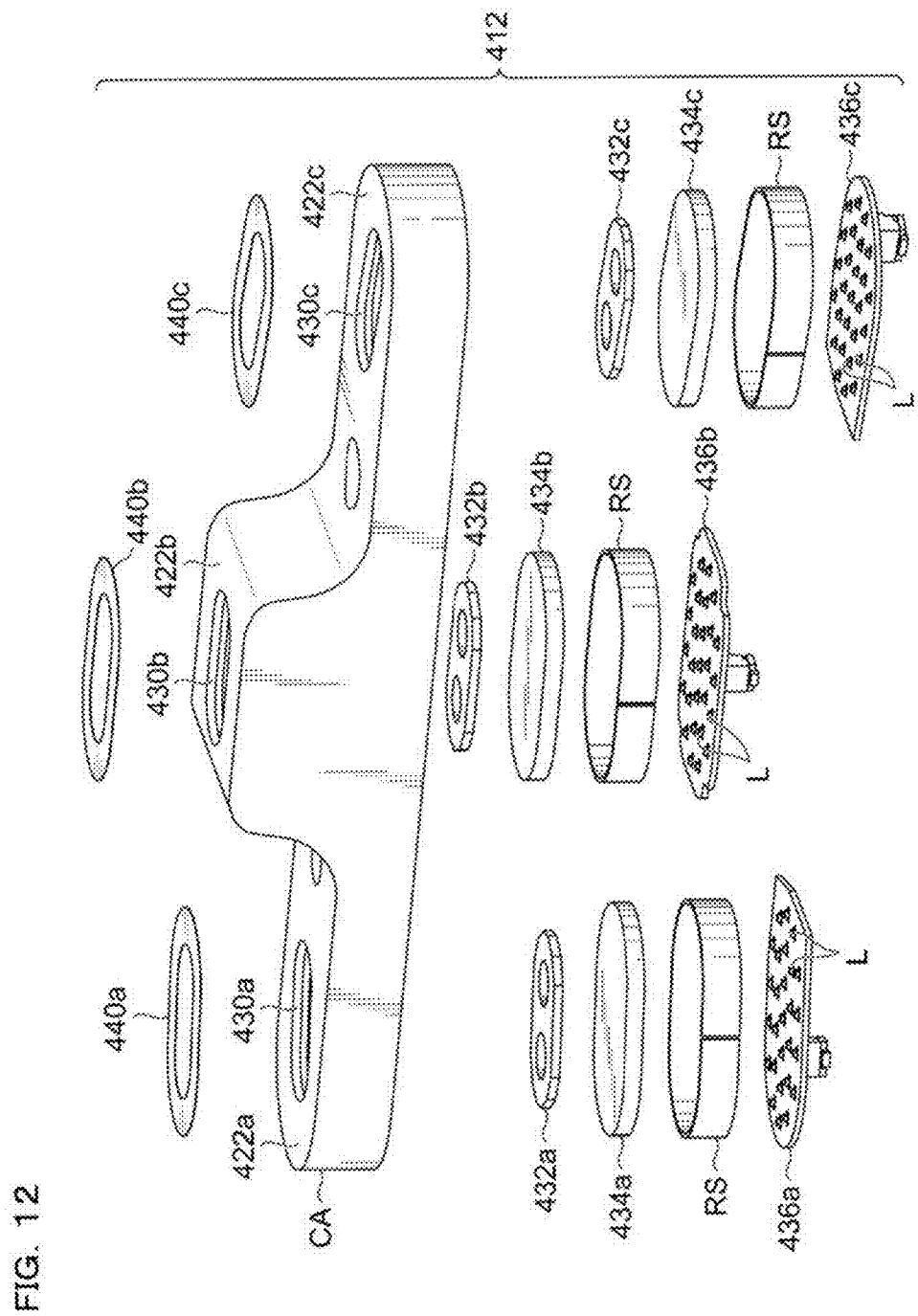
FIG. 12 is an exploded perspective view of the stage marker unit.
Figure 13:
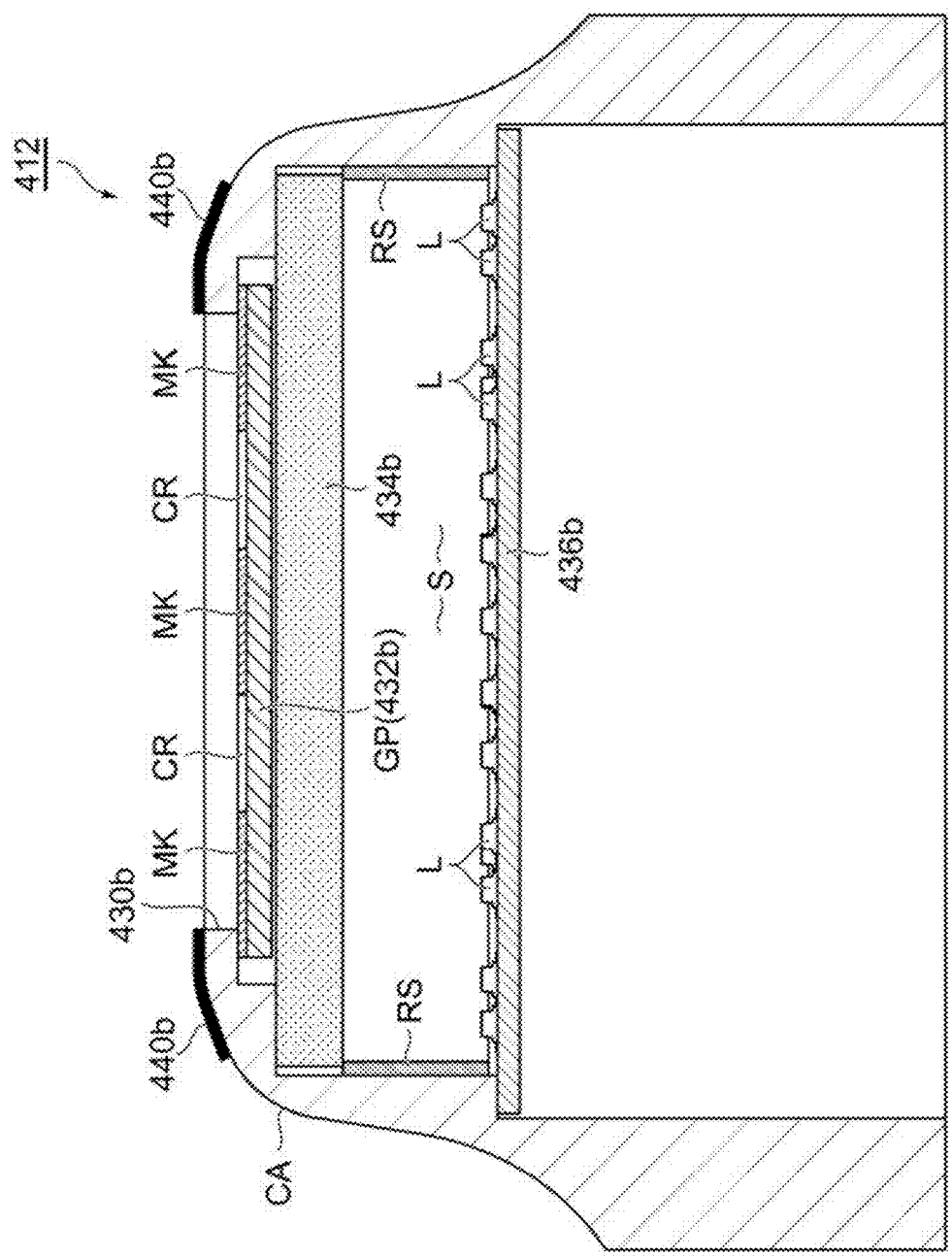
FIG. 13 is a sectional view taken along line XIII-XIII of FIG. 11.

Details of Stage Marker Unit:

FIGS. 10 to 13 illustrate the stage marker unit 412. FIG. 10 is a perspective view of the stage marker unit 412. FIG. 11 is a plan view of the stage marker unit 412. FIG. 12 is an exploded perspective view of the stage marker unit 412. FIG. 13 is a sectional view taken along line XIII-XIII of FIG. 11.

Referring to FIG. 11, the stage marker unit 412 has an elongated shape linearly extending along the first side edge 400a (FIG. 9) of the table 200 and includes a plurality of stage markers 410. A height difference is preferably provided between the plurality of stage markers 410. The stage marker unit 412 includes three blocks 422a, 422b, 422c. The first block 422a is located in one end part of the stage marker unit 412. The second block 422b is located in a central part of the stage marker unit 412. The third block 422c is located in the other end part of the stage marker unit 412. There is preferably a height difference between the first block 422a and the second block 422b and between the third block 422c and the second block 422b.

In the embodiment, the second block 422b which is located in the central part is high, and the first and third blocks 422a, 422c are low. Of course, alternatively, the second block 422b which is located in the central part may be low, and the first and third blocks 422a, 422c may be high. Although the first and third blocks 422a, 422c preferably have the same height, the first and third blocks 422a, 422c may have different heights. A first distance between the first block 422a and the second block 422b is preferably equal to a second distance between the second block 422b and the second block 422c. Accordingly, even when the table 400 is displaced in any direction, the marker detection accuracy can be maintained constant.

Although each of the first to third blocks 422a, 422b, 422c may include a single stage marker 410, each of the first to third blocks 422a, 422b, 422c preferably includes a plurality of stage markers 410. Although, in the embodiment, each of the first to third blocks 422a, 422b, 422c includes two stage markers 410, the first to third blocks 422a, 422b, 422c may include a different number of stage markers 410. For example, each of the first to third blocks 422a, 422b may include two stage markers 410, and the central second block 422b may include three stage markers 410. Further, a plurality of stage markers 410 belonging to each of the blocks 422a, 422b, 422c are preferably separated from each other at the same interval.

Referring to FIG. 11, the two stage markers 410 of the second block 422b are disposed at a first interval on a longitudinal direction axis $L_0$ of the stage marker unit 412. The two stage markers 410 of the first block 422a are disposed at a second interval on an axis $L_4$ which intersects the longitudinal direction axis $L_0$. The two stage markers 410 of the third block 422c are disposed at a third interval on an axis $L_5$ which intersects the longitudinal direction axis $L_3$. In the two adjacent blocks 422a, 422b or 422b, 422c, a first array direction of the stage markers 410 of one block 422a or 422c differs from a second array direction of the stage markers 410 of the other block 422b. Preferably, the first to third intervals are equal to each other. Further, the stage markers 410 are preferably right-left asymmetric in FIG. 11.

As described above, there is preferably a height difference between the first block 422a and the second block 422b and between the third block 422c and the second block 422b. That is, referring to FIG. 11, a first plane PL (4) which is occupied by the two stage markers 410 belonging to the first block 422a, a second plane PL (5) which is occupied by the two stage markers 410 belonging to the second block 422b, and a third plane PL (6) which is occupied by the two stage markers 410 belonging to the third block 422c are parallel to each other. Further, there is a first height difference between the first plane PL (4) and the second plane PL (5). Similarly, there is a second height difference between the second plane PL (5) and the third plane PL (6). The first height difference and the second height difference may be equal to each other or may be different from each other.

Similarly to the probe marker 212 described above, although the stage marker 410 may be a retroreflective marker, the stage marker 410 is preferably a self-luminous marker. In the embodiment, the stage marker 410 is a self-luminous marker which employs an infrared LED as a light source. Infrared rays having a wavelength of 860 nm are periodically emitted from each of the stage markers 410. Each of the stage markers 410 is oriented to the main imaging unit 600 by incorporating the stage marker unit 412 into the table 400. Images of infrared rays emitted from the plurality of stage markers 410 are captured by the main imaging unit 600.

A case CA of the stage marker unit 412 has a common basic design with the holding member 230 (FIG. 5) of the probe 200 described above. The internal structure (FIGS. 5 to 7) of the stage marker unit 412 has a common basic design with the internal structure of the holding member 230 of the probe 200. Thus, the stage marker unit 412 will be described using the same reference signs for elements common with the probe 200.

Referring to FIG. 12, the case CA of the stage marker unit 412 is preferably made of a material having a low hygroscopicity and a small linear expansion coefficient similarly to the holding member 230 (FIG. 5) of the probe 200. Thus, for the case CA of the stage marker unit 412, refer to the above description of the holding member 230. Of course, the material of the case CA may be glass, ceramic, metal, an alloy, or glass ceramic, for example. In the embodiment, quartz glass is used as the material of the case CA of the stage marker unit 412.

The case CA includes an elliptical first window 430a which defines the first block 422a, an elliptical second window 430b which defines the second block 422b, and a third window 430c which defines the third block 422c.

A first marker member 432a, a second marker member 432b, and a third marker member 432c are located respectively facing the first window 430a, the second window 430b, and the third window 430c. Further, first to third diffuser plates 434a, 434b, 434c are located under the first to third marker members 432a, 432b, 432c. Further, first to third light emitting substrates 436a, 436b, 436c are located under the first to third diffuser plates 434a, 434b, 434c.

A circular light transmissive region CR corresponding to the stage marker 410 is formed on one face (the upper face of FIG. 13) of each of the first to third marker members 432a, 432b, 432c. The first to third marker members 432a, 432b, 432c basically have the same configuration. Thus, these marker members are collectively referred to as a marker member 432.

Referring to FIG. 13, the marker member 432 is similar to the marker member 232 (FIG. 6) of the probe 200, and a main material thereof is a plate-like member GP which is made of a flat glass plate. Thus, it should be understood that the marker member 432 of the stage marker 410 has the same configuration as the marker member 232 (FIG. 6) of the probe 200. Specifically, the plate-like member GP has a high light transmittance. In an embodiment in which, for example, quartz glass or soda glass is used as the material of the plate-like member GP, quartz glass having a small linear expansion coefficient and a low hygroscopicity is employed. The plate-like member GP is preferably made of the same material as the case CA. In the embodiment, both the case CA and the plate-like member GP are made of quartz glass.

The light transmissive region CR is formed by printing a light blocking mask MK on one face of the plate-like member GP in a manner to surround the light transmissive region CR. It should be understood that the light blocking mask MK is also the same as the light blocking mask MK of the marker member 232 (FIG. 6) of the probe 200. A metal material having a high adsorptivity (high adhesion) with respect to glass is preferably used as the material of the mask MK. A concrete example of the metal material includes chromium. The mask MK may be formed of a single light blocking film, or formed by laminating a plurality of light blocking films. Further, the mask MK may be formed using emulsion ink or another organic ink.

The contour of the light transmissive region CR which transmits infrared rays is not limited to a circular shape. The light transmissive region CR may have any contour shape. For example, the light transmissive region CR may have an arrow contour. The number of light transmissive regions CR can be reduced by employing a shape having directivity.

Although there has been described an example in which a flat glass plate is employed as the material of the plate-like member GP, the region CR may have a semicircular convex shape. The semicircular convex shape of the region CR enables the accuracy of identifying the position of the stage marker 410 to be improved.

Referring to FIGS. 12 and 13, the first to third diffuser plates 434a, 434b, 434c basically have the same configuration. Thus, these diffuser plates are collectively referred to as a diffuser plate 434. The diffuser plate 434 is also similar to the diffuser plate 234 (FIG. 7) of the probe 200. That is, the diffuser plate 434 has a function of diffusing and transmitting light and is made of, for example, a resin material. The diffuser plate 434 preferably has a larger area than the marker member 432 and preferably has a larger area than the first window 430a, the second window 430b, and the third window 430c.

Referring to FIGS. 12 and 13, the above first to third light emitting substrates 436a, 436b, 436c basically have the same configuration. Thus, these light emitting substrates are collectively referred to as a light emitting substrate 436. A plurality of light emitting elements L are mounted on the upper face of the light emitting substrate 436 of the stage marker 410. The plurality of light emitting elements L are substantially uniformly arranged on the entire light emitting substrate 436 which is disposed in a manner to overlap the diffuser plate 434. In this embodiment, each of the light emitting elements L is an infrared light emitting diode (LED). As a modification of the light emitting element L, an LED that emits light having another wavelength may be used or a filament may be used.

FIGS. 10 to 12 illustrate light blocking sheets 440a, 440b, 440c. A light leakage prevention member such as the light blocking sheet 440a, 440b, 440c is preferably provided around each of the windows 430a, 430b, 430c to prevent light from leaking to the outside from the periphery of each of the windows 430a, 430b, 430c.

Figure 14:
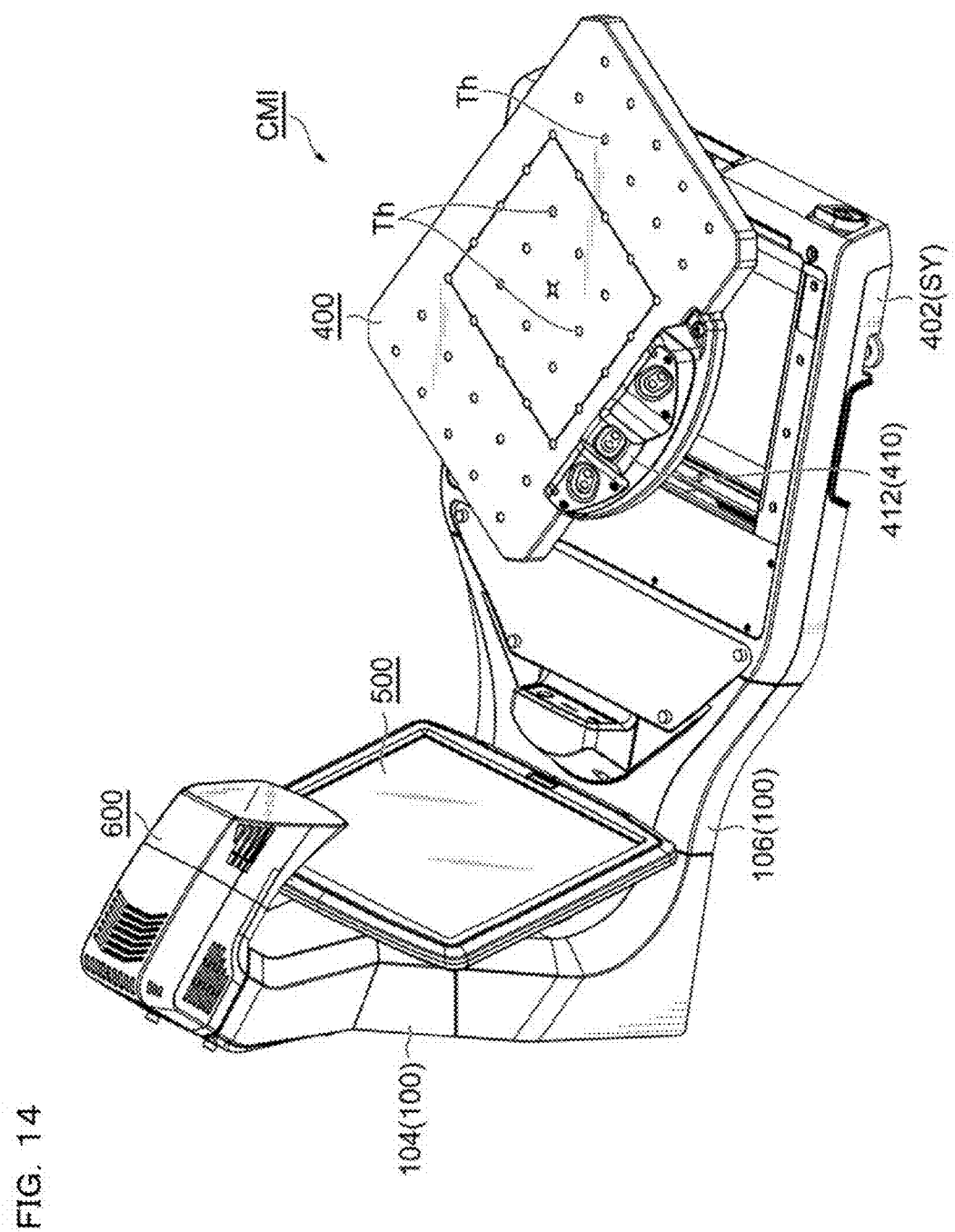
FIG. 14 is a perspective view of the optical three-dimensional coordinate measuring device of the embodiment and illustrates a state in which the displaceable table rotates from the original position.

Displacement of Table:

As described above, the table 400 is displaceable. FIGS. 1 and 9 illustrate a state in which the table 400 is fixed at an original position. FIG. 14 illustrates a state in which the table 400 is displaced from the original position (FIG. 9). To make description for the displacement of the table 400 from the original position easy, an X axis, a Y axis, and a Z axis are illustrated in FIG. 9.

As described above, the optical three-dimensional coordinate measuring device CMI is designed in such a manner that an operator makes access to the optical three-dimensional coordinate measuring device CMI from the side that is opposite to the display unit 500 which is leaned against the standing part 104 and faces obliquely upward and corresponds to the second side edge 400b of the table 400. When viewed from an operator, the X axis extends in a direction crossing an imaging space V, that is, the right-left direction (the extending direction of the first and second side edges 400a, 400b of the table 400), the Y axis extends in a direction vertically cutting the imaging space V, that is, the front-rear direction, and the Z axis extends in the up-down direction.

In the embodiment, the table 400 is displaceable in the X-axis direction, that is, the direction crossing the imaging space V (the extending direction of the first and second side edges 400a, 400b of the table 400). Further, the table 400 is rotatable in the clockwise direction and the counterclockwise direction around the Z axis. The direction of the displacement of the table 400 from the original position is not limited to the X-axis direction and the rotation direction around the Z axis, and may be any direction. For example, the displacement may include a so-called tilt displacement in which, around any side, for example, one side of the rectangular table 400, the other side opposite to the one side displaces up and down.

Further, the table 400 may be displaceable in the Y-axis direction, that is, the front-rear direction. However, the displacement in the front-rear direction (Y-axis direction) may deteriorate the accuracy of reading the stage marker 410. Thus, a plurality of stage marker units 412 are preferably disposed on the table 400 as a complement.

Further, the table 400 may be displaceable in the Z-axis direction, that is, the up-down direction. Alternatively, the main imaging unit 600 may be designed so as to be displaceable in the Z-axis direction.

Operation of System:

Referring to FIGS. 1 and 2, light reception signals output from the main imaging unit 600 and the sub imaging unit 210 (FIG. 4) of the probe 200 are sampled at a constant sampling period and converted into digital signals by the A/D converter of the control board 106. The digital signals output from the A/D converter are sequentially stored into the FIFO memory. The digital signals stored in the FIFO memory are sequentially transferred to the personal computer PC as pixel data.

In the embodiment, light emission timings of the probe marker 212 and the stage marker 410 and an imaging timing of the main imaging unit 600 are synchronized with each other. Pixel data stored in a light emission period of the plurality of markers 212, 410 is transferred from the control board 180 to the personal computer PC in the next quenching period of the markers 212.

As described above, the light emission timing of the probe marker 212 is simultaneous with the light emission timing of the stage marker 410. Thus, it is possible to easily distinguish between the probe marker 212 and the stage marker 410. Alternatively, alternate light emission and simultaneous light emission may be combined. That is, positional information of the probe marker 212 and the stage marker 410 may be obtained by alternate light emission, and correct positional information of the probe marker 212 and the stage marker 410 and relative positional information of the probe marker 212 and the stage marker 410 may be obtained by the next simultaneous light emission.

The storage unit 2 of the personal computer PC includes a read only memory (ROM), a random access memory (RAM), and a hard disk. A system program is stored in the storage unit 2. The storage unit 2 is used for storing various data processing and various data such as pixel data given from the optical three-dimensional coordinate measuring device CMI.

The personal computer PC generates image data on the basis of pixel data given from the three-dimensional coordinate measuring device CMI. The image data is an aggregate of a plurality of pieces of pixel data. The personal computer PC calculates a relative position of the contactor 208a of the stylus 208 of the probe 200 on the basis of the generated image data and then calculates absolute coordinates of a measurement point.

The operation unit 300 illustrated in FIGS. 1 and 2 is manually operated by an operator for various settings of the three-dimensional coordinate measuring device CMI and change of display contents of the display unit 500.

Calibration:

The main imaging unit 600, the probe 200, and the stage marker unit 412 are conveyed to a calibration facility for calibration. For storing calibration information, memories are mounted on the main imaging unit 600, the probe 200, and the stage marker unit 412.

Calibration information of the main imaging unit 600 is stored in the memory incorporated in the main imaging unit 600. The calibration information of the main imaging unit 600 includes, as characteristics of the main imaging unit 600, an angle of view (viewing angle), the positional relationship between the imaging element and a plurality of lenses, and an aberration of the plurality of lenses. Calibration information of the probe 200 is stored in the memory incorporated in the probe 200. The calibration information of the probe 200 is information for preventing a reduction in the measurement accuracy caused by an individual difference of the probe 200 and includes the relative positional relationship between the plurality of probe markers 212. Calibration information of the stage marker unit 412 is stored in the memory incorporated in the stage marker unit 412. The calibration information of the stage marker unit 412 is information for preventing a reduction in the measurement accuracy caused by an individual difference of the stage marker unit 412 and includes the relative positional relationship between the plurality of stage markers 410.

When the main imaging unit 600 and the stage marker unit 412 are assembled to the three-dimensional coordinate measuring device CMI, calibration information items of the main imaging unit 600, the probe 200, and the stage marker unit 412 are supplied to the control board 106 and further supplied to the personal computer PC. The personal computer PC performs coordinate measurement of a measurement point of the workpiece WP on the basis of these calibration information items.

Figure 15:
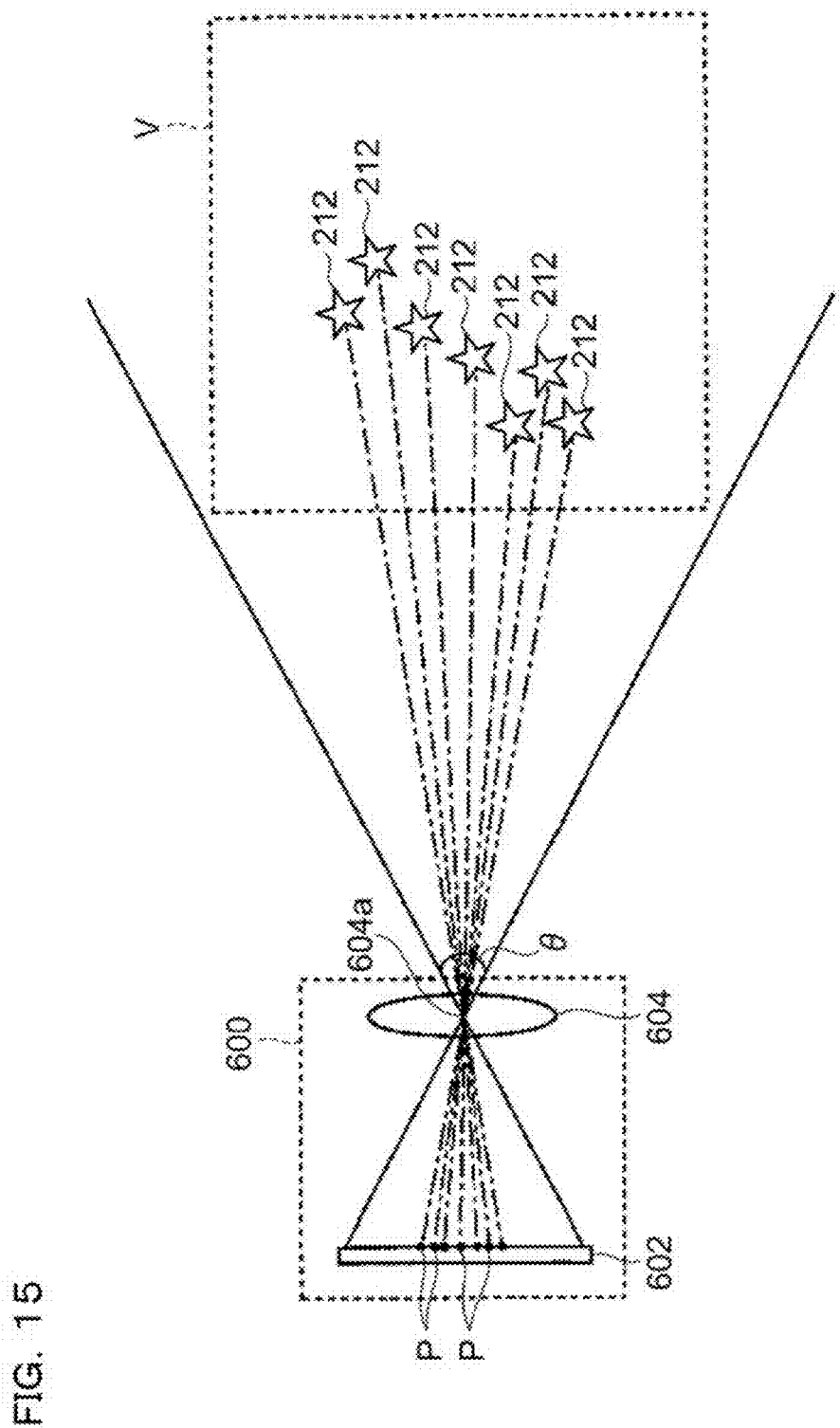
FIG. 15 is a diagram for describing detection by a main imaging unit which is mounted on the optical three-dimensional coordinate measuring device of the embodiment.

Detection by Main Imaging Unit:

FIG. 15 is a diagram for describing detection by the main imaging unit. The main imaging unit 600 detects infrared rays emitted from the plurality of probe markers 212 of the probe 200 and the plurality of stage markers 410 of the stage marker unit 412. The principle of identifying the positions of the probe markers 212 and the stage markers 410 will be described with reference to FIG. 15. FIG. 15 illustrates the relationship between the main imaging unit 600 and the probe markers 212. The same applies to the relationship between the main imaging unit 600 and the stage markers 410.

Referring to FIG. 15, a description will be made using an optically simplified model which has a function similar to a pinhole camera model in order to facilitate understanding. FIG. 15 illustrates an imaging element substrate 602 which is included in the main imaging unit 600. FIG. 15 illustrates one of the plurality of lenses included in the main imaging unit 600, specifically, a lens 604. Light is guided to an imaging element (the imaging element substrate 602) through a principal point 604a of the lens 604.

The main imaging unit 600 has a certain angle of view (viewing angle) θ. The imaging space V is included within the range of the angle of view θ of the main imaging unit 600. When each of the plurality of probe markers 212 is located within the imaging space V, infrared rays emitted from the probe markers 212 enter the imaging element (the imaging element substrate 602) through the principal point 604a of the lens 604.

A direction from the principal point 132a of the lens 604 toward each of the probe markers 212 is identified on the basis of a light reception position P on the imaging element substrate 602. In the example of FIG. 15, as indicated by a dot-dash line, each probe marker 212 is located on each straight line passing through each light reception position P and the principal point 604a of the lens 604. As described above, the relative positional relationship between the plurality of probe markers 212 is given as the calibration information of the probe 200 from the probe 200 to the control unit 220.

A position of the center of each probe marker 212 is uniquely determined on the basis of the direction from the principal point 604a of the lens 604 toward each probe marker 212 and the positional relationship between the plurality of probe markers 212. Further, in the present embodiment, the X axis, the Y axis, and the Z axis which are perpendicular to each other are defined, and an absolute position within the imaging space V is represented by three-dimensional coordinates. The personal computer PC calculates coordinates of the center of each probe marker 212 on the basis of the light reception position P on the imaging element (the imaging element substrate 602) and the previously stored positional relationship between the plurality of probe markers 212.

The personal computer PC calculates coordinates of a contact position between the contactor 208a (FIG. 4) of the probe 200 and the workpiece WP on the basis of the calculated coordinates of the center of each probe marker 212.

For example, the positional relationship between the center of each probe marker 212 and the center of the contactor 208a (FIG. 4) is previously stored in the storage unit 2 of the personal computer PC. Coordinates of the center of the contactor 208a are identified on the basis of the calculated coordinates of the center of each probe marker 212 and the previously stored positional relationship between the center of each probe marker 212 and the center of the contactor 208a.

Further, the attitude of the probe 200 is identified on the basis of the coordinates of the center of each probe marker 212. Accordingly, the orientation of the stylus 208 is identified. Further, a movement direction of the contactor 208a is identified on the basis of a change in the coordinates of the center of each probe marker 212. Typically, the contactor 208a is perpendicularly brought close to the plane of the workpiece WP. Thus, the relative positional relationship between the center of the contactor 208a and the contact position is estimated on the basis of the identified orientation of the stylus 208 and the identified movement direction of the contactor 208a. Coordinates of the contact point between the contactor 208a and the workpiece WP are calculated from the coordinates of the center of the contactor 208a on the basis of the estimated positional relationship.

Note that the probe 200 may be provided with a sensor which detects a direction of a force that is applied from the workpiece WP to the contactor 208a. In this case, it is possible to calculate coordinates of the contact position between the contactor 208a and the workpiece WP on the basis of a result of detection by the sensor.

Figure 16:
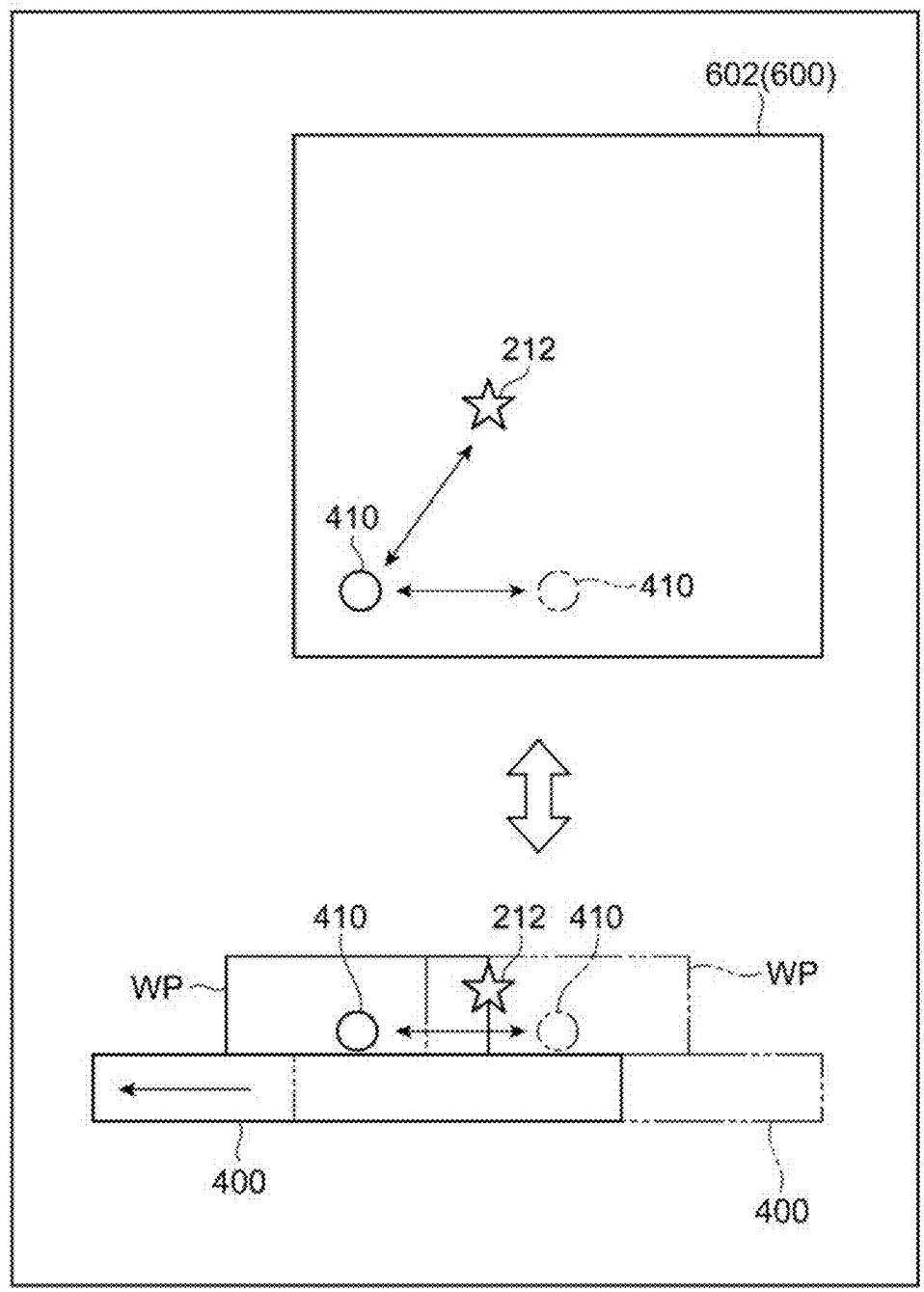
FIG. 16 is a diagram for schematically describing a state change which is caused when a measurement operation is performed with the table displaced from the original position.

FIG. 16 is a diagram for schematically describing a state change which is caused when a measurement operation is performed with the table 400 displaced from the original position. When the table 400 with the workpiece WP fixed thereto is displaced, for example, in the X-axis direction (FIG. 9), that is, the right-left direction when viewed from an operator, the stage marker 410 is displaced together with the table 400. Thus, a light reception position of the stage marker 410, that is, a light reception position on the imaging element substrate 602 (FIG. 15) is displaced. Then, a light reception position of the probe marker 212 is identified from the relationship with the displaced light reception position.

Figure 17:
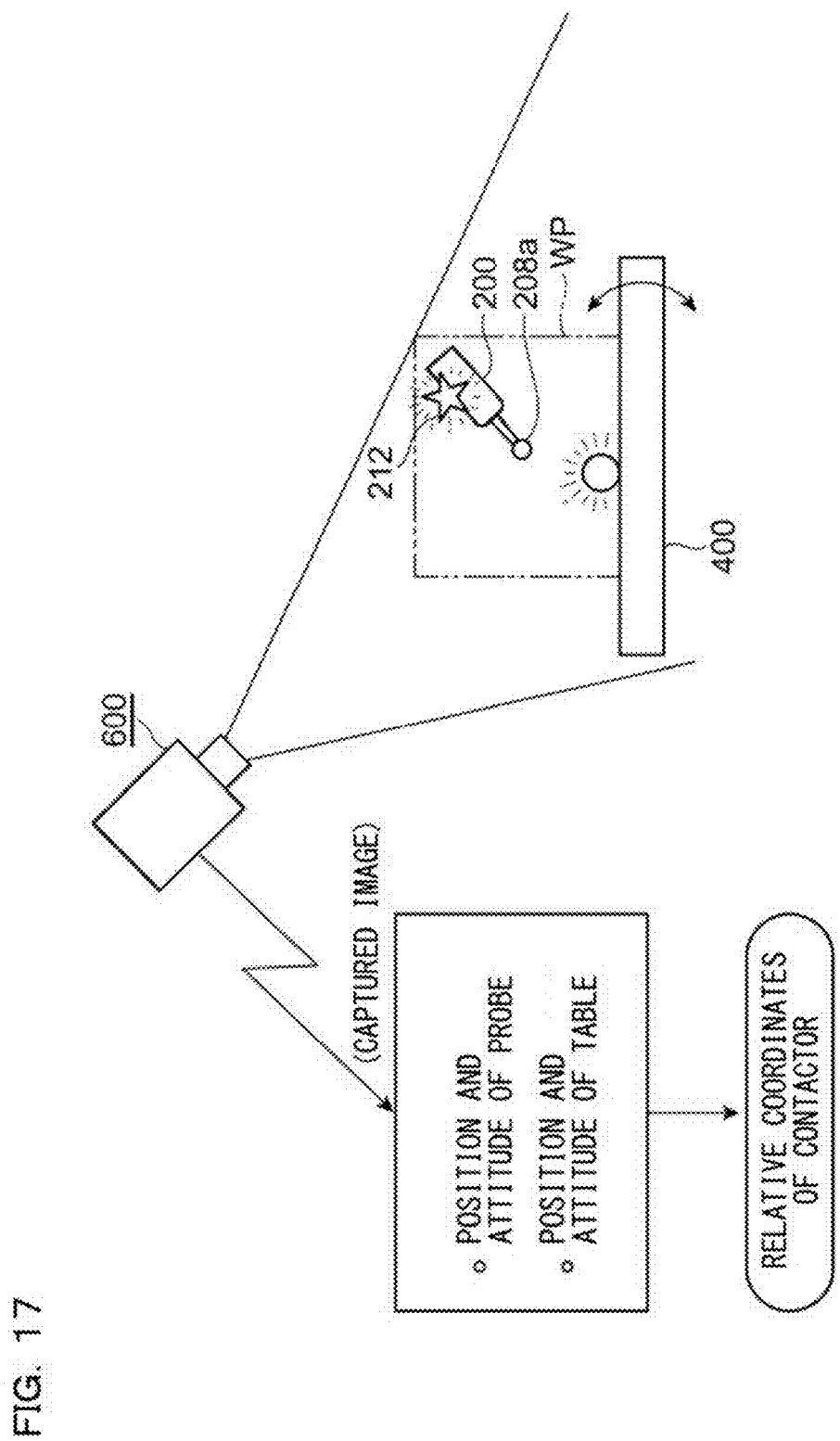
FIG. 17 is a diagram for describing a mechanism of optically identifying the position and the of the probe and the position and the attitude of the table using a captured image.

Thus, a captured image of the main imaging unit (fixed camera) 600 includes first information of the position and the attitude of the probe 200 and second information of the position and the attitude of the table 400. Then, positional information of the contactor 208a (FIG. 4) of the probe 200 can be obtained by processing the captured image (FIG. 16, FIG. 17). Note that a sensor capable of detecting the displacement amount and the attitude of the table 400, for example, a sensor 800 (FIG. 2) such as an encoder may be used.

The optical three-dimensional coordinate measuring device CMI includes a plurality of three-dimensional coordinate systems and performs measurement or display by appropriately using these plurality of three-dimensional coordinate systems. The plurality of three-dimensional coordinate systems include at least a fixed coordinate system. This fixed coordinate system is referred to as an "absolute coordinate system" or an "absolute position coordinate". The "absolute coordinate system" or the "absolute position coordinate" is a coordinate system corresponding to when the workpiece WP is viewed from an operator. Even when the table 400 is displaced, this coordinate system is a fixed coordinate system which does not change. In other words, this coordinate system is a coordinate system corresponding to when the workpiece WP is viewed from the fixed main imaging unit 600.

The plurality of three-dimensional coordinate systems also include a coordinate system that moves together with the displacement of the table 400. This coordinate system is referred to as a "relative coordinate system" or a "relative position coordinate". The "relative coordinate system" or the "relative position coordinate" is displaced together with the displacement of the workpiece WP in relation to the displacement of the table 400, that is, the displacement of the workpiece WP, but is fixed and not displaced when viewed from the workpiece WP.

Referring to FIG. 17, the imaging space of the fixed main imaging unit 600 corresponds to the absolute coordinate system. The main imaging unit 600 incorporates a plurality of pixels therein. When description is made using a term "camera coordinate system" which is generally called, in the embodiment, the plane of the imaging element substrate 602 (FIG. 15) constitutes XY coordinates of the camera coordinate system, that is, the absolute coordinate system.

On the other hand, in the relative coordinate system, XY coordinate axes are set, for example, on the surface of the table 400, that is, a workpiece placing surface. This is referred to as a table coordinate system. The relative coordinate system is not limited to the table coordinate system. For example, in measurement of a part of the workpiece WP, when a plurality of measurement points are measured on a specific face having a certain height level, XY coordinate axes may be set on a plane to be a reference for this height level. Specifically, when the workpiece WP is provided with a cylindrical projection, and a plurality of measurement points are set on the circumference of the cylindrical part at a predetermined height level, it is preferred to set a plane on which the base end of the cylindrical projection is located as a reference plane and to set XY coordinate axes on the reference plane.

In the embodiment, the position and the attitude of the probe 200 and the position and the attitude of the table 400 are calculated in the absolute coordinate system on the basis of the image processing. That is, in the embodiment, parameters such as the displacement amount and the displacement direction of the table 400 from the original position can be substantially detected on the basis of an image that is optically captured by the main imaging unit 600.

The relative coordinate system is used in extraction of a geometrical element included in the workpiece WP, that is, for example, a point, a line, a plane, a cylinder, or a sphere. When the length dimension of a long workpiece WP is measured by moving the table 400, the relative coordinate system may be transformed to the absolute coordinate system to obtain the length dimension of the workpiece WP. Of course, relative position coordinates of the relative coordinate system can be used in local measurement (e.g., measurement of the inner diameter of an opening or the diameter of a projection or recess included in the workpiece WP).

The relative coordinate system is used for determining, on the basis of a plurality of relative position coordinates of the workpiece WP and a previously set geometrical element (a point, a line, a plane, a cylinder, or a sphere), the relative position of the geometrical element.

In display of the display unit 500, an image is preferably created by transformation to the absolute coordinate system. For example, in measurement of the length dimension of a long workpiece WP, when a first plane which represents one end face of the workpiece WP and a second plane which represents the other end face of the workpiece WP are image-displayed, the first and second planes can be displayed on the display unit 500 in the same state as being viewed by an operator by displaying the first and second planes in the absolute coordinate system.

A workpiece WP (e.g., an oblong workpiece) that is larger than the imaging space V can be measured by a simple operation of displacing the table 400. Further, also in measurement of a workpiece WP that fits within the imaging space V, when the position of the probe 200 is difficult to grasp when viewed from the main imaging unit 600, a reduction in the measurement accuracy can be prevented by a simple operation of rotating the table 400. Further, the measurement accuracy can be increased by displacing the table 400 to bring a face of the workpiece WP to be measured close to the main imaging unit 600.

According to the optical three-dimensional coordinate measuring device CMI, even when the table 400 is displaced, it is only required that the relative positional relationship between the stage marker unit 412, the probe 200, and the main imaging unit 600 can be maintained only at the instant when the main imaging unit 600 captures an image. Thus, it is not necessary to continuously maintain the fixed relative positional relationship between the main imaging unit 600 and the stage marker unit 412. That is, the measurement accuracy of the optical three-dimensional coordinate measuring device CMI does not depend on the hardware configuration. For example, even when an attachment position of the stage marker unit 412 which is fixed to the table 400 is slightly deviated, the deviation does not affect the measurement accuracy of the optical three-dimensional coordinate measuring device CMI.

Figure 18:
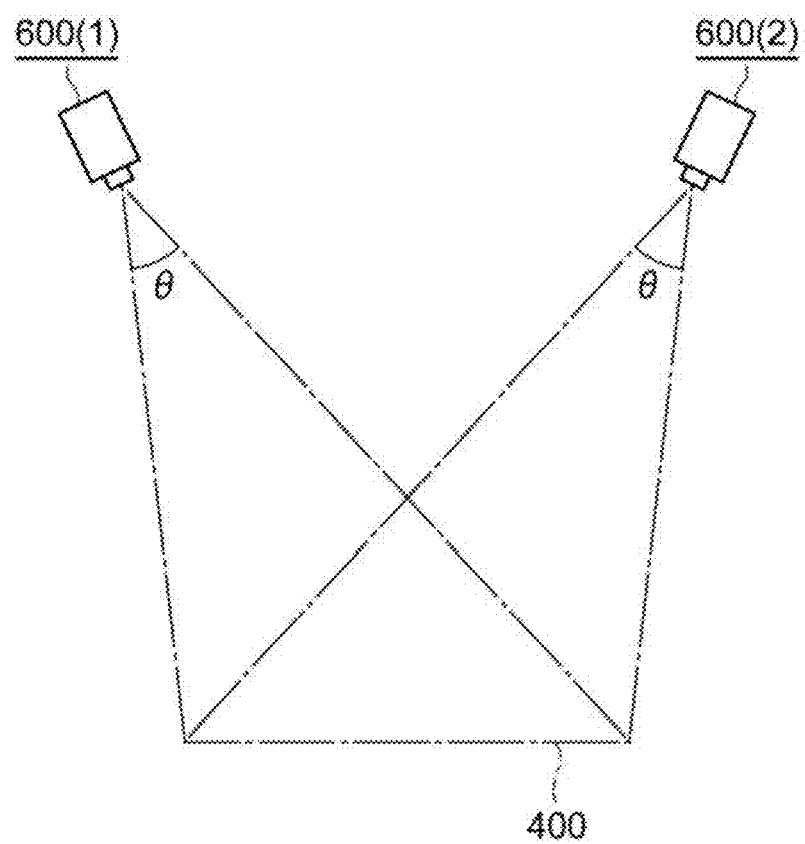
FIG. 18 is a diagram for describing an example in which a plurality of main imaging units stereoscopically view the same imaging space.

In the embodiment, the optical three-dimensional coordinate measuring device CMI is provided with a single main imaging unit 600. Alternatively, as illustrated in FIG. 18, the optical three-dimensional coordinate measuring device CMI may be provided with, for example, two main imaging units 600 (1), 600 (2). When the optical three-dimensional coordinate measuring device CMI is provided with a plurality of main imaging units 600, the plurality of main imaging units 600 preferably stereoscopically view the same imaging space V.

The optical three-dimensional coordinate measuring device CMI makes it possible to ensure a certain measurement accuracy and portability using an optical principle without a dependence of the measurement accuracy on the hardware configuration. Further, it is possible to provide a simple and easy operability even for a worker in a work site who is inexperienced in the operation of a computer not only by electronically internal-processing a captured image to obtain three-dimensional position coordinates, but also providing an appropriate GUI.

Even when the table 400 is displaced, measurement position coordinates can be obtained by performing calculation using a captured image by internal processing of the personal computer PC without placing a load on an operator. Further, it is possible to provide guidance information regarding a measurement operation and visually display a measurement result using the display unit 500 for a site worker who is inexperienced in the three-dimensional coordinate measuring device. Further, it is possible to establish traceability of which part of the workpiece WP is measured and how the measurement is performed by storing data relating to measurement including a captured image of the sub imaging unit 210 which is disposed on the tip part of the probe 200. Of course, it is possible to ensure management of an operation and improve the convenience of quality control in a factory (manufacturing site) by printing various pieces of information created by the optical three-dimensional coordinate measuring device CMI and the personal computer PC using a printer.

Figure 19:
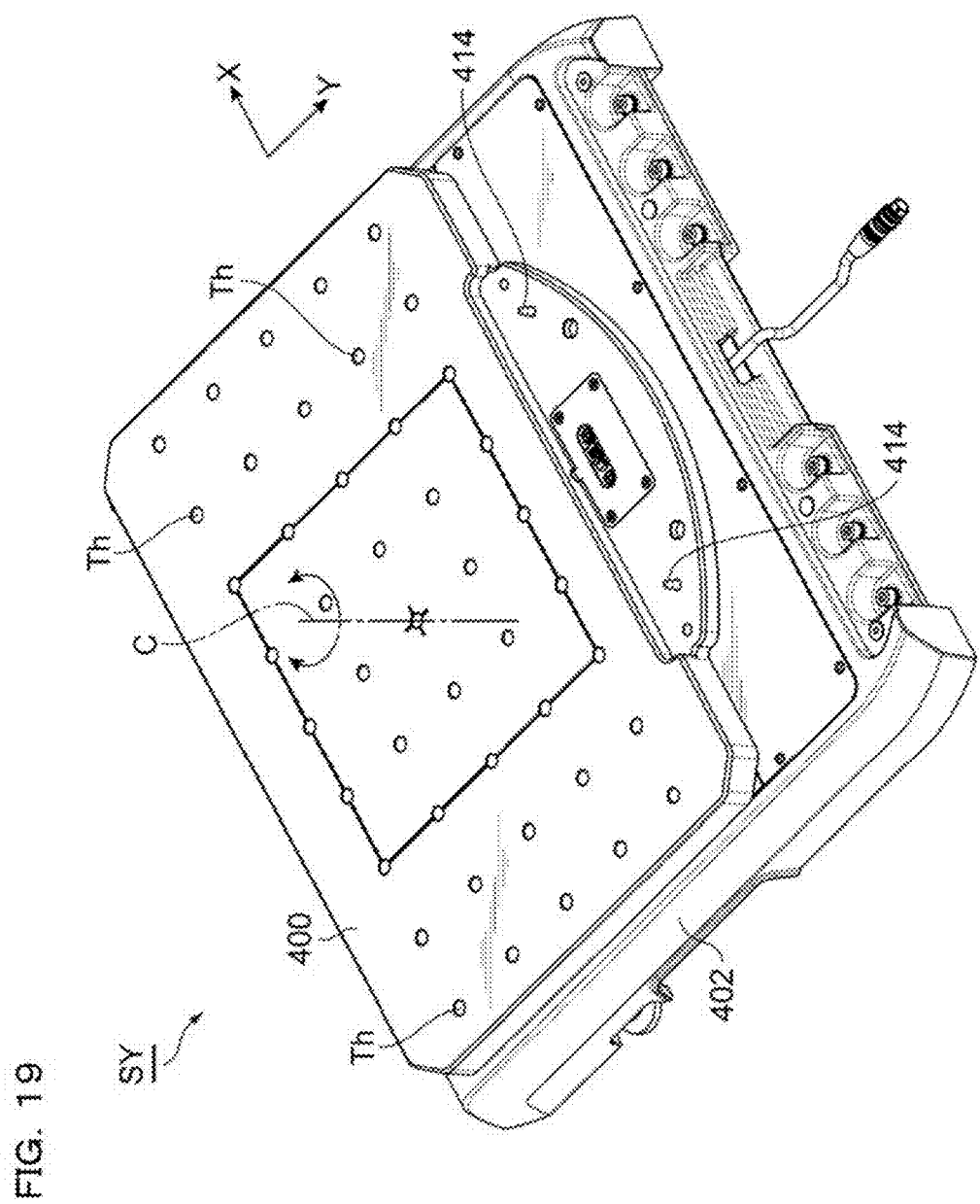
FIG. 19 is a perspective view of the stage unit similarly to FIG. 8 and illustrates a state in which the stage marker unit is detached.

Table Displacement Mechanism:

FIGS. 19 to 30 are diagrams for describing the stage unit. FIG. 19 illustrates the stage unit SY described above which includes the table 400 and the stage base 402. The stage unit SY is detachably attached to the main body 100. Referring to FIGS. 9 and 19, in the embodiment, the table 400 is movable in the X-axis direction (right-left direction) and also rotatable around a central axis C of the table 400. FIG. 19 illustrates a state in which the stage marker unit 412 (FIGS. 9 and 10) is detached.

Figure 20:
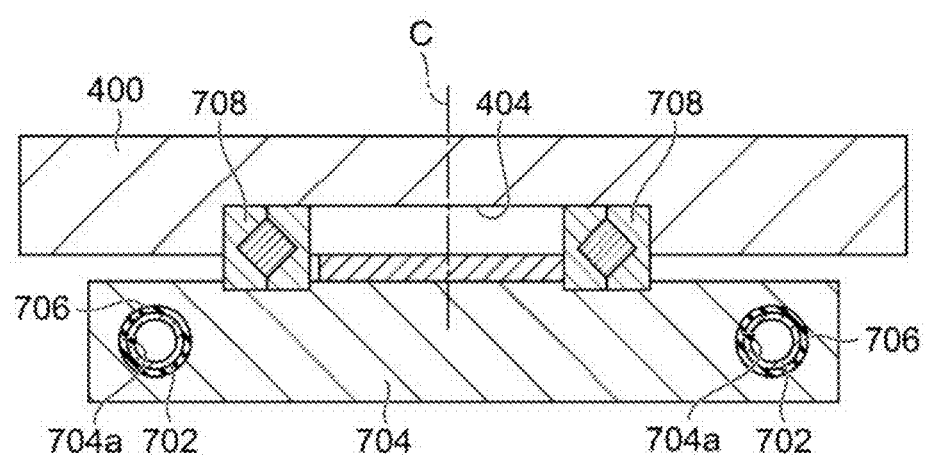
FIG. 20 is a diagram for describing a movement mechanism of the table in an X-axis direction.
Figure 21:
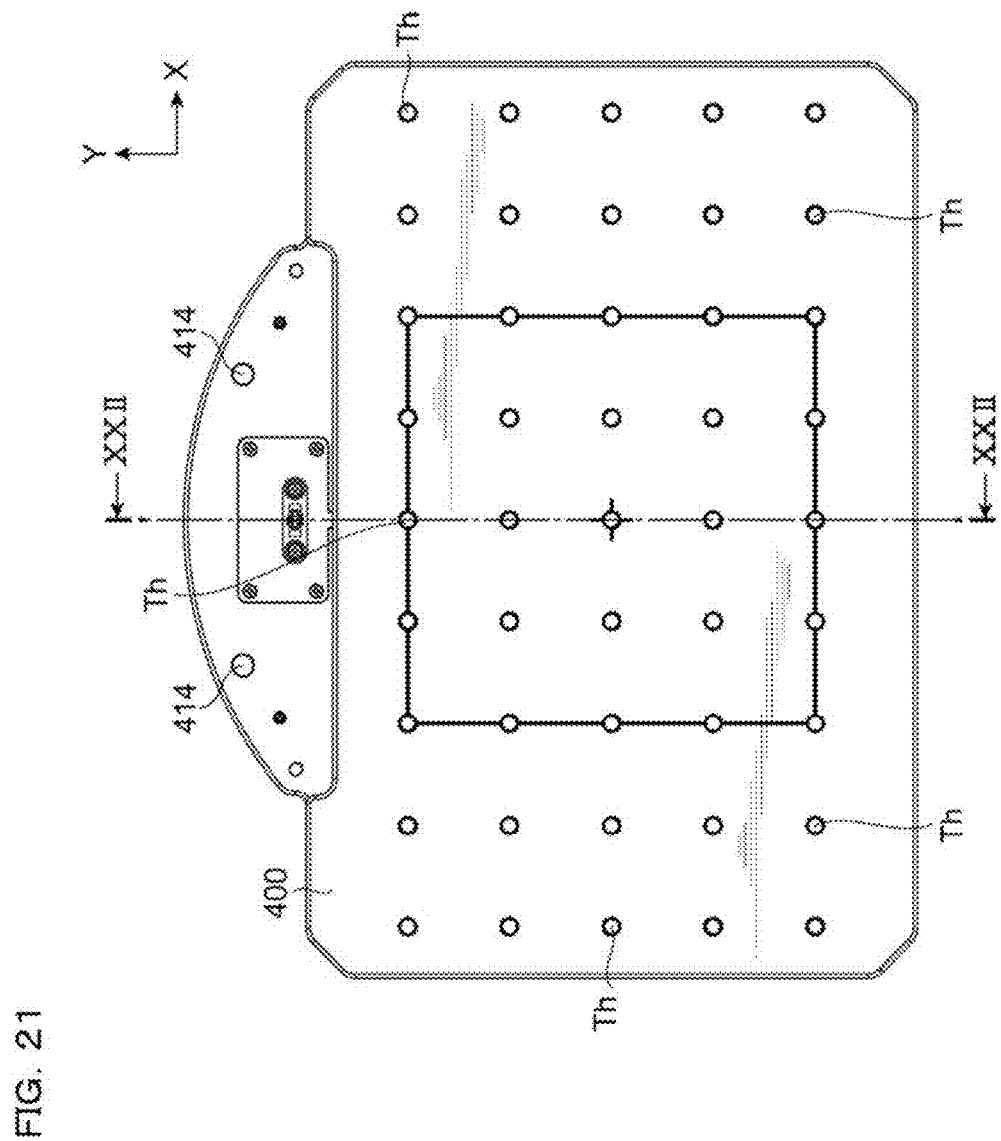
FIG. 21 is a plan view of the stage unit and illustrates a state in which the table is located at the original position.
Figure 22:
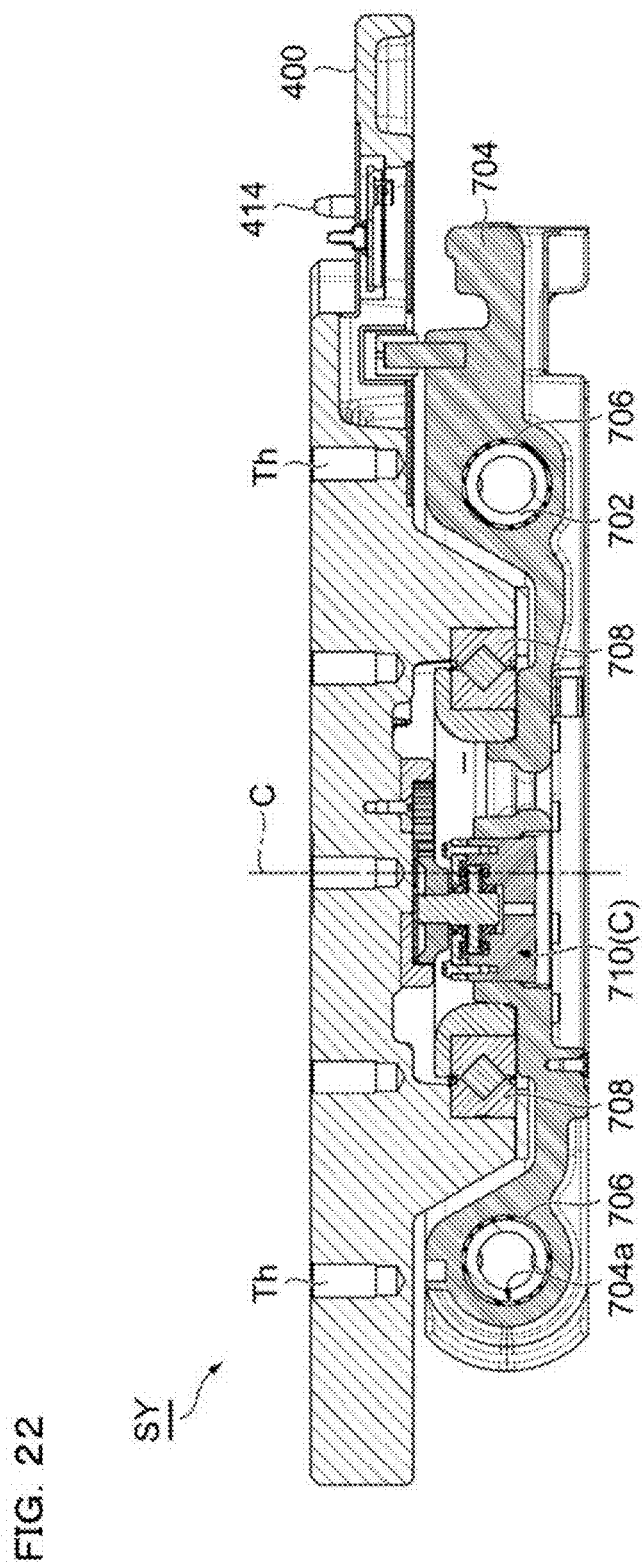
FIG. 22 is a sectional view taken along line XXII-XXII of FIG. 21.

FIG. 20 is a diagram for describing a movement mechanism of the table 400 in the X-axis direction (the extending direction of the first and second side edges 400*a*, 400*b* of the table 400). The stage base 402 includes a pair of linear shafts 702 which extend in the X-axis direction and are parallel to each other. The pair of linear shafts 702 is fixed to the stage base 402. The table 400 is assembled to an X base 704. The X base 704 includes a pair of long holes 704*a* which extend in the X-axis direction. The linear shafts 702 are inserted into the respective long holes 704*a*. Preferably, a rubber sleeve 706 as a friction sliding element is interposed between each of the long holes 704*a* of the X base 704 and the corresponding linear shaft 702. The pair of rubber sleeves 706 can constitute a first resistance mechanism which resists movement in the X-axis direction of the table 400. That is, the table 400 is not moved in the X-axis direction unless an operator applies a certain force or more to the table 400 in the X-axis direction.

The table 400 is placed on the X base 704 with a cross roller bearing 708 interposed therebetween. The table 400 includes a circular recess 404 on the bottom face thereof, and the cross roller bearing 708 is received in the circular recess 404. Accordingly, the table 400 becomes rotatable around the central axis C merely by placing the table 400 on the X base 704. A rotation mechanism of the table 400 can be simplified by a combination of the circular recess 404 and the cross roller bearing 708. Further, a structure in which the X base 704 and the table 400 are located close to each other in the up-down direction can be achieved. Thus, the height position of the table 400 can be lowered. Accordingly, it is possible to improve the operability when the workpiece WP which is typically a heavy object is placed on or removed from the table 400. Further, the center of gravity of the stage unit SY can be lowered.

Figure 23:
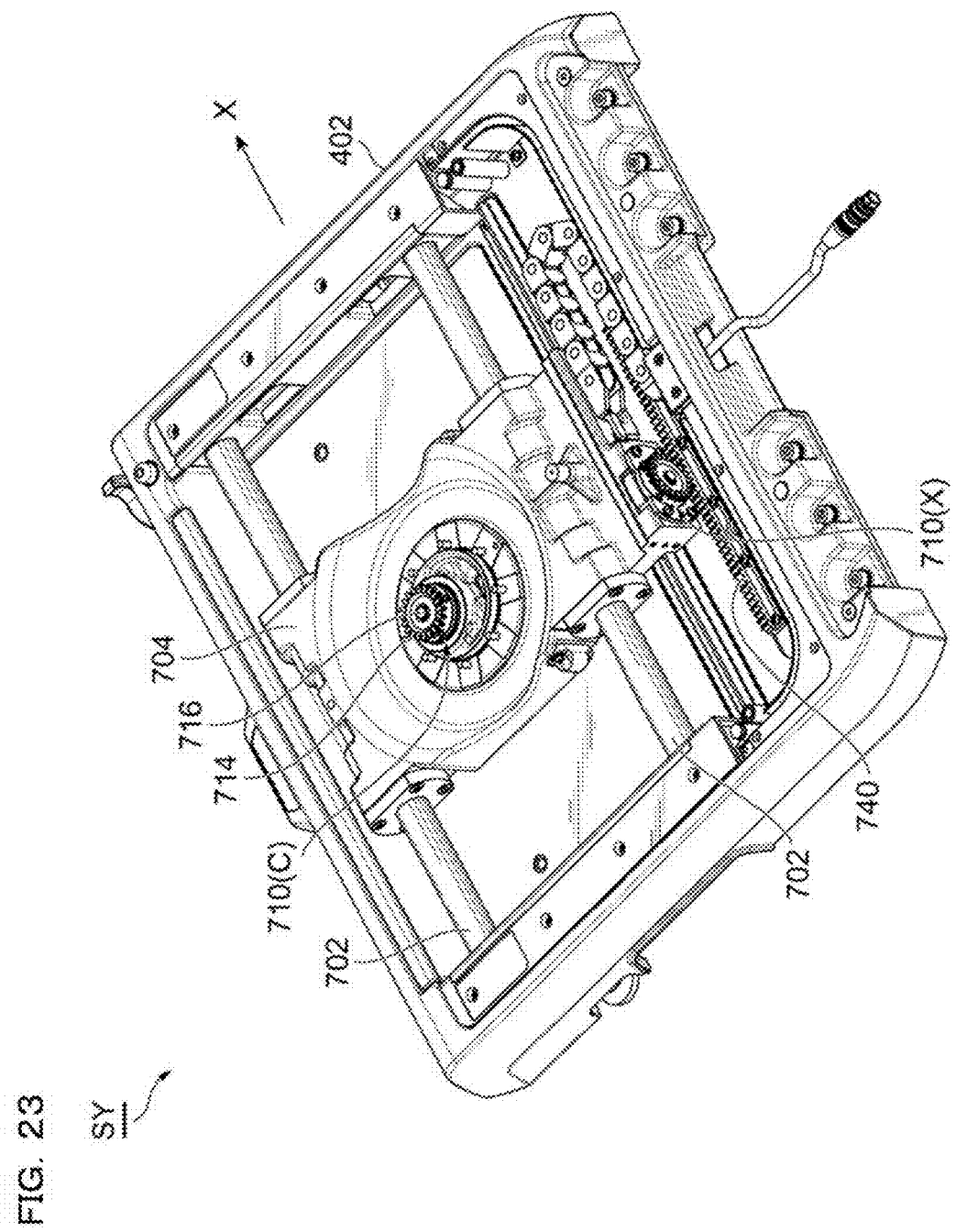
FIG. 23 is a perspective view of the stage unit and illustrates a state in which the table is detached from the stage unit.

Table Displacement Resistance Mechanism:

FIG. 23 illustrates the stage unit SY with the table 400 detached. The stage unit SY includes main resistance mechanism components 710 which relate to displacement of the table 400 in the X-axis direction and the rotation direction around the central axis C. In FIG. 23, in order to distinguish between the main resistance mechanism component relating to the X axis direction and the main resistance mechanism component relating to the rotation direction, a reference sign X is added to the X-axis direction main resistance mechanism component, and a reference sign C is added to the rotation direction main resistance mechanism component. In the embodiment, the X-axis direction main resistance mechanism component 710 (X) and the rotation direction main resistance mechanism component 710 (C) have the same configuration. Of course, the X-axis direction main resistance mechanism component 710 (X) and the rotation direction main resistance mechanism component 710 (C) may have different configurations, or at least either the X-axis direction main resistance mechanism component 710 (X) or the rotation direction main resistance mechanism component 710 (C) may be a resistance mechanism using an oil damper and an electromagnetic fluid.

Figure 24:
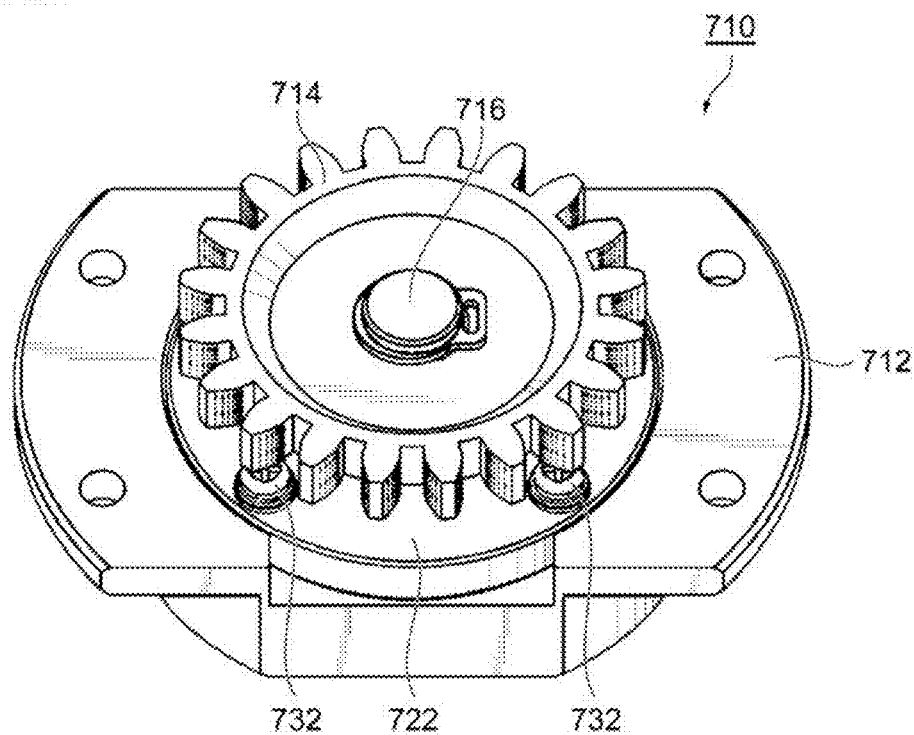
FIG. 24 is a perspective view of a main resistance mechanism component which is a resistance element against displacement of the table.
Figure 25:
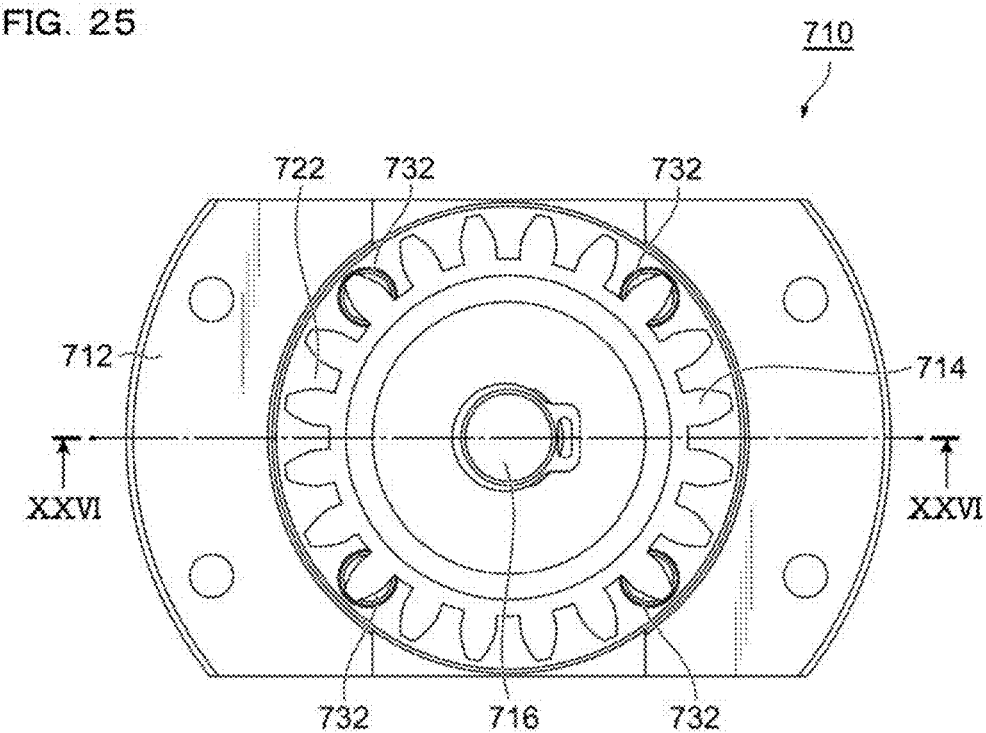
FIG. 25 is a plan view of the main resistance mechanism component.
Figure 26:
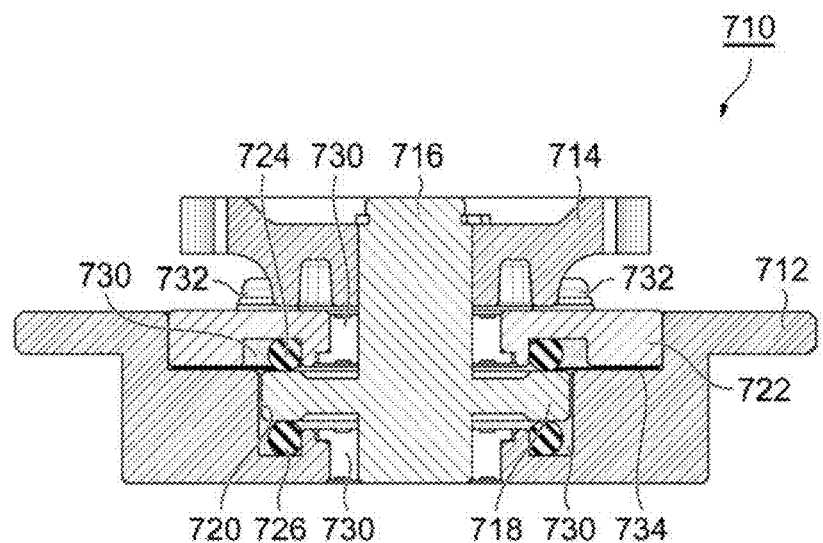
FIG. 26 is a sectional view taken along line XXVI-XXVI of FIG. 25.

The main resistance mechanism component 710 will be described with reference to FIGS. 24 to 26. The main resistance mechanism component 710 includes a case 712 and a gear 714 which is exposed to the outside. The gear 714 is fixed to one end of a shaft 716 which penetrates the case 712. The shaft 716 includes a circumferential flange 718 in an intermediate part in the longitudinal direction thereof (FIG. 26). The case 712 includes a circular recess 720 which houses the circumferential flange 718, and the recess 720 is sealed with a lid member 722.

First and second O-rings 724, 726 which are disposed with the circumferential flange 718 interposed therebetween and a grease 728 are housed in the circular recess 720. A bearing 730 is interposed between the case 712, the lid member 722, and the shaft 716.

The first and second O-rings 724, 726 are pressed against the circumferential flange 718 by fixing the lid member 722 to the case 712 using a plurality of bolts 732. Accordingly, it is possible to resist the rotation of the shaft 716, that is, the gear 714.

Referring to FIG. 26, adjustment of a crushing state of the first and second O-rings 724, 726, that is, a pressure contact force of the first and second O-rings 724, 726 against the circumferential flange 718 may be performed by the thickness or the number of spacer sheet(s) 734 which is interposed between the lid member 722 and the case 712.

Figure 27:
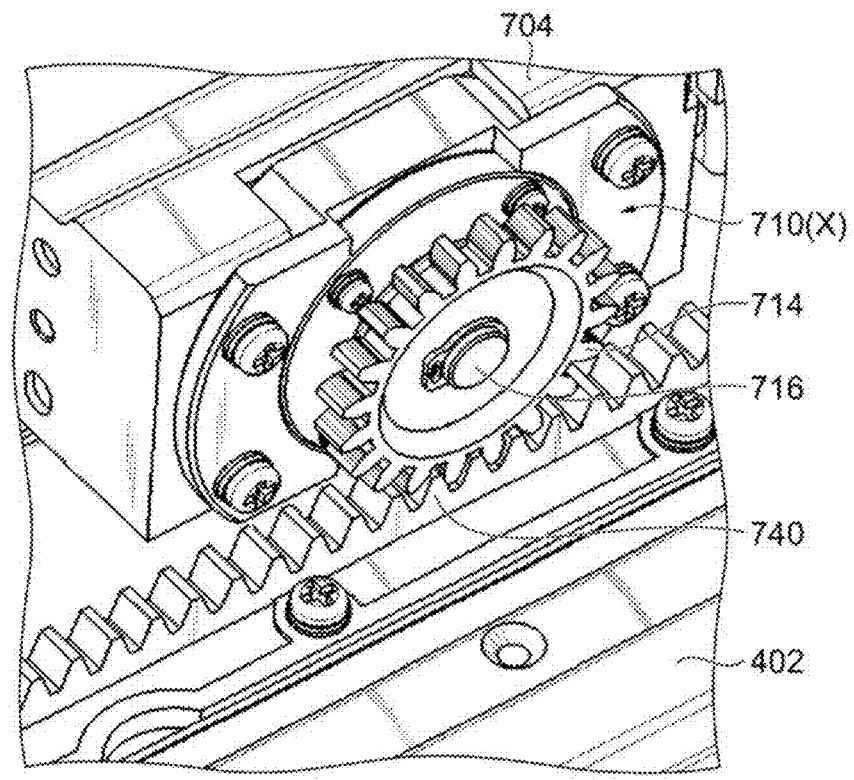
FIG. 27 is a diagram for describing that a gear which is incorporated in the main resistance mechanism component is meshed with a rack member and the main resistance mechanism component acts on the displacement in the X-axis direction of the table.

FIG. 23 illustrates a rack member 740. The rack member 740 is fixed to the stage base 402 and linearly extends in the X-axis direction. The gear 714 of the X-axis direction main resistance mechanism component 710 (X) is meshed with the rack member 740 (FIG. 27). With this configuration, when an external force in the X-axis direction is applied to the table 400, a certain resistance force is generated by the X-axis direction main resistance mechanism component 710 (X) or another resistance mechanism.

Figure 28:
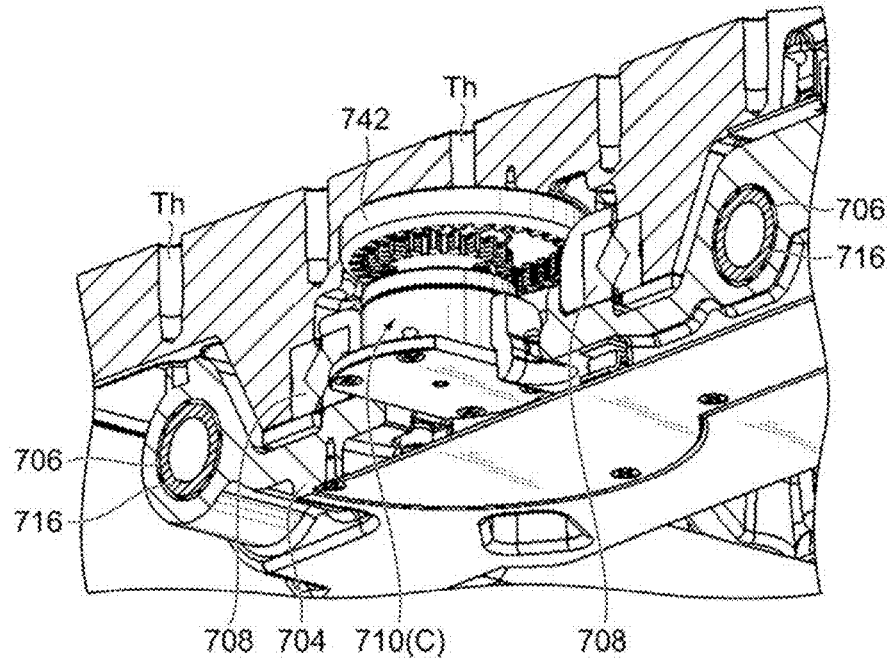
FIG. 28 is a diagram for describing the relationship between the main resistance mechanism component which acts on the rotation of the table and the table.
Figure 29:
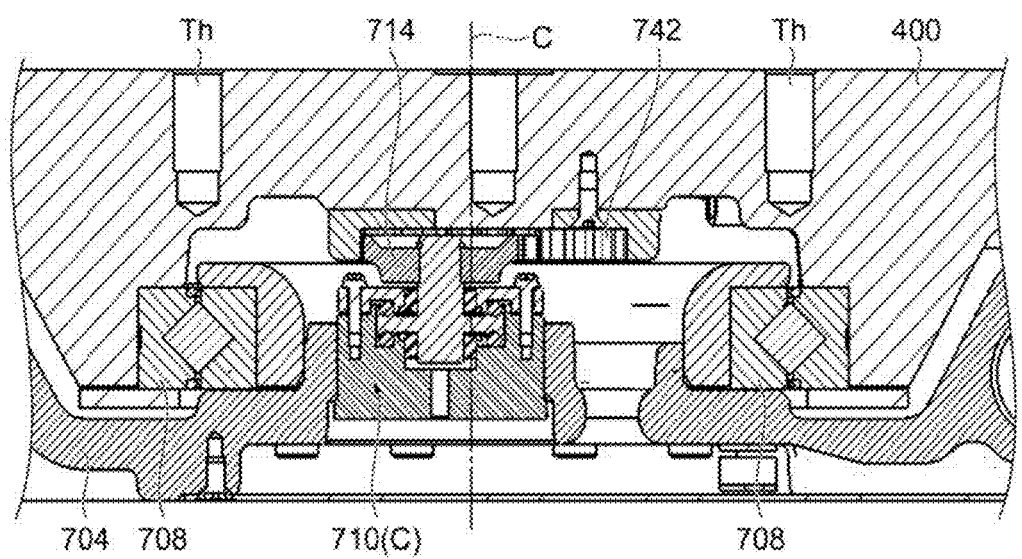
FIG. 29 is a sectional view for describing the relationship between the main resistance mechanism component which acts on the rotation of the table and the table.

FIGS. 28 and 29 illustrate a part that relates to the rotation direction main resistance mechanism component 710 (C) relating to the rotation of the table 400. The gear 714 of the rotation direction main resistance mechanism component 710 (C) is meshed with a part of an internal gear 742 having a large diameter. When an external force is applied to the table 400 in a direction of rotating the table 400 around the central axis C, a certain resistance force is generated by the rotation direction main resistance mechanism component 710 (C) or another resistance mechanism.

With the above configuration, when an external force is applied to the table 400 with the workpiece WP bolted or to the workpiece WP, displacement of the table 400 can be prevented unless the external force is a certain force or more. That is, when an external force is applied to the table 400 in the rotation direction, the table 400 has a certain resistance force.

The resistance force of the table 400 against the external force will be considered. When the contactor 208a of the probe 200 is brought into contact with the workpiece WP, a load when an operator strongly brings the contactor 208a into contact with the workpiece WP is approximately 100 gf. An appropriate load for bringing the contactor 208a into contact with the workpiece WP is approximately 50 gf. It is not desired that the table 400 be displaced while an operator performs an operation of bringing the contactor 208a into contact with the workpiece WP. It is preferred that the table 400 be displaced only when an operator applies an intended force to the table 400 or the workpiece WP and stopped simultaneously with loosening of the force. However, the operability is deteriorated when a large force is required to displace the table 400. The resistance force of the main resistance mechanism component 710 is preferably set or adjusted bearing this in mind. The resistance force of the main resistance mechanism component 710 is preferably set bearing in mind an external force of 500 to 800 gf with which the main resistance mechanism component 710 starts operating. Of course, any mechanism that can achieve this may be employed.

When an operator applies a force to the table 400 in order to displace the table 400 and an X-axis direction component of the operation force by the operator exceeds the above predetermined value, the table 400 is moved in the X-axis direction. That is, the table 400 can be moved in the X-axis direction by intentionally applying a force (whose X-axis direction component is larger than the predetermined value) to the table 400 by an operator. Then, the table 400 is stopped at the instant when the operation force is weakened. The same applies to the rotation of the table 400. Of course, a single operation by an operator can make both an X-axis direction component and a rotation direction component of the operation force higher than the predetermined value. That is, it is also possible to rotate the table 400 while moving the table 400 in the X-axis direction.

Figure 30:
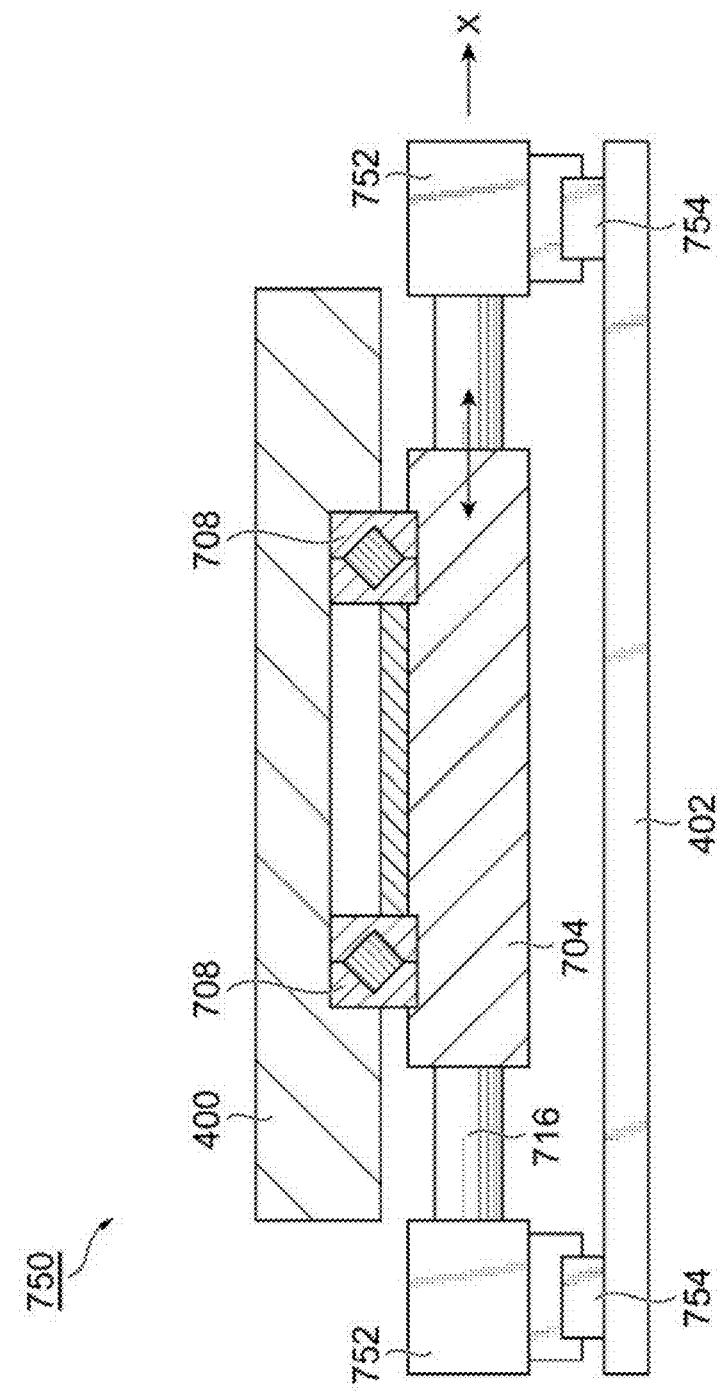
FIG. 30 is a diagram for describing a configuration in which the table is displaceable in the X-axis direction, a rotation direction, and a Y-axis direction as a modification.

Hereinabove, there has been described an example in which the table 400 is displaced in the X-axis direction (the extending direction of the first and second side edges 400a, 400b of the table 400) and in the rotation direction around the central axis C. As a modification, the table 400 may be movable in the Y-axis direction (the front-rear direction: FIG. 9) in addition to the X-axis direction and the rotation direction. FIG. 30 is a diagram for describing a configuration in which the table 400 is displaceable in the X-axis direction, the rotation direction, and the Y-axis direction. Referring to FIG. 30, a stage unit 750 in the modification further includes a pair of Y bases 752 which supports the pair of linear shafts 702 described above and guide rails 754 which guide the respective Y bases 752. The pair of guide rails 754 is fixed to the stage base 402 and extends in the Y-axis direction (the front-rear direction: FIG. 9). Accordingly, the X base 704, that is, the table 400 is movable in the Y-axis direction by being guided by the guide rails 754. Although not illustrated, the main resistance mechanism component 710 described above is preferably interposed between the Y base 750 and the guide rails 754.

Figure 31:
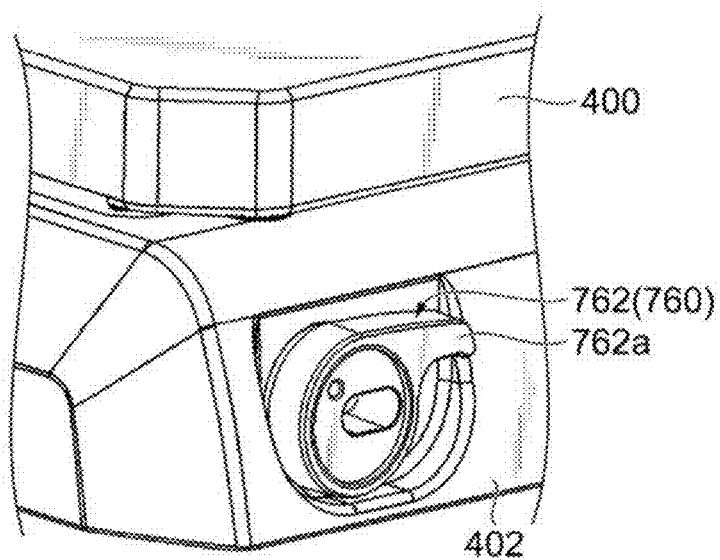
FIG. 31 is a partial perspective view of the stage unit illustrating that an operation lever of a table lock mechanism is disposed at a corner part of the stage unit in which the operation lever is in an unlocking state.
Figure 32:
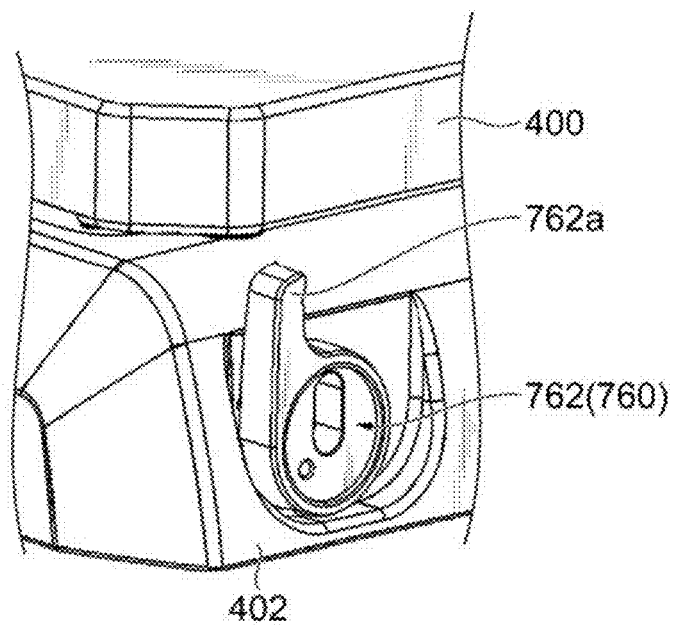
FIG. 32 is a partial perspective view of the stage unit illustrating the operation lever of the table lock mechanism similarly to FIG. 31 in which the operation lever is in a locking state.

Table Lock:

FIGS. 31 to 39 are diagrams relating to a lock mechanism of the table 400. The table 400 is displaceable from the original position as described above. The table 400 is preferably fixable at the original position (FIGS. 1 and 9). The accuracy is higher when the main imaging unit 600 captures an image with the table 400 locked than when the main imaging unit 600 captures an image with the table 400 unfixed. The stage unit SY includes a table lock mechanism 760 for fixing the table 400 at the original position. Referring to FIGS. 31 and 32, the stage base 402 includes an operation lever 762 on one side thereof. The table 400 located at the original position can be locked or unlocked by operating a projection piece 762a of the operation lever 762 by an operator.

Figure 33:
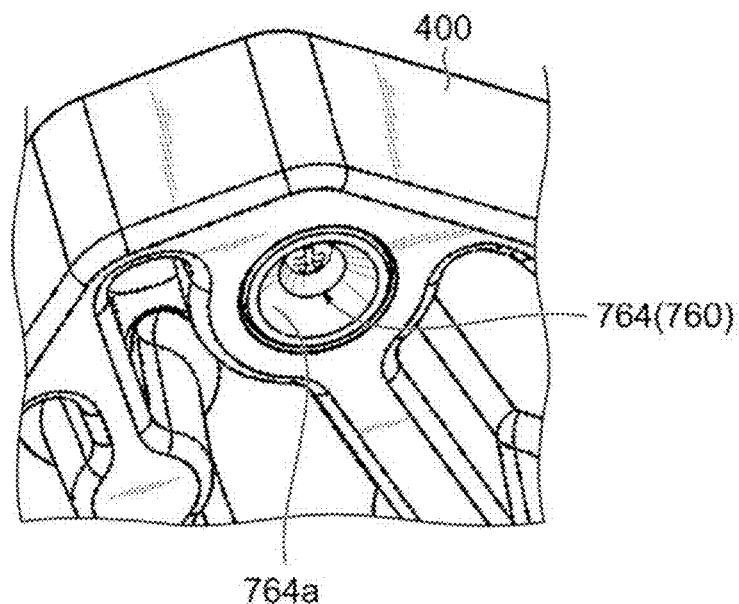
FIG. 33 is a diagram for describing a lock hole which constitutes a part of the table lock mechanism and illustrates the lower face of a corner part of the table.
Figure 34:
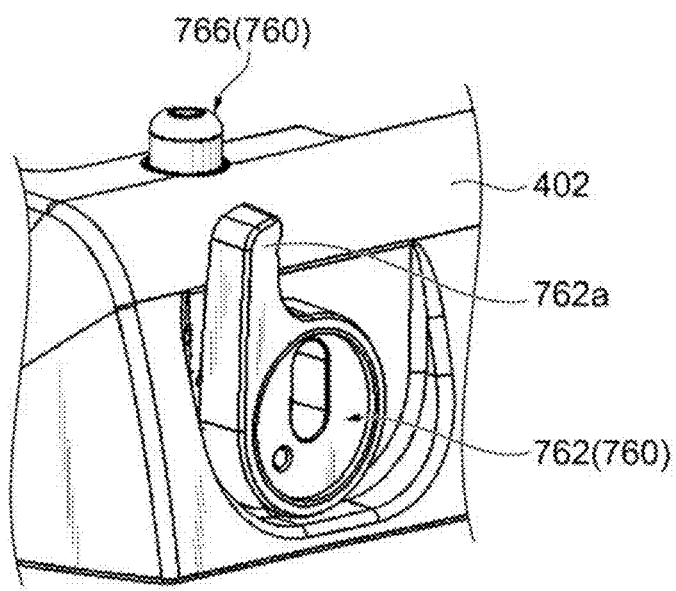
FIG. 34 is a partial perspective view illustrating a corner part of a stage base in which the operation lever is in a locking state and a lock pin projects upward accordingly.

FIG. 31 illustrates an unlocking state in which the projection piece 762a of the operation lever 762 is located at a horizontal position. FIG. 32 illustrates a locking state in which the projection piece 762a of the operation lever 762 is located at a standing position. FIG. 33 is a diagram of a corner part of the lower face of the table 400 viewed from the lower side. The table 400 includes a lock hole 764 which is open downward. The lock hole 764 includes a tapered surface 764a on the opening end, that is, the lower end part thereof. The stage base 402 includes a lock pin 766 which is projectable toward the lock hole 764 (FIG. 34). The lock pin 766 is disposed at a position corresponding to the lock hole 764 of the table 400 at the original position.

Figure 35:
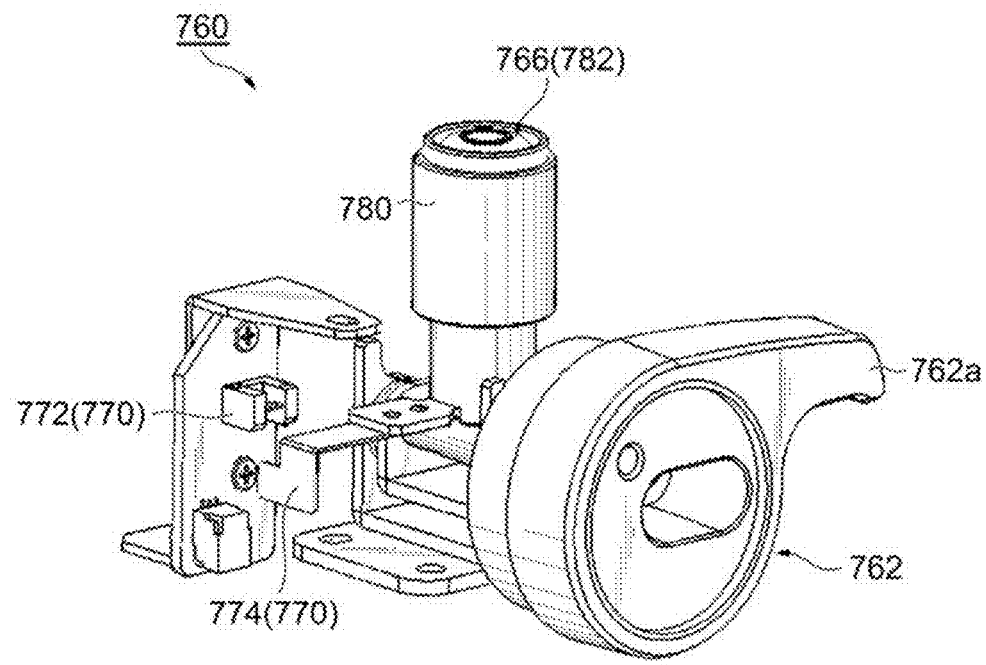
FIG. 35 is an entire configuration diagram of the table lock mechanism and illustrates an unlocking state.
Figure 36:
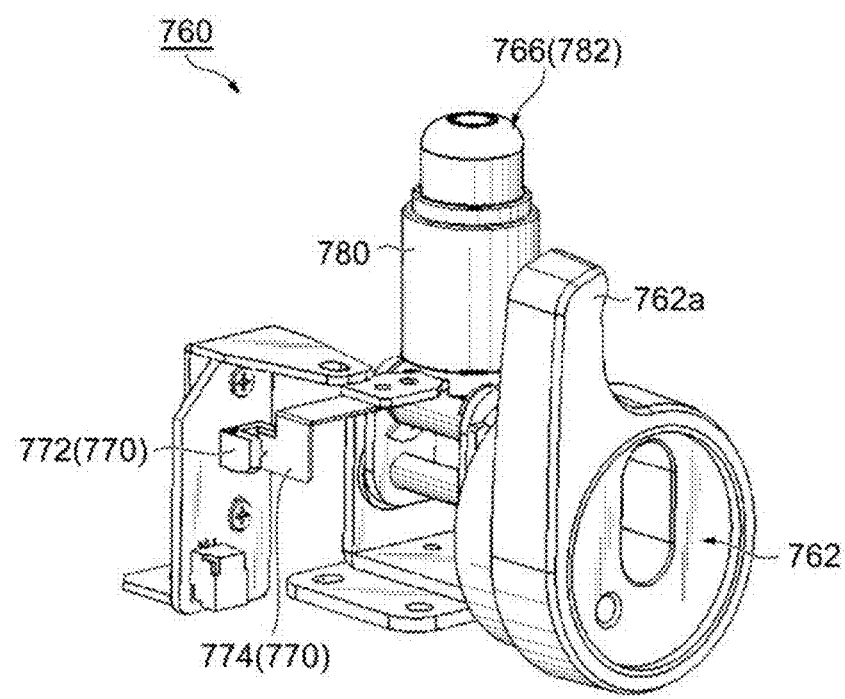
FIG. 36 is an entire configuration diagram of the table lock mechanism and illustrates a locking state.

FIGS. 35 and 36 are diagrams illustrating the operation lever 762 and the lock pin 766 in an extracted manner. FIG. 35 illustrates a state in which the operation lever 762 is positioned at an unlocking position. FIG. 36 illustrates a state in which the operation lever 762 is positioned at a locking position. Referring to FIGS. 35 and 36, a lock detection mechanism 770 which detects a state of the operation lever 762, that is, a locked state of the table 400 is incorporated in the stage base 402. The lock detection mechanism 770 includes a light emitting/receiving element 772 and a plate 774 which blocks light of the light emitting/receiving element 772. The light blocking plate 774 is mechanically connected to the operation lever 762. When the operation lever 774 is located at the unlocking position, the light blocking plate 774 is located away from the light emitting/receiving element 772 (FIG. 35). When the operation lever 774 is located at the locking position, the light blocking plate 774 is inserted into the light emitting/receiving element 772 and blocks light (FIG. 36). A locked and/or unlocked state detected by the lock detection mechanism 770 can be recognized by an operator, in particular, a site worker by, for example, turning on/off an indicator (not illustrated).

Figure 37A:
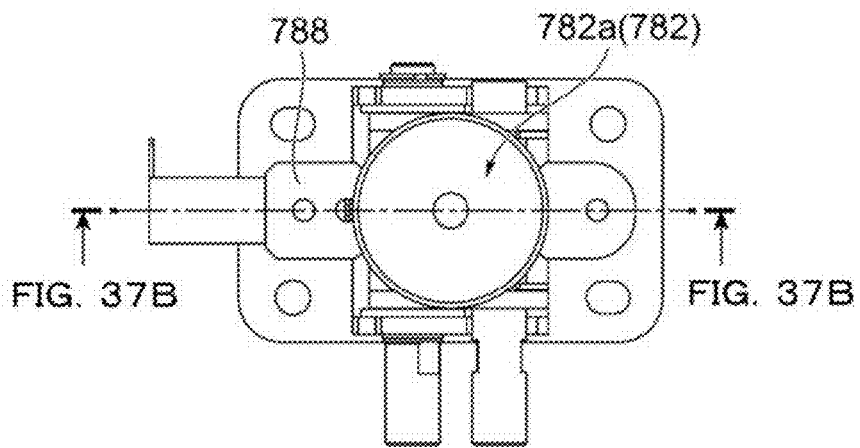
Figure 37B:
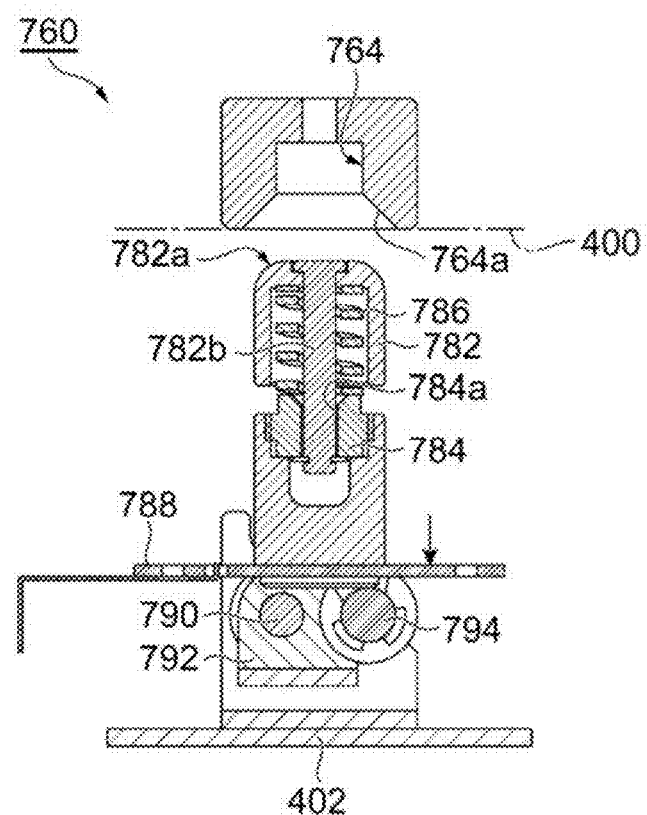
Figure 38A:
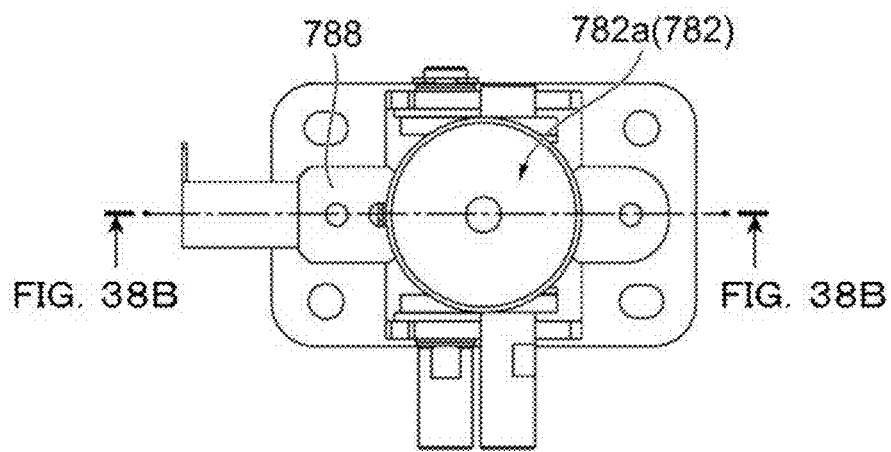
Figure 38B:
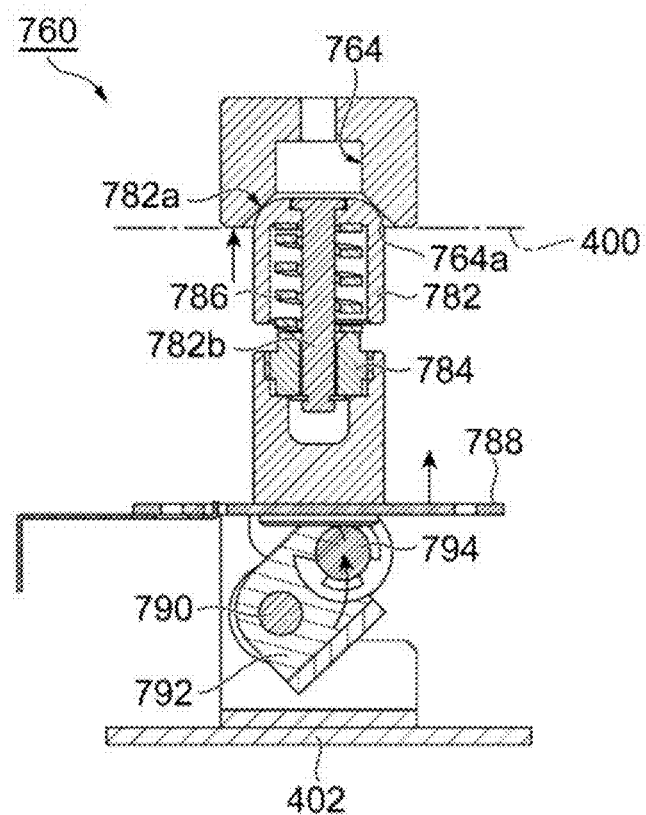
Figure 39A:
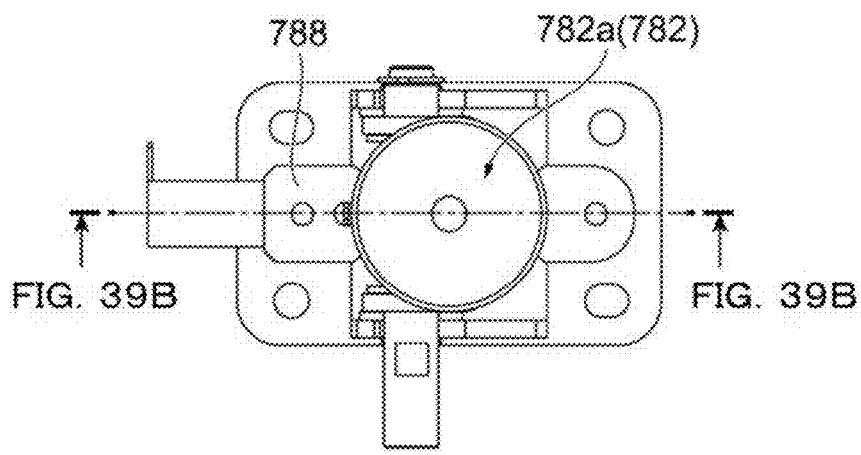
Figure 39B:
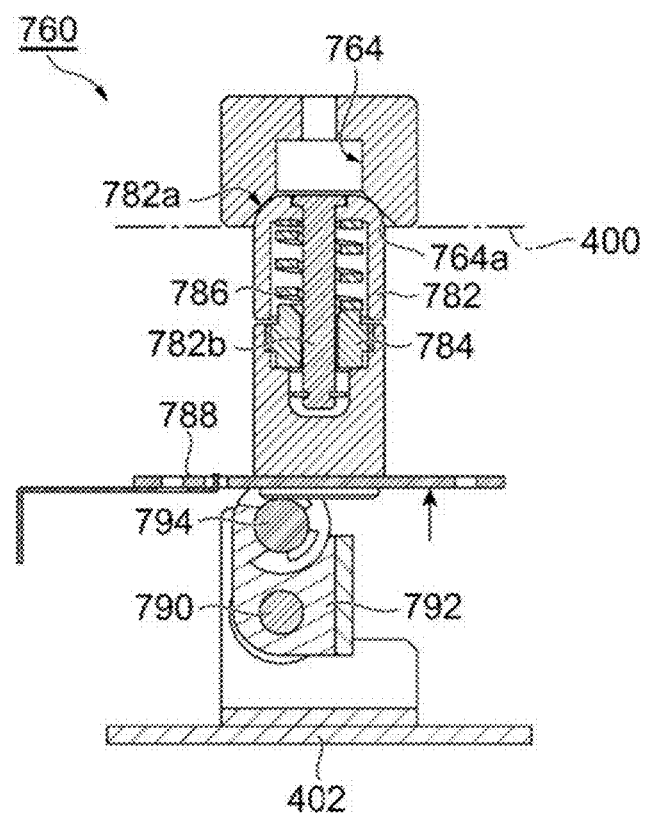

FIGS. 37(A) and 37(B) are diagrams for describing a state of the lock pin 766 when the operation lever 762 is located at the unlocking position (FIG. 31). FIGS. 38(A) and 38(B) are diagrams for describing a state of the lock pin 766 immediately after the operation lever 762 is positioned at the locking position (FIG. 32). FIGS. 39(A) and 39(B) are diagrams for describing a state in which the operation lever 762 is positioned at the locking position (FIG. 32) and the table 400 remains fixed by the lock pin 766.

FIGS. 37(A) to 39(A) are plan views of the lock pin 766 viewed from the upper side and FIGS. 37(B) to 39(B) are sectional views of the lock pin 766. The lock pin 766 includes a pin head 782 which is surrounded by a sleeve 780 (FIGS. 35 and 36). In FIGS. 37 to 39, the sleeve 780 is not illustrated. The pin head 782 has a shape having a chamfered tip edge part 782a. The pin head 782 includes a shaft part 782b which extends downward. The shaft part 782b is received by a guide hole 784a of a base member 784 and movable up and down along the axis of the shaft part 782b.

The pin head 782 is biased upward by a spring 786. The base member 784 is fixed to a base plate 788, and the base plate 788 is mechanically coupled to the operation lever 762. When the operation lever 762 is located at the unlocking position, the base plate 788 is positioned at a lower position (FIGS. 37(A) and 37(B)). When the operation lever 762 is operated to the locking position, the base plate 788 is displaced upward and positioned at an upper position (FIGS. 38(A) and 38(B), FIGS. 39(A) and 39(B)).

FIG. 37(B) illustrates a first shaft 790 which is fixed on the stage base 402. One end of a swing link 792 is pivotably supported on the first shaft 790. The other end of the swing link 792 is pivotably supported on a second shaft 794. The second shaft 794 is mechanically connected to the operation lever 762. Referring to FIGS. 37(A) and 37(B), when the operation lever 762 is located at the unlocking position (FIG. 35) as described above, the second shaft 794 is positioned at a lower position, and the base plate 788 is positioned at the lower position accordingly. Accordingly, the base member 784 and the pin head 782 are positioned at lower positions. That is, the pin head 782 is positioned at an unlocking position which is away from the lower face of the table 400. Thus, the table 400 is released from the pin head 782 and thus displaceable in, for example, the X-axis direction.

Referring to FIGS. 38(A) and 38(B), when the operation lever 762 is operated in a locking direction, the second shaft 794 is lifted and the base plate 788 moves upward. Accordingly, the base member 784 and the pin head 782 move upward, and the pin head 782 enters the inside of the lock hole 764 of the table 400. The tip edge part 782a of the pin head 782 has a chamfered shape, and the lock hole 764 has the tapered surface 764a. Thus, the pin head 782 is guided by the tapered surface 764a so as to enter the lock hole 764.

Referring to FIGS. 39(A) and 39(B), when the operation lever 762 is located at the locking position (FIG. 36) as described above, the base plate 788 is positioned at the upper position by the second shaft 794. Accordingly, the base member 784 and the pin head 782 are positioned at upper positions. The pin head 782 is pushed up, enters the inside of the lock hole 764 of the table 400, and is then positioned. The tip edge part 782a of the pin head 782 has a chamfered shape, and the lock hole 764 has the tapered surface 764a. Thus, the pin head 782 is positioned by the tapered surface 764a of the lock hole 764. In this state, the spring 786 is in a compressed state. Accordingly, the table 400 remains fixed at the original position by the pin head 782.

Operation of Optical Three-Dimensional Coordinate Measuring Device:

Referring to FIGS. 40A and 40B and FIGS. 41A and 41B, the illustrated workpiece WP has a rectangular parallelepiped shape. An operation of the optical three-dimensional coordinate measuring device CMI will be described with an example of measuring the distance between one end face Sa of the workpiece WP and the other end face Sb which is opposite to the one end face Sa using the measurement device CMI.

Figure 40A:
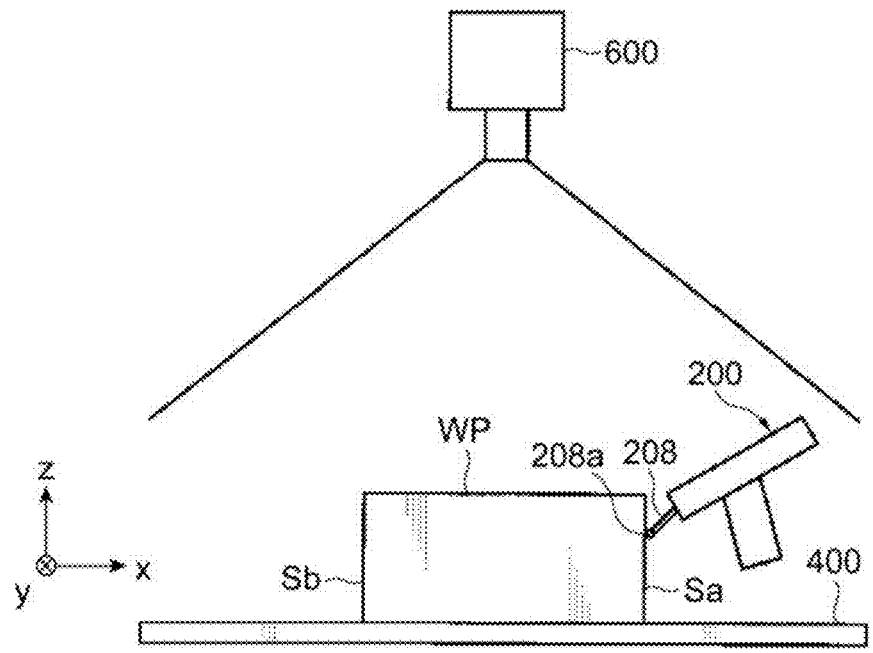
Figure 40B:
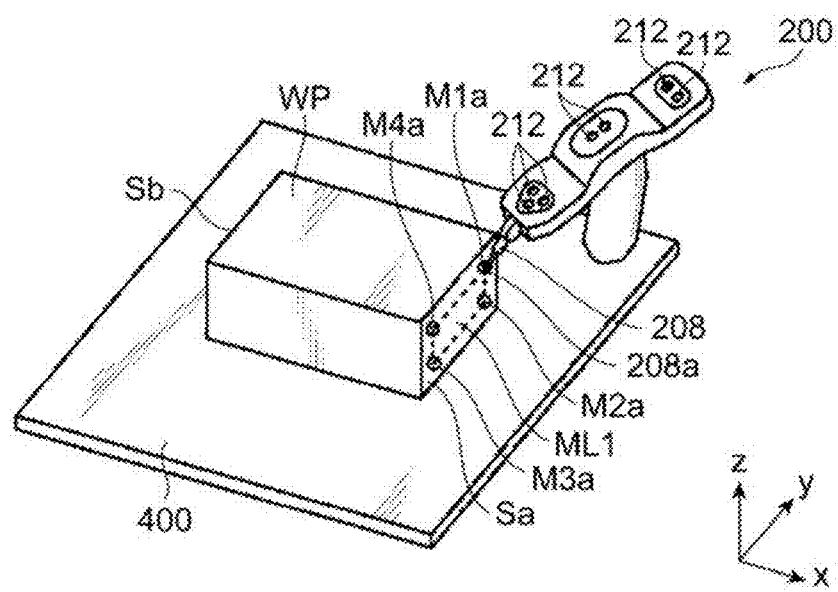

(1) Referring to FIGS. 40A and 40B, an operator grips the probe 200, brings the contactor 208a into contact with the one end face Sa of the workpiece WP, and operates the main body operation unit 300 (FIG. 1) to capture an image of the probe markers 212 by the main imaging unit 600, so that coordinates of a contact point of the contactor 208a are calculated on the basis of the image. A first contact point on the one end face Sa is denoted by M1a (FIG. 40B).

(2) Relative position coordinates (first relative position coordinates) of at least two contact points, for example, three contact points including a second contact point M2a, a third contact point M3a, and a fourth contact point M4a are calculated by sequentially changing the contact point of the contactor 208a of the probe 200 and performing the same operation as the operation to the first contact point M1a for each contact point on the one end face Sa of the workpiece WP.

(3) A first measurement plane ML1 corresponding to the one end face Sa of the workpiece WP is set on the basis of the above four contact points M1a to M4a (FIG. 40B) and a plane of a geometrical element.

Figure 41A:
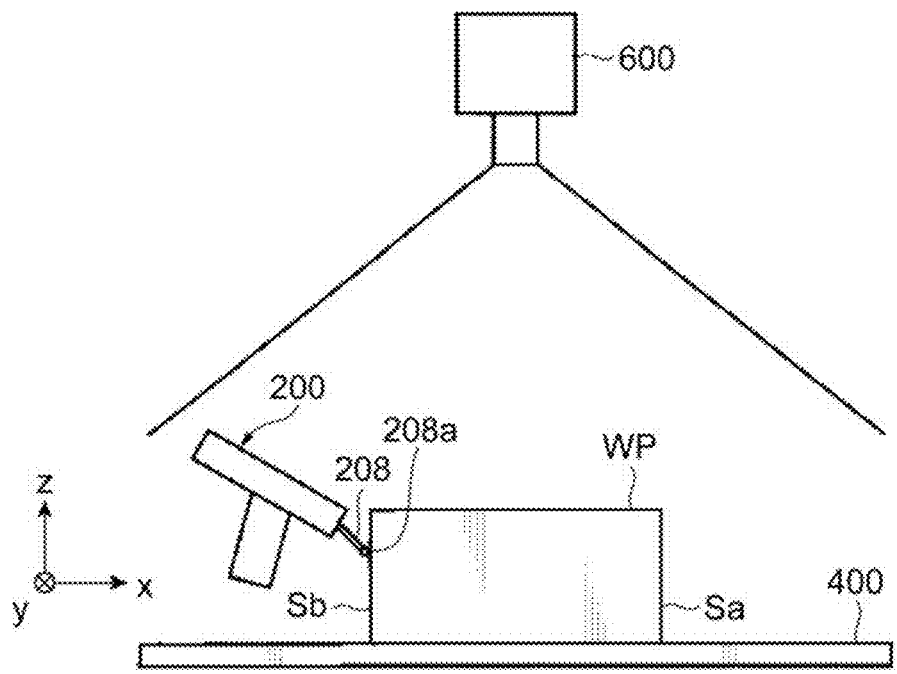
Figure 41B:
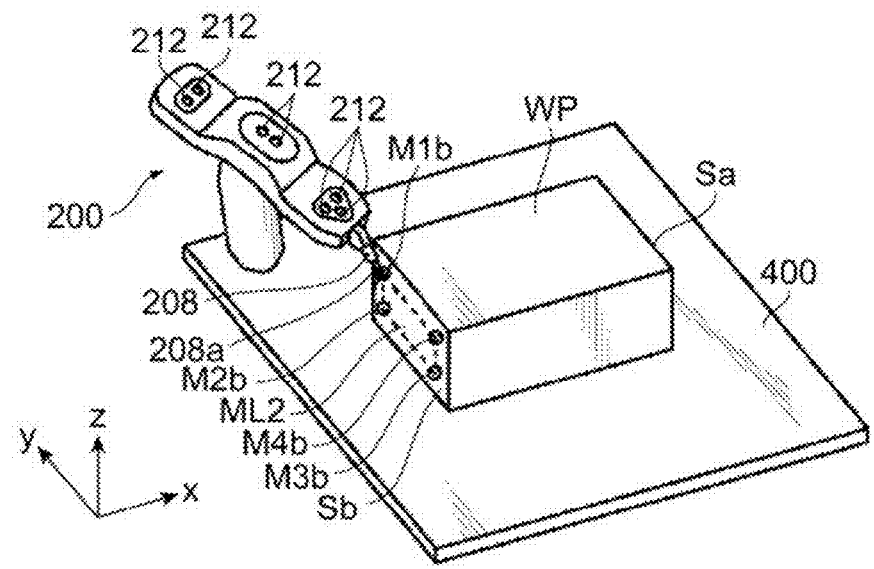

(4) Referring to FIGS. 41A and 41B, the operator then brings the contactor 208a into contact with the other end face Sb of the workpiece WP and operates the main body operation unit 300 (FIG. 1) to capture an image of the probe markers 212 by the main imaging unit 600, so that coordinates of a contact point of the contactor 208a are calculated on the basis of the captured image. A first contact point on the other end face Sb is denoted by M1b.

(5) Relative position coordinates (second relative position coordinates) of at least two contact points, for example, three contact points including a second contact point M2b, a third contact point M3b, and a fourth contact point M4b are calculated by sequentially changing the contact point of the contactor 208a of the probe 200 and performing the same operation as the operation to the first contact point M1b for each contact point on the other end face Sb of the workpiece WP.

(6) A second measurement plane ML2 corresponding to the other end face Sb of the workpiece WP is set on the basis of the above four contact points M1b to M4b and a plane of a geometrical element (FIG. 41B).

Then, the operator operates the main body operation unit 300 (FIG. 1) or the operation unit 6 (FIG. 2) of the personal computer PC to thereby measure the distance between the first measurement plane ML1 and the second measurement plane ML2. That is, the distance between the first measurement plane ML1 and the second measurement plane ML2 is measured on the basis of the relative positions of the first and second geometrical elements.

As described above, the table 400 is displaceable. When the table 400 is, for example, translated between a first step of obtaining the first measurement plane ML1 and a second step of obtaining the second measurement plane ML2, the distance between the first measurement plane ML1, the second measurement plane ML2, and the second measurement plane ML2 on the basis of the first relative position coordinates, the second relative position coordinates, and the previously set planes, that is, the first measurement plane ML1 and the second measurement plane ML2.

In the process of the above measurement operation, an operator can use the sub imaging unit 210 (FIG. 4) which is disposed on the tip part of the probe 200 as needed. The sub imaging unit 210 is installed on the front end face of the marker installation part 204 which extends in the front-rear direction of the probe 200 and thus capable of capturing an image of the front region of the probe 200. Accordingly, it is possible to acquire the whole view of the one end face Sa and the other end face Sb of the workpiece WP.

Further, the table 400 can be displaced according to the process of the above measurement operation. For example, when the workpiece WP is a long object, the probe markers 212 can be brought into a visual field of the main imaging unit 600 by moving the table 400 in the X-axis direction. That is, a large workpiece WP can be measured by the relatively compact optical three-dimensional coordinate measuring device CMI. Further, when a local part such as a recess of the workpiece WP is measured, the table 400 can be displaced so as to acquire an excellent image by the main imaging unit 600. Accordingly, a captured image that is easily processed can be acquired. This makes it possible to contribute to an improvement of the measurement accuracy.

For the displacement of the table 400 from the original position, as described above, an image of the stage markers 410 of the stage marker unit 412 which is mounted on the table 400 is captured by the main imaging unit 600, and the displacement direction and the displacement amount of the table 400 can be substantially detected on the basis of the captured image. As a modification, the sensor 800 (FIG. 2) such as an encoder may be used to detect the displacement amount or the attitude of the table 400. A person skilled in the art can easily understand that the above idea regarding displacing the table 400 from the original position is applicable to a conventional arm type three-dimensional coordinate measuring device which is provided with a probe on the tip of a multi-articulated arm.

According to the optical three-dimensional coordinate measuring device CMI of the embodiment, the table 400 is movable and includes the stage markers 410. Further, referring to FIG. 2, the optical three-dimensional coordinate measuring device CMI includes the main imaging unit 600 which captures an image of the probe markers 212 and further includes the sub imaging unit 210 on the tip part of the probe 200. It is possible to provide various pieces of information to a worker using an image acquired by the sub imaging unit 210. Further, it is possible to provide information that proves that a measurement operation has been appropriately performed by storing or outputting the image.

GUI:

The optical three-dimensional coordinate measuring device CMI further includes the display unit 500 (FIG. 1). It is possible to provide various piece of information to a worker using the display unit 500. The optical three-dimensional coordinate measuring device CMI is intended to be installed in a site of a production line to be used.

The optical three-dimensional coordinate measuring device CMI is designed so as to be operable even by a worker in a manufacturing site. Thus, an operator who makes access to the optical three-dimensional coordinate measuring device CMI is not limited to a person who has full knowledge of how to use the optical three-dimensional coordinate measuring device CMI. It is desired to perform GUI display using the display unit 500 (FIG. 1) so that even a worker in the manufacturing site can use the optical three-dimensional coordinate measuring device CMI.

In the optical three-dimensional coordinate measuring device CMI, the GUI using the display unit 500 includes a first display mode ("administrator mode") for a person who has full knowledge of how to use the optical three-dimensional coordinate measuring device CMI, that is, an administrator and a second display mode ("measurement display mode") which includes a guidance screen which guides the operation of a measurement operation for a site worker and is used when performing measurement. For example, the administrator mode and the measurement display mode can be switched using a button (not illustrated) which is displayed on the display unit 500.

It is possible to perform various settings (guidance settings) for guiding a measurement operation so that a site worker can easily execute an operation of the measurement operation by using the administrator mode. For example, a captured image ("guidance image") which is captured by the sub imaging unit 210 is displayed on the display unit 500, and a point that should be measured by a worker and a point that should be brought into contact with the contactor 208a are displayed on the guidance image in a superimposed manner. The worker can know a point that should be brought into contact with the contactor 208a next by viewing the display unit 500. Further, it is possible to provide information indicating an appropriate direction and an appropriate degree of displacement of the table 400 to the worker by imparting a function of moving the display of a captured image captured by the sub imaging unit 210 in accordance with the operation by the worker.

Figure 42:
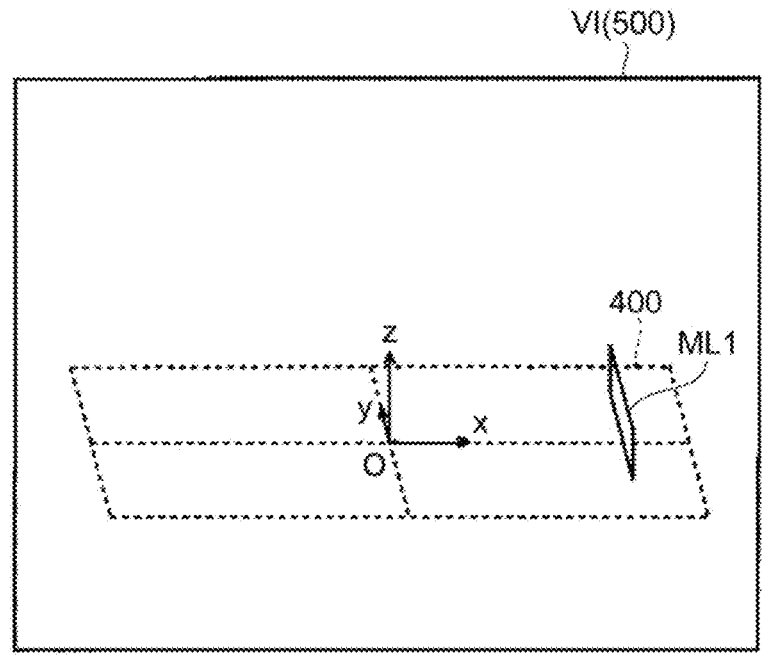
FIG. 42 is a diagram for describing an example in which the first measurement plane described with reference to FIGS. 40A and 40B is displayed on a display unit which is included in the optical three-dimensional coordinate measuring device of the embodiment.

An example of display during a measurement operation will be described with reference to FIG. 42. FIG. 42 is an image which is displayed when the first measurement plane ML1 corresponding to the one end face Sa of the workpiece WP is obtained. FIG. 42 illustrates a measurement region virtual image VI which is displayed on the display unit 500. The measurement region virtual image VI virtually represents a visual field region of the main imaging unit 600. In the measurement region virtual image VI, the origin, the X axis, the Y axis, and the Z axis of the absolute coordinate system are defined. That is, the X axis and the Y axis are set so as to be parallel to the upper face of the table 400 at the original position and perpendicular to each other, and the Z axis is set so as to be perpendicular to the upper face of the table 400. Further, the center of the table 400 at the original position is set at the origin O. Then, the first measurement plane ML1 corresponding to the one end face Sa of the workpiece WP is displayed on the measurement region virtual image VI in a superimposed manner.

Figure 43:
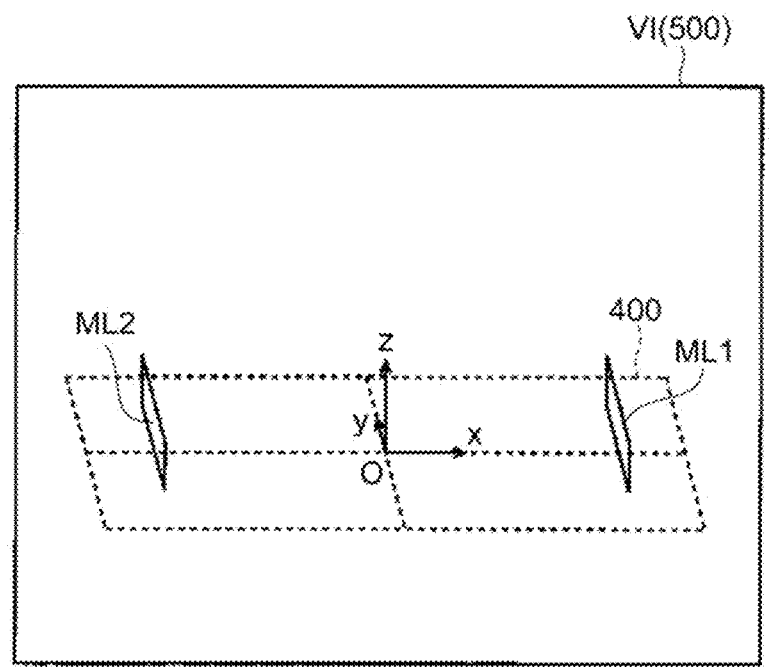
FIG. 43 is a diagram for describing an example in which the second measurement plane described with reference to FIGS. 41A and 41B is displayed on the display unit which is included in the optical three-dimensional coordinate measuring device of the embodiment.

FIG. 43 is an image which is displayed when the second measurement plane ML2 corresponding to the other end face Sb of the workpiece WP is obtained. Referring to FIG. 43, the second measurement plane ML2 corresponding to the other end face Sb is created on the basis of the absolute coordinate system and displayed on the measurement region virtual image VI on the display unit 500 in a superimposed manner together with the first measurement plane ML1 corresponding to the one end face Sa of the workpiece WP.

Figure 44:
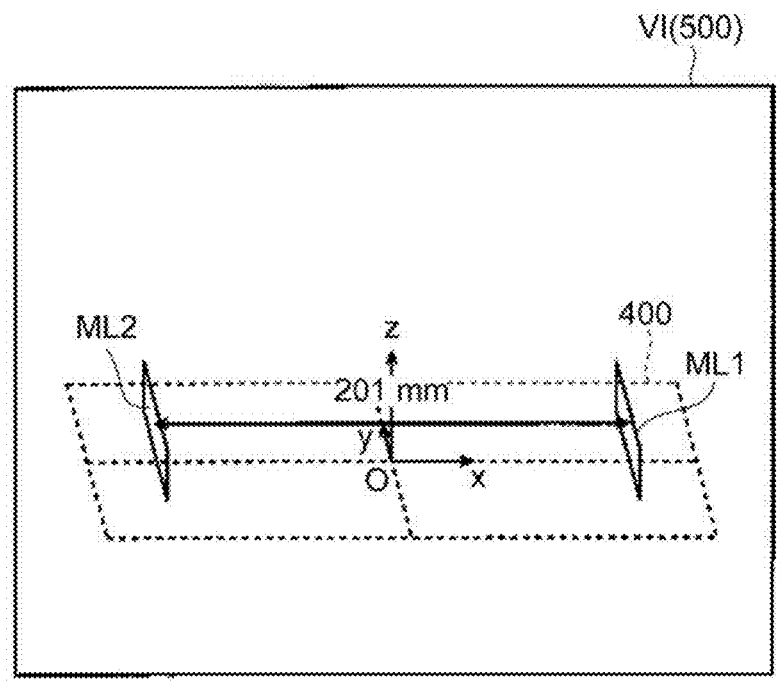
FIG. 44 is a diagram for describing an example in which the first and second measurement planes and an actually-measured distance between the first and second measurement planes are displayed on the display unit which is included in the optical three-dimensional coordinate measuring device of the embodiment.

FIG. 44 illustrates an image which is displayed after the distance between the first measurement plane ML1 and the second measurement plane ML2 is obtained. As can be understood from FIG. 44, together with the display of the first measurement plane ML1 and the second measurement plane ML2, a numerical value "201 mm" which indicates the distance between the first measurement plane ML1 and the second measurement plane ML2 is displayed in a superimposed manner together with an arrow. It is needless to say that whether the distance "201 mm" is appropriate is determined on the basis of a design drawing of the workpiece WP.

Figure 45:
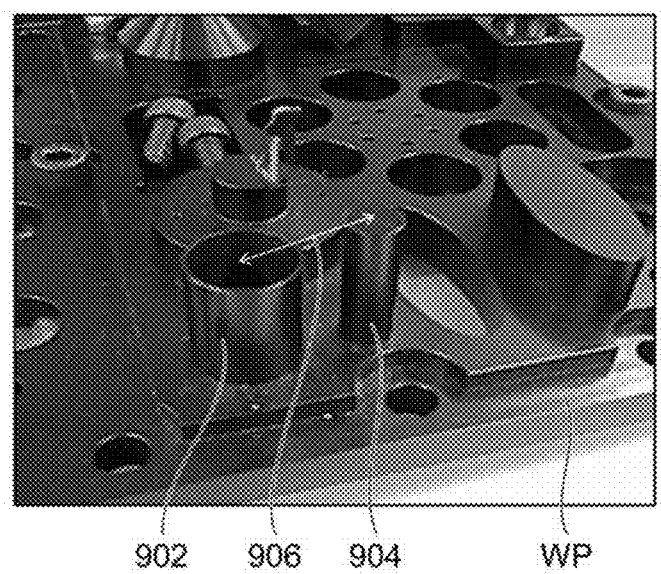
FIG. 45 is a photograph illustrating an example of a guidance image which is displayed on the display unit during an operation of measuring a center distance between two cylindrical parts which are included in the workpiece.

Referring to FIG. 45, a procedure in a program mode will be described as follows with an example in which two cylindrical parts 902, 904 which are included in the workpiece WP are measured and a center distance therebetween, that is, the distance (an arrow 906 in FIG. 45) between a first axis of the first cylindrical part 902 and a second axis of the second cylindrical part 904 is measured.

(1) The workpiece WP is fixed to the table 400.

(2) A relative coordinate system based on a measurement reference plane of the workpiece WP is set. The setting of the relative coordinate system will be described below.

(3) A measurement element, that is, a circle (cylinder) is set.

(4) A guidance image, that is, a local captured image is acquired using the sub imaging unit 210.

(5) The above (2) and (3) (and (4) in some cases) are repeatedly performed to measure a measurement element, that is, the two cylindrical parts, and a measurement item "center distance" is set to create a distance element.

(6) After completion of the above series of setting operations, a program mode file is stored in the storage unit 2 (FIG. 2) of the personal computer PC.

Any plane can be designated as the measurement reference plane of the second step (2).

Figure 47:
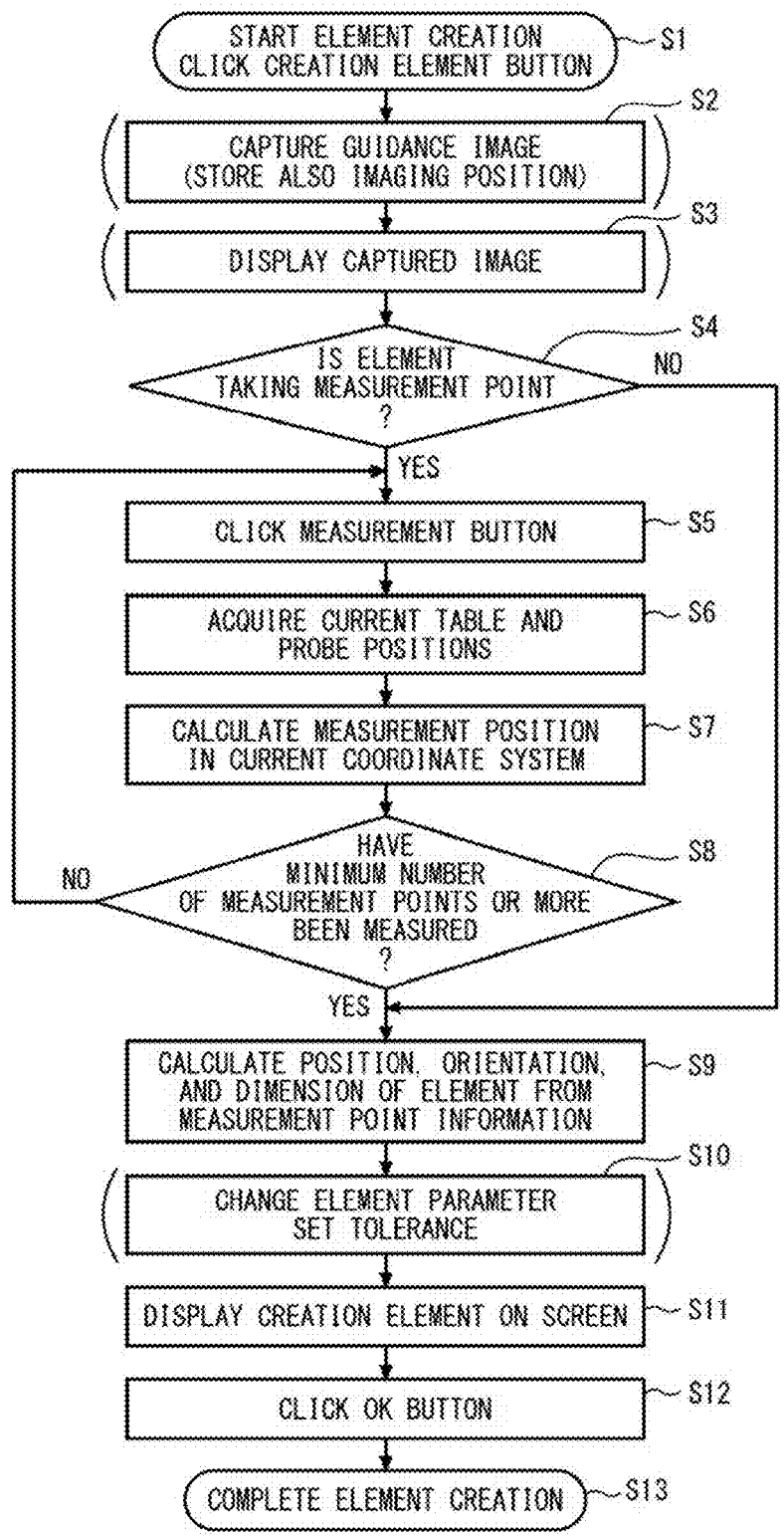
FIG. 47 is a flowchart for describing a procedure of the measurement relating to the two cylindrical parts which are included in the workpiece.
Figure 48:
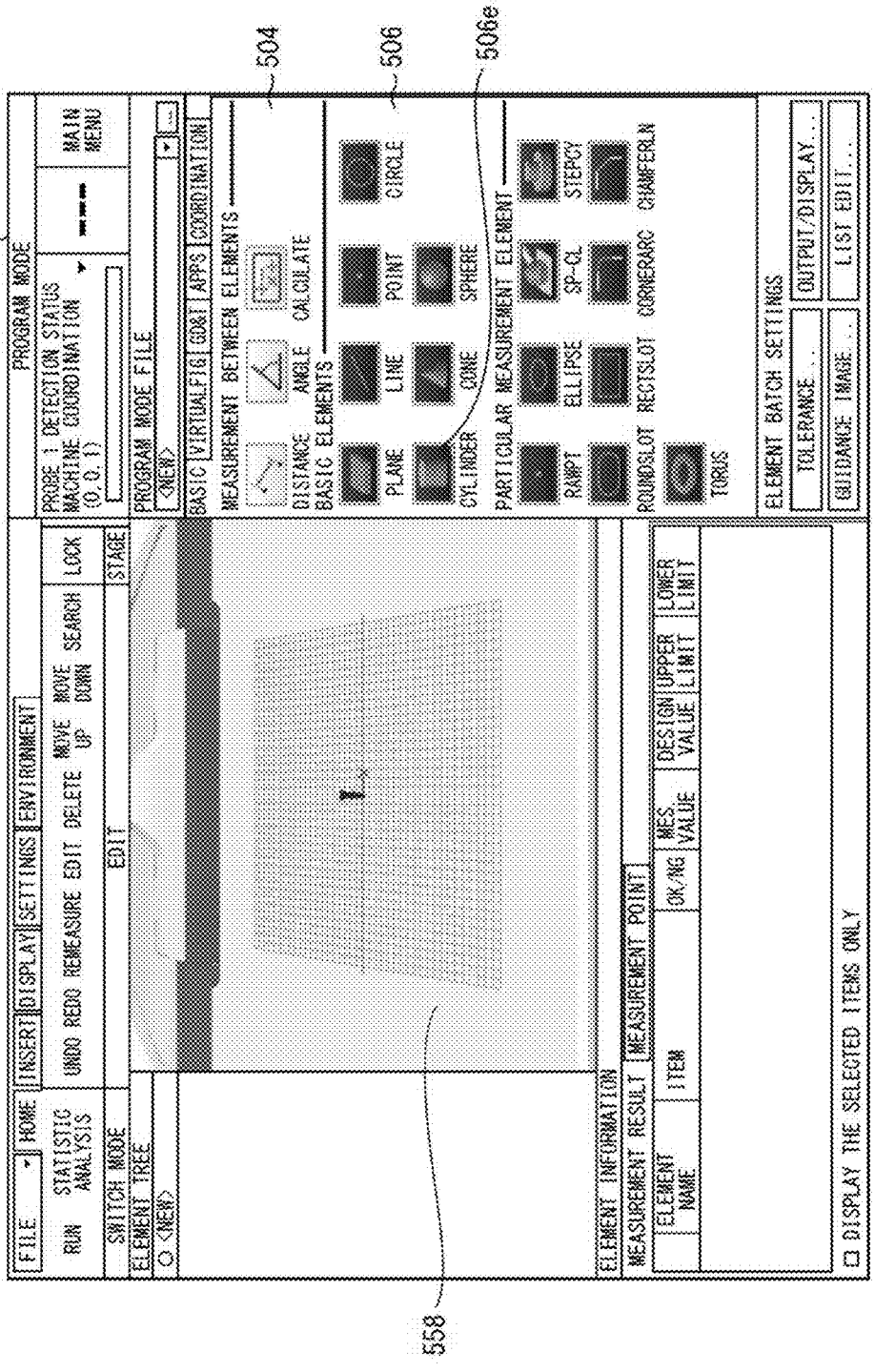
FIG. 48 is a diagram illustrating an example of a measurement condition setting screen regarding the measurement relating to the two cylindrical parts which are included in the workpiece.
Figure 49:
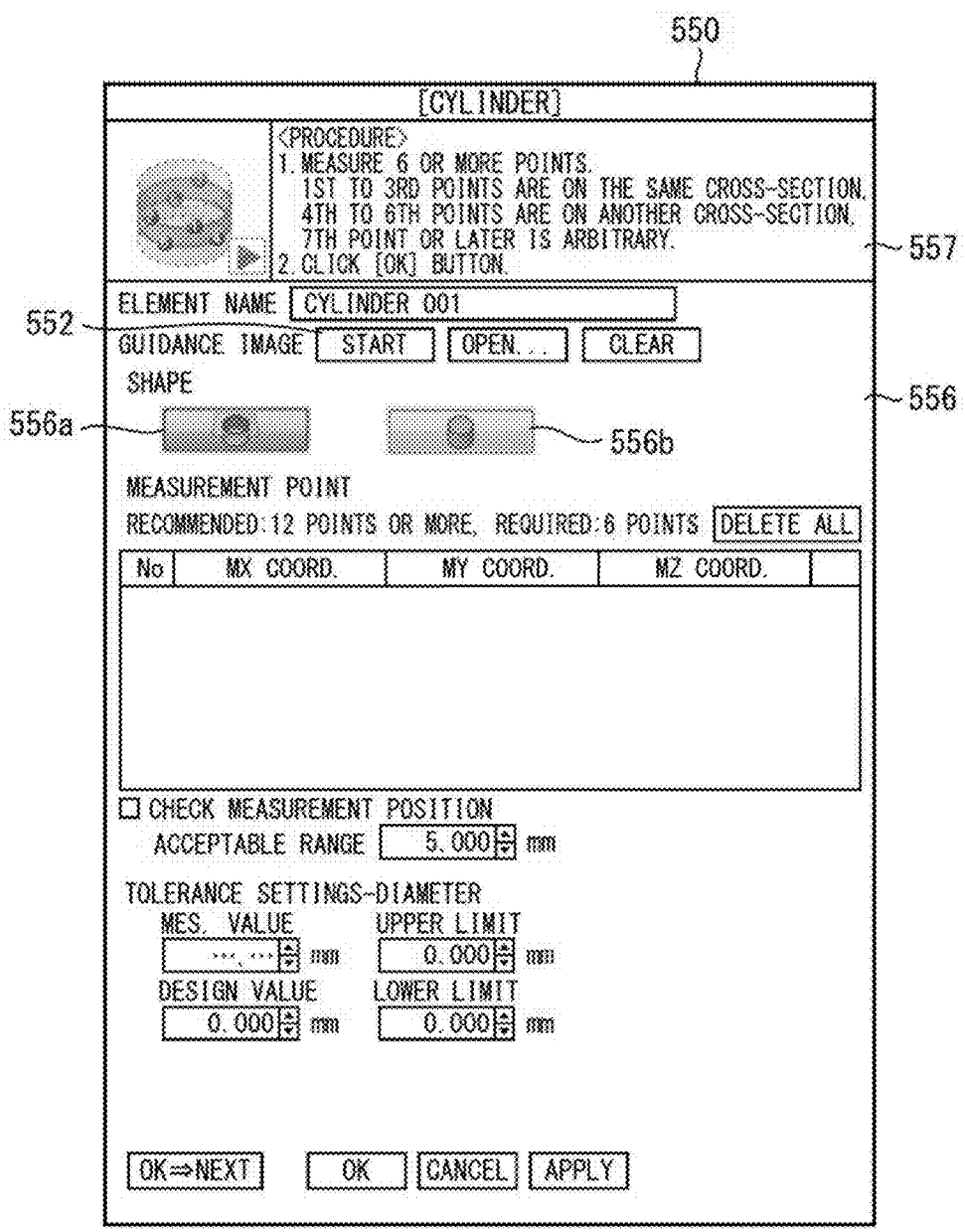
FIG. 49 is a diagram illustrating a display example of a cylinder file which is displayed by selecting one (cylinder) of a plurality of alternatives included in the measurement condition setting screen of FIG. 48.
Figure 50:
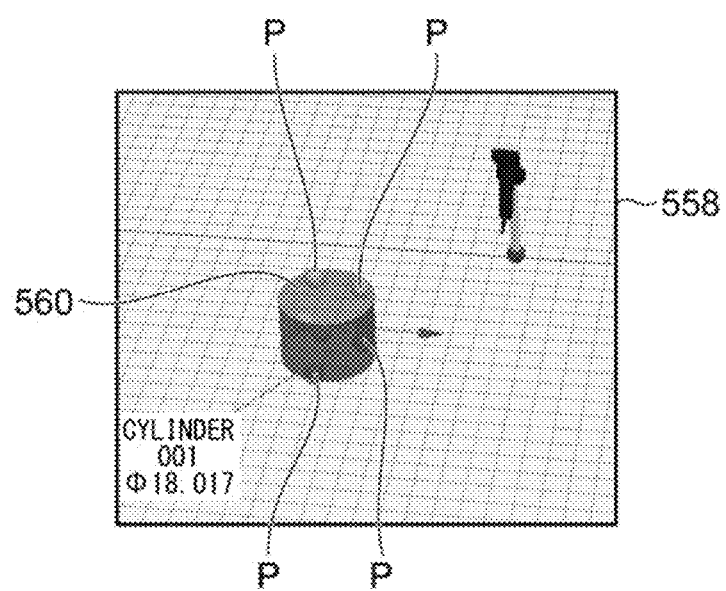
FIG. 50 is a diagram illustrating a display example of a 3D model of the cylinder as a measurement object which can be displayed on the measurement condition setting screen of FIG. 48.
Figure 51:
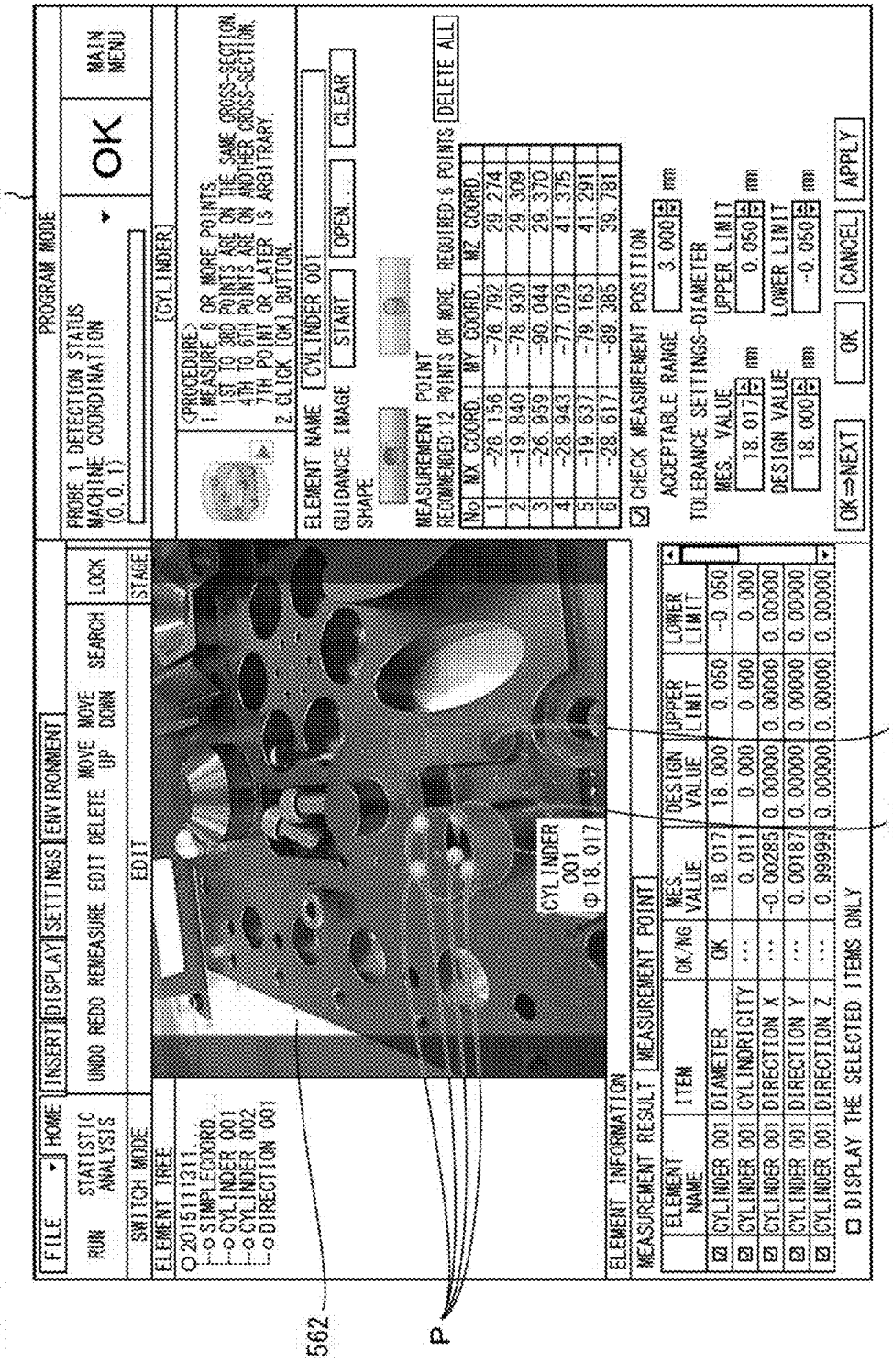
FIG. 51 is a diagram for describing an example in which a guidance image is displayed on the measurement condition setting screen of FIG. 48.

The series of steps (3) to (6) will be described with reference to a flowchart of FIG. 47 and FIGS. 48 to 54. Referring to FIGS. 47 and 48, element creation processing can be started by clicking a target part shape selection field 506, that is, a creation element button of a measurement condition setting screen SC2 which is displayed on the display unit 500 (S1). Since the measurement element is a cylinder, a cylinder button 506e (FIG. 48) is clicked. Accordingly, a cylinder file 550 is opened and displayed on the display unit 500. An imaging start button 552 is prepared in the cylinder file 550 (FIG. 49). Optionally, an image can be captured by the sub imaging unit 210 (FIG. 4) by clicking the imaging start button 552 when needed (S2). An image captured by the sub imaging unit 210 is displayed on the display unit 500 (S3). Further, the image is stored in the storage unit 2 (FIG. 2) together with information of the position and the attitude of the probe 200, that is, measurement position coordinates at the time of capturing the image. The cylinder file 550 preferably includes a procedure guide 557 illustrated in FIG. 49. An operator can understand the procedure of the operation by referring to the procedure guide 557 and recognize the position and the number of recommended measurement points by viewing the measurement condition setting screen SC2.

Figure 46:
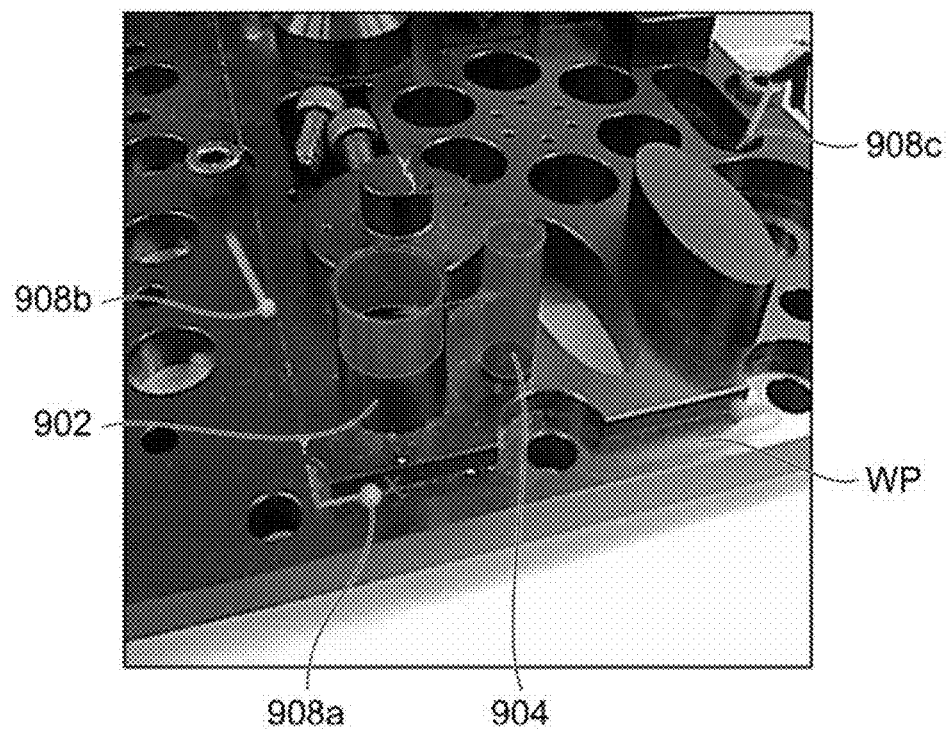
FIG. 46 is a photograph illustrating another example of the guidance image which is displayed on the display unit during an operation of measurement relating to the two cylindrical parts which are included in the workpiece.

In the case of a cylindrical part (geometrical element) that should be measured, that is, the first cylinder 902 (FIG. 46), a shift to step S5 is made, and the measurement start button 556 (FIG. 49) is clicked (S5). The cylinder file 550 includes, as the measurement start button 556, a first button 556a for starting measurement of the inner peripheral face of a hollow cylinder and a second button 556b for starting measurement of the outer peripheral face of a cylinder. When the inner peripheral face of a hollow cylinder is measured, the first button 556a is clicked.

When a measurement button of the main body operation unit 300 (FIG. 1) is depressed, data items of the position and the attitude of the table 400 and the position and the attitude of the probe 200 at that time are captured (S6). It is needless to say that these data items are created on the basis of images of the probe markers 212 and the stage markers 410 captured by the main imaging unit 600 (FIG. 1). The measurement condition setting screen SC2 includes an operation guide display field 558 (FIG. 50) which displays a 3D model of a cylinder. The cylinder, that is, each measurement point is calculated by measuring a plurality of measurement points P while viewing the displayed 3D model 560 (FIG. 50), that is, a geometrical element (S7). Coordinates of the plurality of measurement points P are based on the relative coordinate system.

When, for example, all six or more measurement points P relating to the first cylinder 902 have been set while viewing the 3D model 560, the position, the orientation, and the dimensional of the first cylinder 902 are calculated on the basis of the relative position coordinates of the measurement points P in step S9.

Further, when, for example, all six or more measurement points P relating to the first cylinder 902 have been set, an image may be captured by the sub imaging unit 210 (FIG. 4) at this time.

As needed, a parameter of each element is changed and/or a tolerance is set (S10 of FIG. 47). A captured image captured by the sub imaging unit 210, that is, a guidance image is displayed on a guidance image display field 562 of the measurement condition setting screen SC2 (FIG. 51), and the set measurement points P are displayed in a superimposed manner on the guidance image in the guidance image display field 562 (S11 of FIG. 47).

Figure 52:
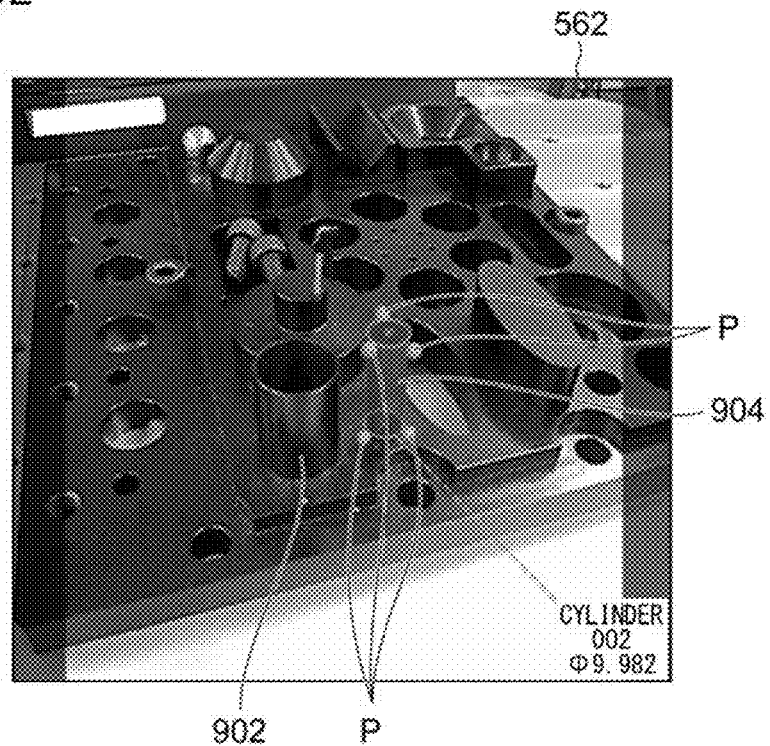
FIG. 52 is a photograph for describing an example of setting of measurement points and a guidance image which is displayed along with the setting.
Figure 53:
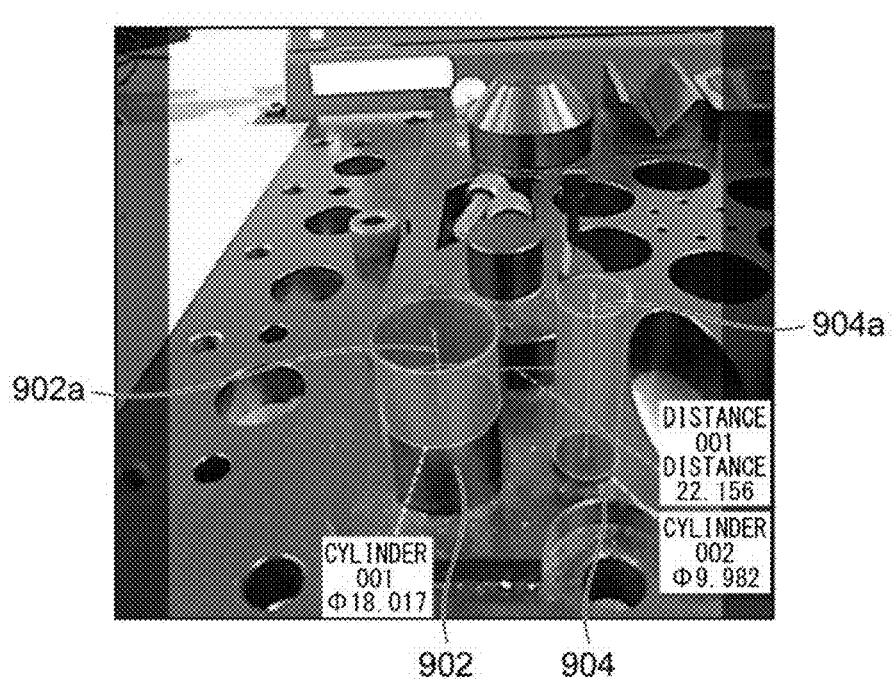
FIG. 53 is a photograph illustrating, in an enlarged manner, a display example of the 3D model of the cylinder as a measurement object which can be displayed on the measurement condition setting screen.

Then, a plurality of measurement points P of the second cylinder 904 (FIG. 45) are set in the same procedure (FIG. 52). When setting of all the measurement points P of the second cylinder 904 has been finished, a distance element between an axis 902a of the first cylinder 902 as the first geometrical element and an axis 904 of the second cylinder 904 as the second geometrical element is created as shown in FIG. 53.

Figure 54:
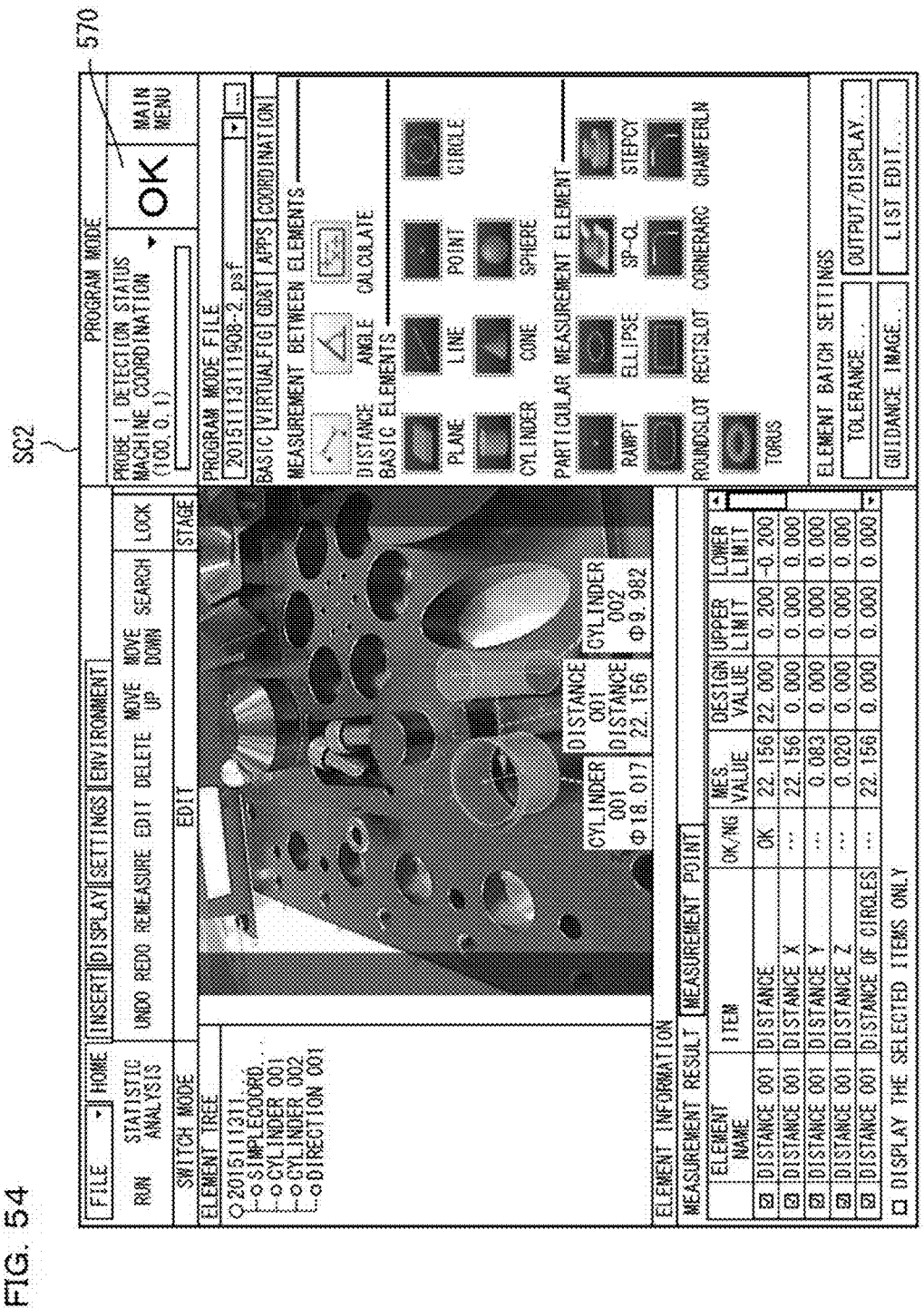
FIG. 54 is a diagram illustrating a display example immediately after all items are set using the measurement condition setting screen.

FIG. 54 illustrates a display state of the measurement condition setting screen SC2 on completion of all the settings. The element creation processing is completed (S13) by clicking an OK button 570 (FIG. 47, S12). Accordingly, the creation of the program mode file is completed.

Next, a procedure of measuring the workpiece WP by a worker using the above program mode file will be described with reference to FIGS. 55 to 59. When a worker executes a measurement operation, the display of the display unit 500 is switched to the measurement display mode.

Figure 56:
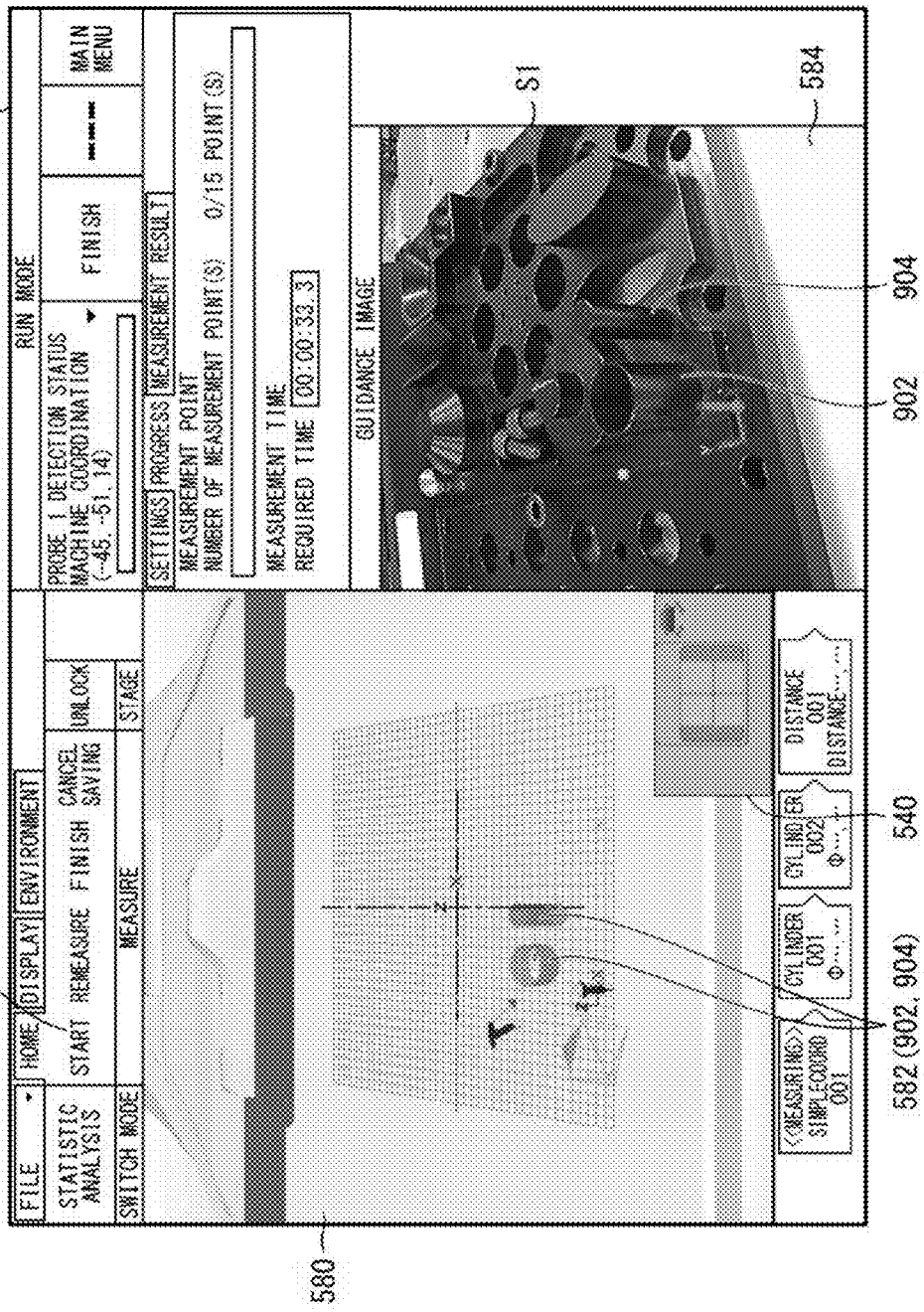
FIG. 56 is a diagram illustrating an example of a guidance image which can be displayed on the display unit during the measurement operation by the worker.

The worker first fixes the workpiece WP to the table 400. Then, when the program mode file is selected in the display of the display unit 500, an actual measurement screen SC4 illustrated in FIG. 56 is displayed. The actual measurement screen SC4 includes a measurement object display field 580 which extracts and displays a measurement object, that is, the cylinders 902, 904 as the two geometrical elements on the basis of an image captured by the main imaging unit (fixed camera) 600 (FIG. 1). A 3D model 582 of computer graphic (CG) is preferably displayed in the measurement object display field 580. The actual measurement screen SC4 further includes a guidance image display field 584 which displays a guidance image captured by the sub imaging unit (probe camera) 210 (FIG. 4) and a table guidance information display field (stage guide field) 540.

Figure 57:
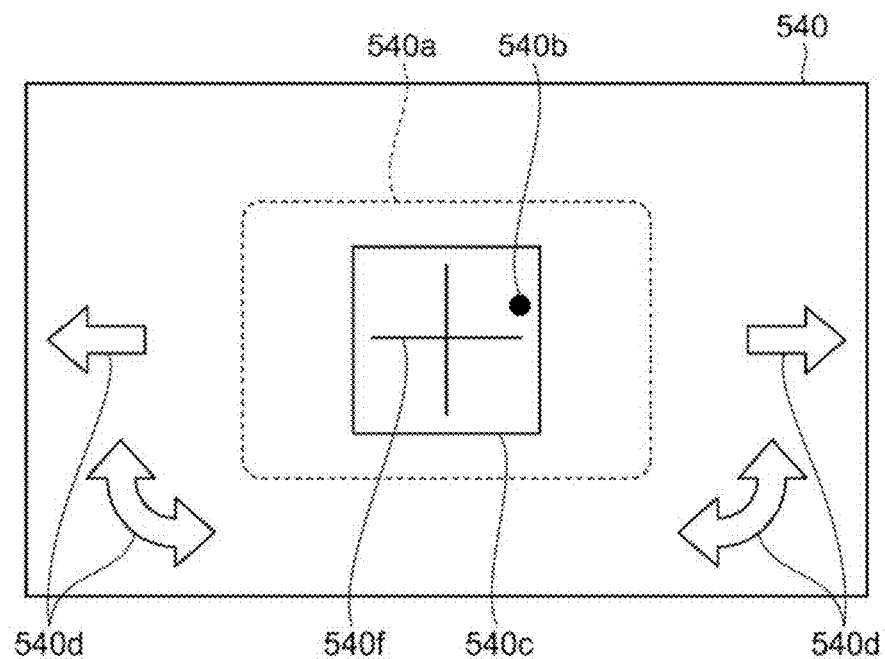
FIG. 57 is a diagram for describing a display example of information about table displacement which is one of guidance information items which can be displayed on the display unit.

As illustrated in FIG. 57 in an enlarged manner, the table guidance information display field 540 displays an original position 540a of the table 400, a measurement point 540b which should be measured next, a recommended fixed position 540c of the workpiece WP (the set position and attitude of the table 400), and an arrow icon 540d which indicates a direction of moving the table 400. Preferably, in addition, a cross display 540f which indicates the current position and attitude of the table 400 is added. Further, display that displays the outer contour of the table 400 in rectangle to indicate a current position 540g of the table 400 may be added to the table guidance information display field 540. For example, the arrow icon 540d indicating the direction is preferably in a highlighted display mode such as flashing and/or displaying in a different color the arrow icon 540d which indicates the right when guiding the movement of the table 400 rightward.

A worker can operate the table 400 while viewing guidance information displayed in the table guidance information display field 540. The guidance information is displayed in real time. Thus, it is possible to position the table 400 at a position and an attitude intended by an administrator (set by an administrator).

Figure 55:
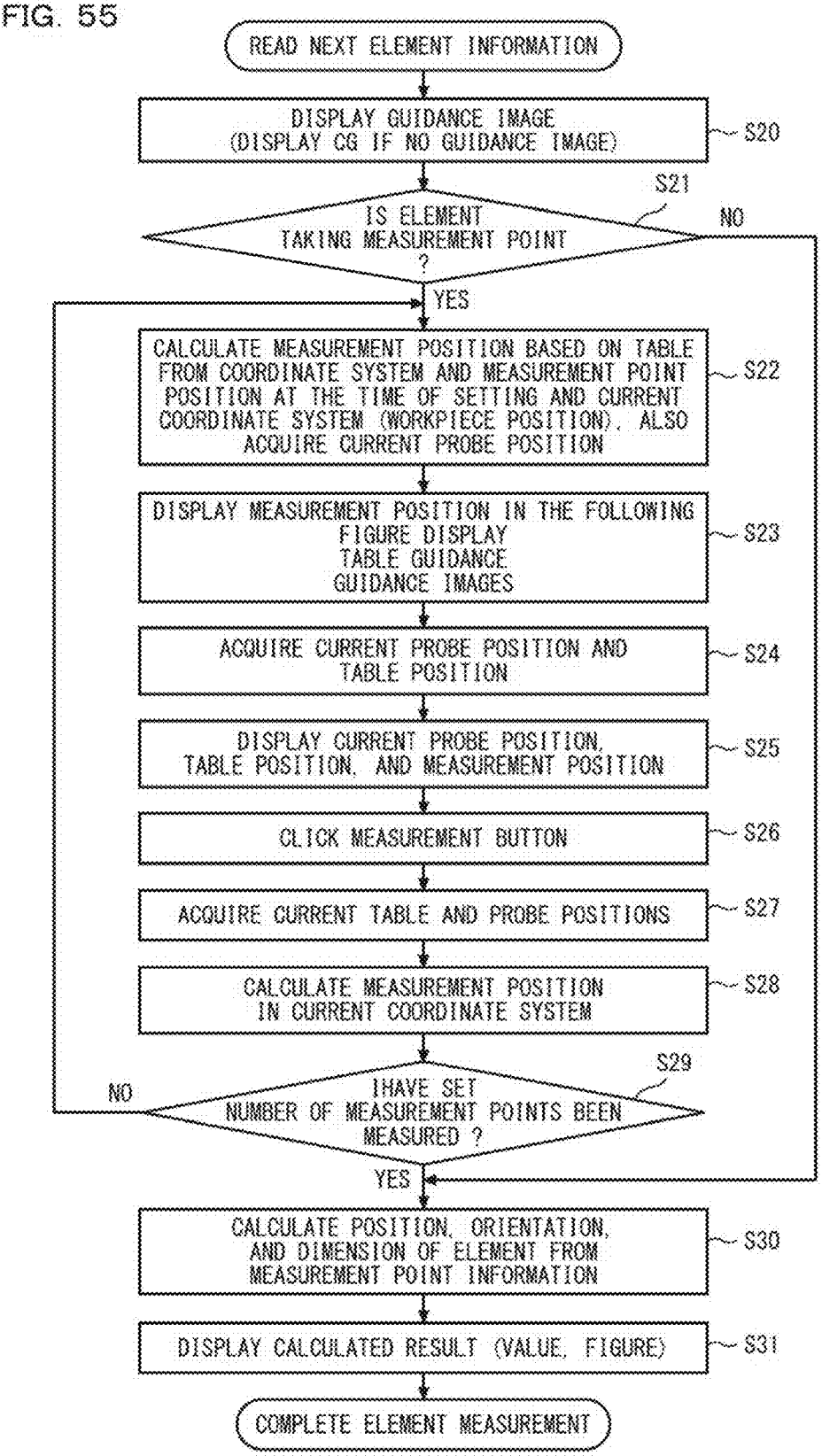
FIG. 55 is a flowchart for describing a procedure of a measurement operation performed by a worker.

Referring to a flowchart of FIG. 55, when the program mode file is selected, a guidance image captured by the sub imaging unit (probe camera) 210 (FIG. 4) is displayed on the actual measurement screen SC4. If there is no guidance image, a computer graphics (CG) is displayed in the guidance image display field 584 (S20).

When there is an element that should be measured in the guidance image, a shift from step S21 to S22 is made, and a set measurement position is calculated from a coordinate system and position coordinates of a measurement point when an administrator performs a setting operation and the current coordinate system, that is, the positions of the table 400 and the workpiece WP. Further, the current position and attitude of the probe 200 are acquired. It is needless to say that the current position of the workpiece WP can be acquired from an image captured by the main imaging unit 600 (FIG. 1). Then, these pieces of information are displayed on the actual measurement screen SC4.

In the next step S24, the position and the attitude of the probe 200 and the position and the attitude of the table 400 are captured, and the current position and attitude of the probe 200 and the current position and attitude of the table 400 are displayed on the actual measurement screen SC4 (S25). Step S24 is continuously updated all the time. Thus, the position and the attitude of the probe 200 and the position and the attitude of the table 400 are displayed in real time on the actual measurement screen SC4.

Figure 58:
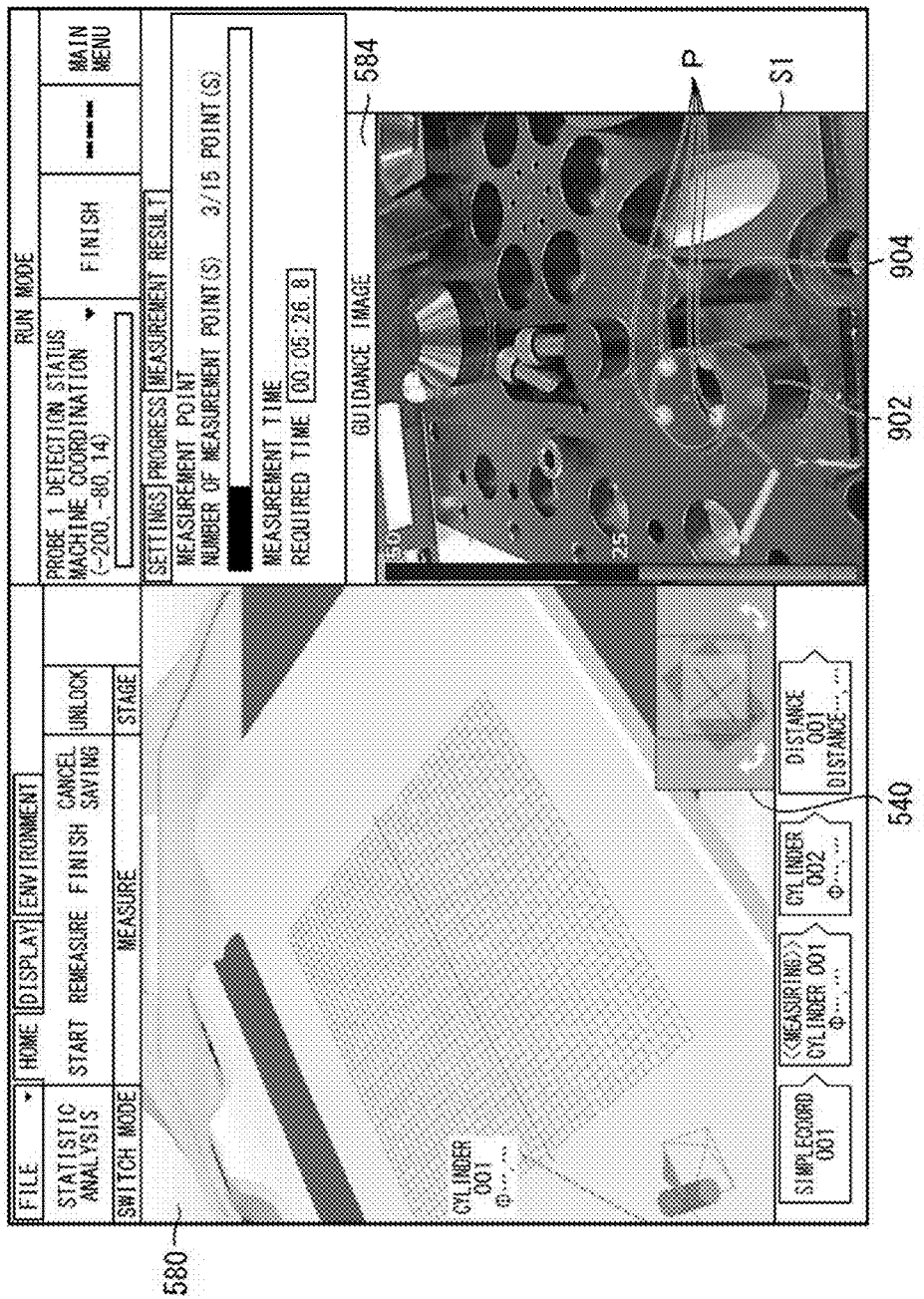
FIG. 58 is a diagram illustrating another example of the guidance image which can be displayed on the display unit during the measurement operation by the operator.
Figure 59:
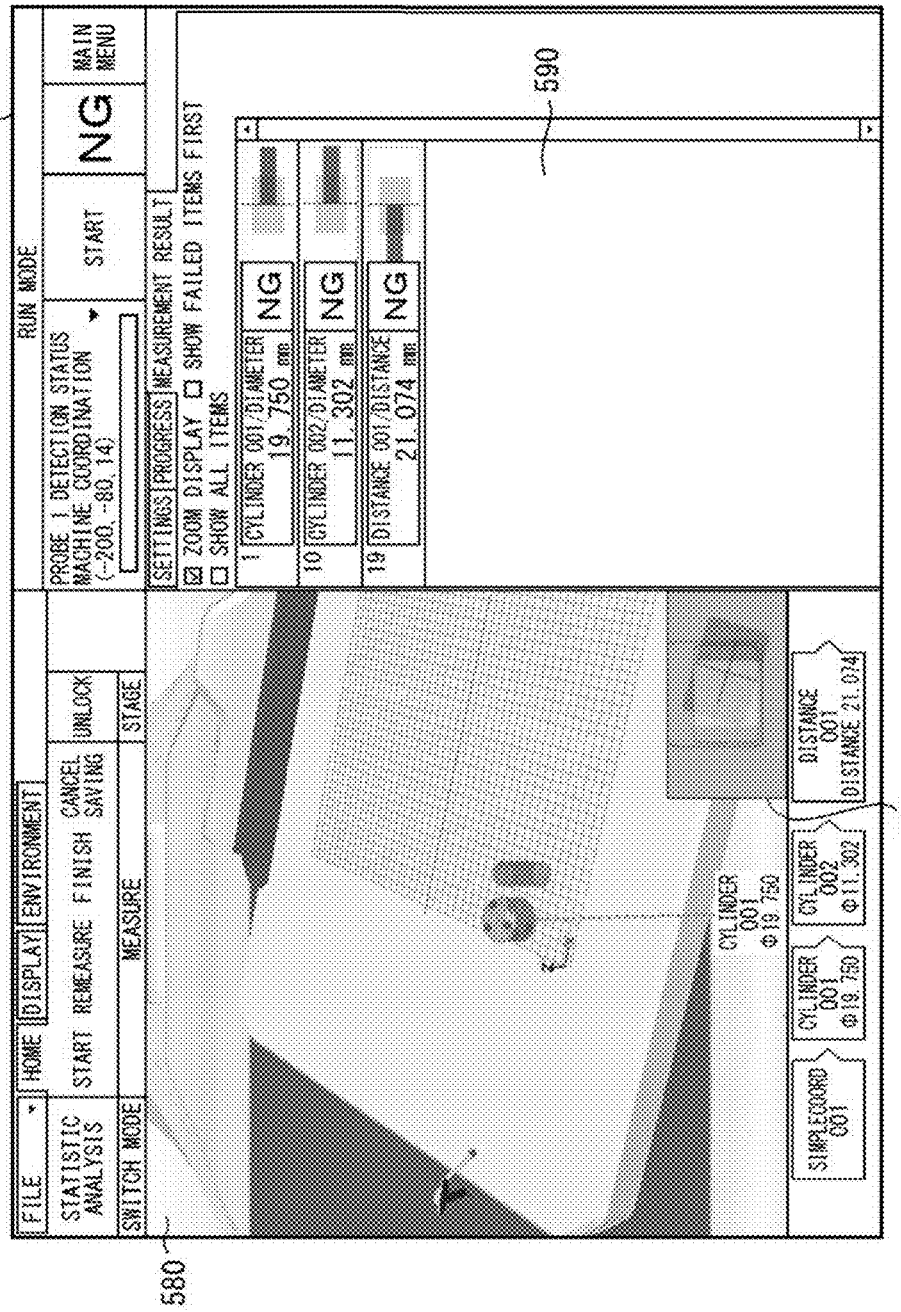
FIG. 59 is a diagram illustrating a display example at the point of completion of a series of operations.

When the worker clicks a measurement start button 586 (FIG. 56) on the actual measurement screen SC4 (S26), measurement points P are displayed on the guidance image in the guidance image display field 584 (FIG. 58). The worker makes access of the probe 200 toward the measurement points P displayed in the guidance image display field 584 while viewing this.

In the next step S27 (FIG. 55), the current position and attitude of the table 400 and the current position and attitude of the probe 200 are captured, and relative coordinates of each measurement position P with which the contactor 208a is brought into contact are calculated in the current coordinate system. When the measurement of each measurement position P of the first and second cylinders 902, 904 as the two geometrical elements is completed, a shift from step S29 to step S30 is made. Then, on the basis of the relative position coordinates of the plurality of measured measurement positions P, and the current position and attitude of the table 400 and the current position and attitude of the probe 200, transformation of the coordinate system is performed if needed, and, for example, the orientation of the first and second cylinders 902, 904 as the two geometrical elements and the distance of the measurement element are calculated on the basis of the relative position coordinates or the absolute position coordinates (S30 of FIG. 55). Then, the result is displayed in a result display field 590 (S31 of FIG. 55, FIG. 59). Thus, the worker can practically complete the same measurement as performed by an administrator by merely making access of the probe 200 with respect to the measurement position P which is displayed on a captured image (guidance image) SI in a superimposed manner and repeatedly performing an operation of bringing the contactor 208a into contact with the designated measurement position P.

In step S31, the measurement result may be output by, for example, a printer. At this time, it is preferred to capture an image at the time of measuring each measurement point P by the sub imaging unit 210 and store the captured image together with positional information of the probe 200 in order to know the attitude of the probe 200 when brought into contact with the workpiece WP at each measurement position P and to know whether the actually measured position is the same as the set measurement position P. When the measurement result is output by the printer, the captured image is preferably printed together with measurement position coordinates of each measurement position P.

A person skilled in the art would immediately recognize that the optical three-dimensional coordinate measuring device CMI of the embodiment has excellent advantages from the above description. In particular, since the movable table 400 is provided, the optical three-dimensional coordinate measuring device CMI can also be applied to a large measurement object, that is a large workpiece WP. Further, the position and the attitude of the probe 200 are detected on the basis of an image of the probe markers 212 captured by the fixed main imaging unit 600. Thus, it is desired in maintaining a constant measurement accuracy that the probe markers 212 at the time of measurement be present within a visual field range that can be appropriately imaged by the main imaging unit 600. In view of this, the table 400 can be displaced from the original position as needed. The table 400 cannot be displaced unless a predetermined force or more is applied by the main resistance mechanism component 710 (FIG. 23). Thus, the table 400 is immediately stopped when a worker or an administrator displaces the table 400 and releases a force at the instant when the table 400 reaches a desired position or attitude. Even when the contactor 208a of the probe 200 is brought into contact with the workpiece WP, the table 400 is not accidentally displaced by the force thereof.

Figure 60:
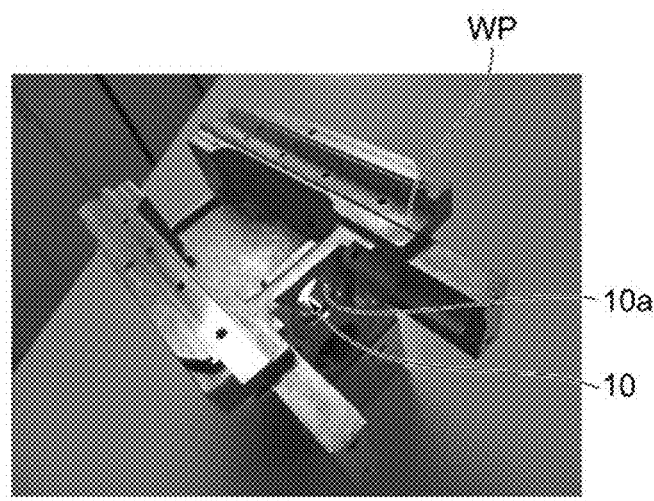
FIG. 60 is a photograph of a workpiece which has a through hole viewed from one end side thereof regarding concentricity measurement in which the measurement accuracy is preferably maintained using the movability of the table.

A measurement object, that is, a workpiece WP that is preferably measured using the movability of the table 400 in order to maintain the measurement accuracy will be described as an example with reference to FIG. 63. An image of FIG. 60 is captured from one end face side of the workpiece WP. The workpiece WP includes a through hole 10 which extends in the longitudinal direction and has a circular cross section. The through hole 10 includes openings 10a which are open on one end face and the other end face of the workpiece WP.

A case in which the concentricity of the openings 10a on one end side and the other end side will be described. The concentricity indicates the degree of displacement of an axis to be a measurement object from a reference axis.

In order to measure the concentricity, it is first necessary to measure a cylindrical shape of each of the openings 10a on one end side and the other end side. In the measurement, as described above, a creation element button, that is, a "cylinder" as a geometrical element is selected in the target part shape selection field 506 (FIG. 48) of the measurement condition setting screen SC2. Then, coordinates of at least six points, preferably twelve points or more are measured, and a cylinder is estimated using the measured coordinates of the points. Then, the diameter, radius, center coordinates, axial direction vector, and cylindricity of the estimated cylinder are calculated.

Figure 61:
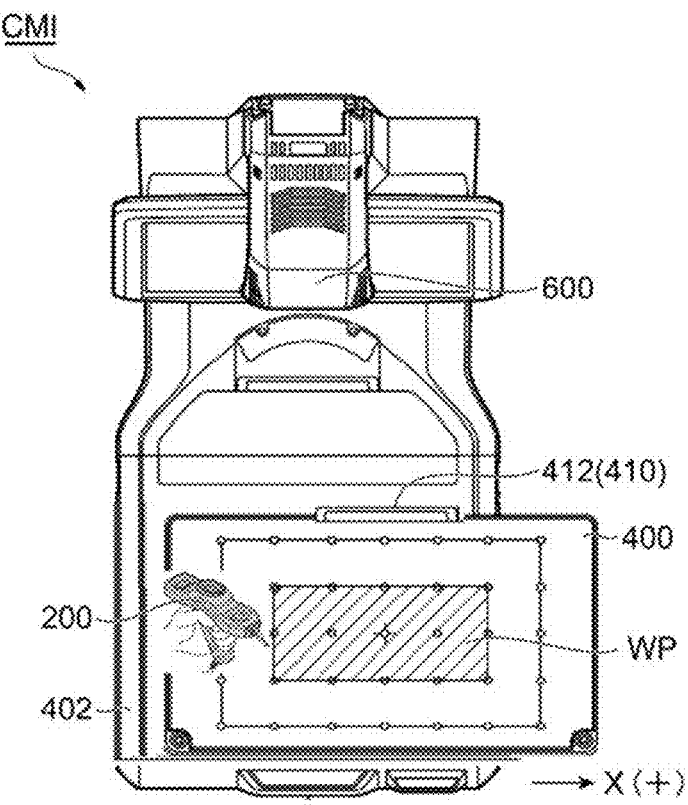
FIG. 61 is a diagram for describing an example in which the table is moved to the plus side of the X axis when an opening on one end side of the workpiece having the through hole is measured.
Figure 62:
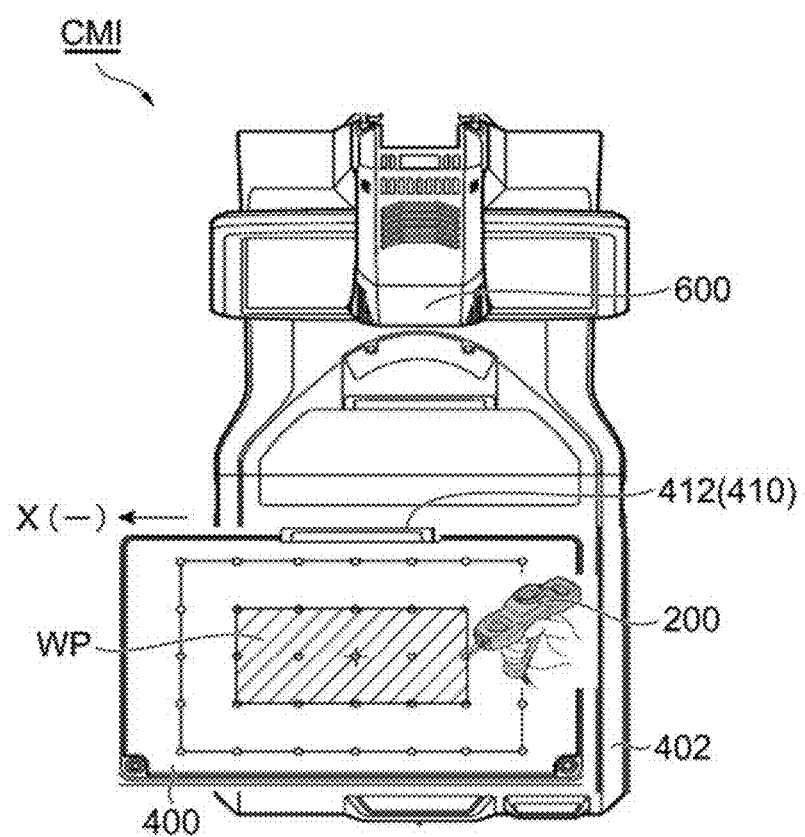
FIG. 62 is a diagram for describing an example in which the table is moved to the minus side of the X axis when an opening on the other end side of the workpiece having the through hole is measured.

In order to measure the opening 10a on one end side, the table 400 may first be moved in the right direction (the plus side in the X-axis direction) (FIG. 61) so that the probe 200 falls within the visual field range of the main imaging unit 600. Then, in order to measure the opening 10a on the other end side, the table 400 may be moved in the left direction (the minus side in the X-axis direction) (FIG. 62) so that the probe 200 falls within the visual field range of the main imaging unit 600. In this manner, it is possible to easily cope with, for example, a large measurement object, that is, a large workpiece WP. As described above, the table 400 can be moved in the X-axis direction by intentionally applying a force (whose X-axis direction component is larger than the predetermined value) to the table 400 by an operator. Then, the table 400 is stopped at the instant when the operation force is weakened.

Figure 63:
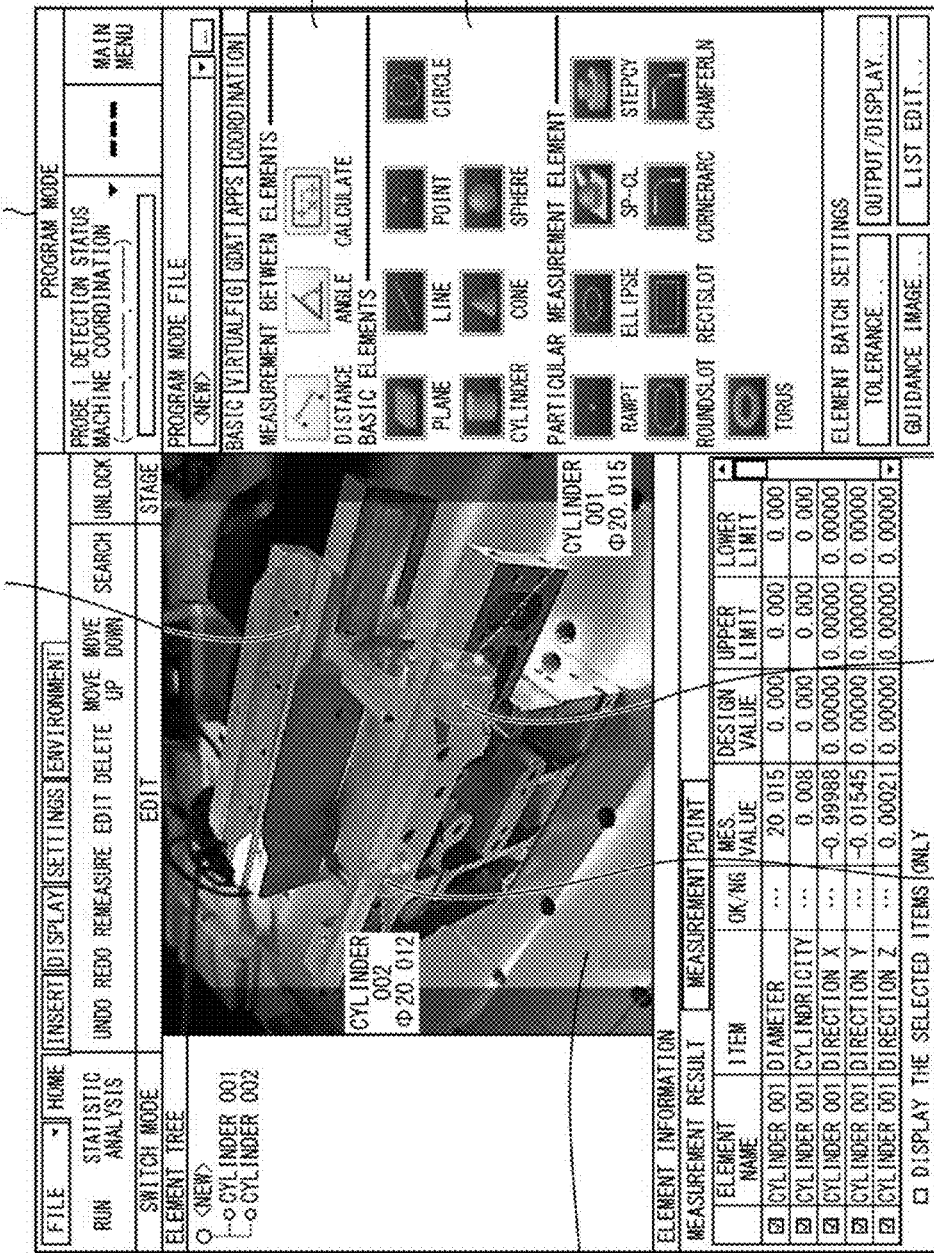
FIG. 63 is a diagram illustrating an example in which cylindrical shapes of the openings on one end side and the other end side of the through hole of the workpiece are displayed in a superimposed manner.

Referring to FIG. 63, after the measurement of the opening 10a on one end side, a first cylindrical shape 12a which is the measured geometrical element on one end side is preferably displayed on the measurement region virtual image VI in a superimposed manner. Then, after the measurement of the opening 10a of the geometrical element on the other end side, the measured second cylindrical shape 12*b* on the other end side is preferably displayed on the measurement region virtual image VI in a superimposed manner. The cylindrical shapes 12*a*, 12*b* on one end side and the other end side are created on the basis of the absolute coordinate system. As a modification, only the first and second cylindrical shapes 12*a*, 12*b* respectively corresponding to the openings 10*a* on one end side and the other end side may be displayed.

Figure 64:
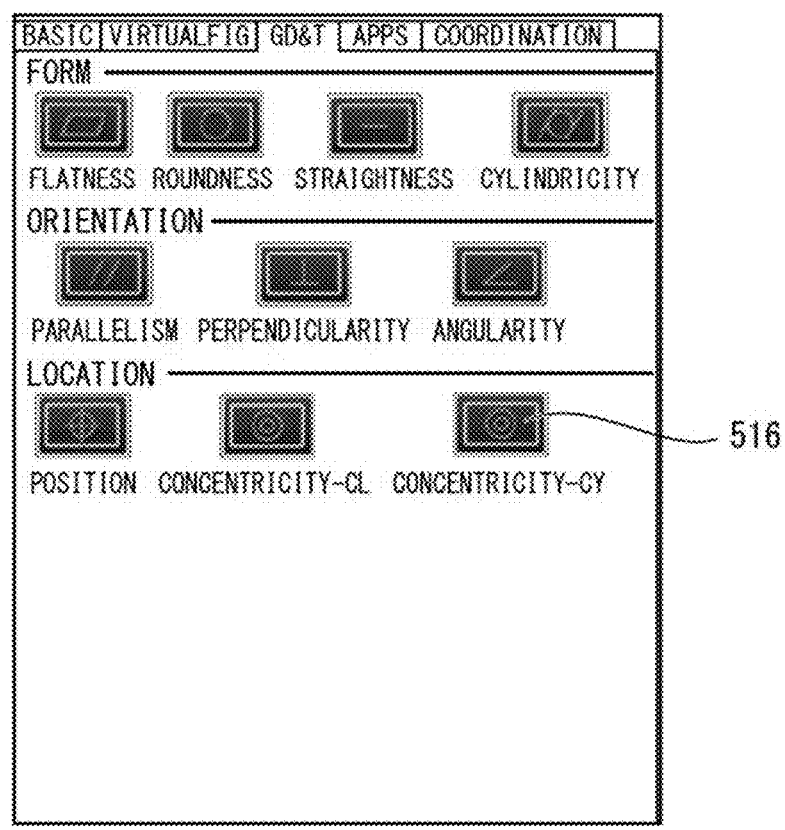
FIG. 64 is a diagram illustrating a part of a measurement condition setting screen in which a concentricity measurement mode can be set in a measurement operation.

Basic measurement tabs are attached to a measurement item selection field 504 and the target part shape selection field 506 of the measurement condition setting screen SC2 illustrated in FIG. 63. When a geometrical tolerance tab is selected from the plurality of tabs, the measurement item selection field 504 and the target part shape selection field 506 are switched to display of FIG. 64. A concentricity measurement mode can be set by clicking a concentricity button 516 included in the display of FIG. 64.

Then, (1) the concentricity of the second cylindrical shape 12*b* as the second geometrical element is measured on the basis of the first cylindrical shape 12*a* as the first geometrical element, and (2) a parameter required for the measurement of concentricity is set, for example, a tolerance upper limit of the concentricity is input and set. Accordingly, the concentricity of the first cylindrical shape 12*a* as the first geometrical element and the second cylindrical shape 12*b* as the second geometrical element can be measured. Of course, it is possible to check whether the diameter of each of the first and second openings 10*a*, 10*b* which can be obtained relating to the concentricity is as designed (within the tolerance range) or check whether the distance between the one end face where the first opening 10*a* is open and the other end face where the second opening 10*b* is open is as designed.

That is, a plurality of check contents (a plurality of inspection contents) are collectively and previously set as inspection setting. For example, tolerances are set with respect to the diameter of each hole, the concentricity between a plurality of holes, and the distance between faces where the holes are formed. Accordingly, OK display can be performed as total determination when all the inspection contents are within the tolerance range, and NG display can be performed as total determination when any of the inspection contents falls out of the tolerance range.

According to the optical three-dimensional coordinate measuring device CMI of the embodiment, it is possible to identify coordinates of a measurement position with which the contactor 208*a* of the probe 200 is brought into contact in the relative coordinate system and measure the dimension and the geometrical characteristic amount by estimation of a point or a geometrical shape. Further, as one of ways of using the optical three-dimensional coordinate measuring device CMI, a measurement object, that is, a workpiece WP can be inspected by comparing a previously set tolerance with the measured dimension or geometrical characteristic amount.

Figure 65:
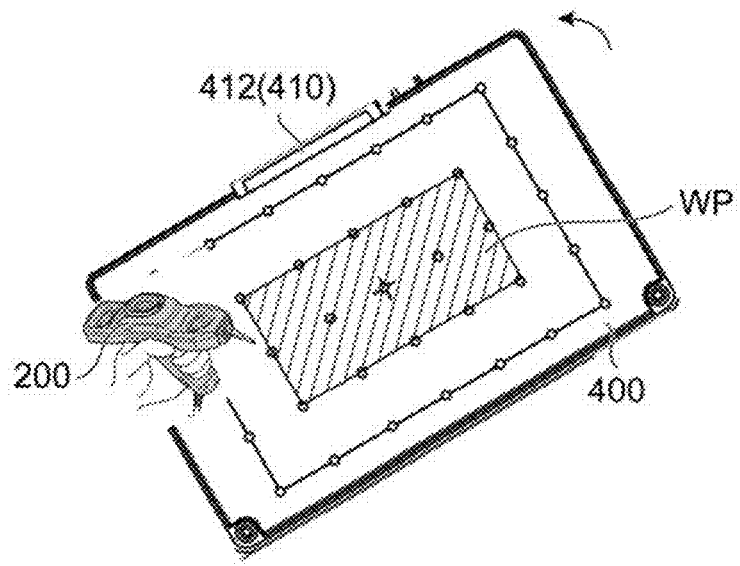
FIG. 65 is a diagram for describing an example in which the table is rotated in the counterclockwise direction in a measurement operation of a workpiece.
Figure 66:
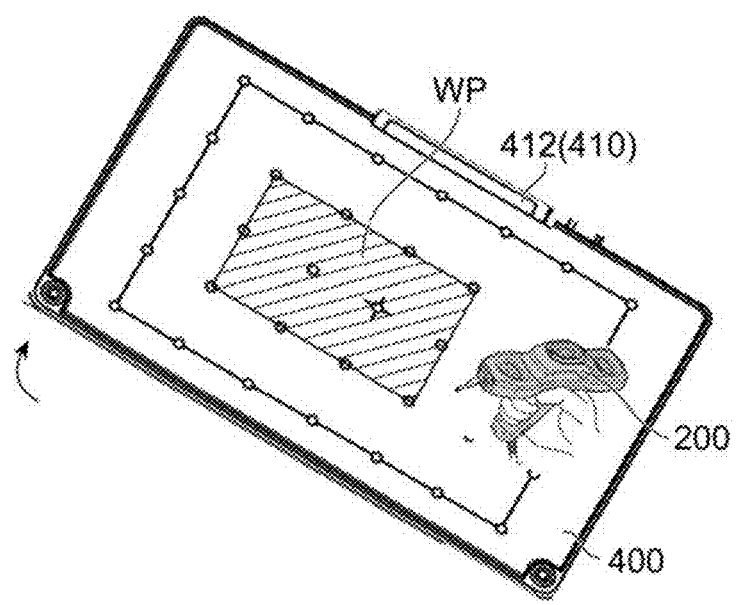
FIG. 66 is a diagram for describing an example in which the table is rotated in the clockwise direction in a measurement operation of a workpiece.

Further, the movable table 400 included in the optical three-dimensional coordinate measuring device CMI of the embodiment is rotatable. Thus, the probe markers 212 can be made to face the fixed main imaging unit 600 by rotating the table 400. FIG. 65 illustrates an example in which the table 400 is rotated in the counterclockwise direction. FIG. 66 illustrates an example in which the table 400 is rotated in the clockwise direction. As described above, a single operation by an operator can make both an X-axis direction component and a rotation direction component of the operation force higher than the predetermined value. That is, it is also possible to rotate the table 400 while moving the table 400 in the X-axis direction according to the way of applying an operation force to the table 400 by an operator.

The embodiment of the present invention have been described above. The optical three-dimensional coordinate measuring device CMI of the embodiment is also applicable, for example, to a long workpiece WP. That is, when the distance between one end face and the other end face of the long workpiece WP is measured, the markers 212 of the probe 200 which measures the one end face or the other end face of the workpiece WP can be brought into the visual field of the main imaging unit 600 by moving the table 400 in the X-axis direction. That is, the relatively compact optical three-dimensional coordinate measuring device CMI is capable of measuring a relatively large workpiece WP by moving the displaceable table 400.

What is claimed is:

1. An optical three-dimensional coordinate measuring device comprising:
   a stage base;
   a table displacably supported to the stage base for placing a measurement object;
   a stage marker disposed on the table;
   a probe configured to designate a measurement position of a measurement object on the table;
   a probe marker disposed on the probe;
   an imaging device fixed to the stage base, for generating a first captured image including the probe marker and a second captured image including the stage marker;
   a controller operably coupled to the imaging device, configured to identify a position and an attitude of the probe with respect to the imaging device on the basis of the probe marker included in the first captured image generated by the imaging device, to identify a position and an attitude of the table with respect to the imaging device on the basis of the stage marker included in the second captured image generated by the imaging device, and to obtain a relative position coordinate of a measurement position designated by the probe with respect to the table on the basis of the position and the attitude of the probe and the position and the attitude of the table with respect to the imaging device;
   a geometrical element determination unit that determines, on the basis of a plurality of relative positions obtained by the controller and a previously set geometrical element, a relative position of the geometrical element; and
   a dimension measurement unit that measures a desired dimension on the basis of a plurality of relative positions of geometrical elements determined by the geometrical element determination unit.

2. The optical three-dimensional coordinate measuring device according to claim 1, wherein a visual field of the imaging device is directed obliquely downward facing the table.

3. The optical three-dimensional coordinate measuring device according to claim 1, wherein the table includes a first side edge which is a closer side to the imaging device, the stage marker is disposed on the first side edge of the table.

4. The optical three-dimensional coordinate measuring device according to claim 1, further comprising a lock mechanism that fixes the table with respect to the stage base at an original position.

5. The optical three-dimensional coordinate measuring device according to claim 1, wherein
the probe marker and the stage marker are self-luminous markers, and
the probe marker and the stage marker are turned on at different timings.

6. The optical three-dimensional coordinate measuring device according to claim 1, wherein the first captured image and the second captured image are the same captured image, and the probe marker and the stage marker are included in the same captured image.

7. The optical three-dimensional coordinate measuring device according to claim 1, wherein the table is translatable in one direction.

8. The optical three-dimensional coordinate measuring device according to claim 1, wherein the table is axially rotatable.

9. The optical three-dimensional coordinate measuring device according to claim 1, further comprising a displacement resistance mechanism that is interposed between the stage base and the table and allows no displacement of the table when an external force acts on the table and a component of the external force in a displaceable direction of the table is a predetermined value or less.

10. A measurement method of an optical three-dimensional coordinate measuring device, the optical three-dimensional coordinate measuring device comprising:
a stage base,
a table displacably supported to the stage base for placing a measurement object,
a stage marker disposed on the table,
a probe configured to designate a measurement position of a measurement object on the table,
a probe marker disposed on the probe, and
an imaging device fixed to the stage base, for generating a first captured image including the probe marker and a second captured image including the stage marker,
the measurement method comprising:
a first calculation step of obtaining a first relative position coordinate of a measurement position designated by the probe with respect to the table when the table is at a first position and attitude;
a second calculation step of obtaining a second relative position coordinate of a measurement position designated by the probe with respect to the table when the table is at a second position and attitude displaced from the first position and attitude;
a measurement step of measuring, on the basis of the first relative position coordinate, a previously set first geometrical element defined on the basis of the first relative position coordinate, the second relative position coordinate, and a previously set second geometrical element defined on the basis of the second relative position coordinate, relative positions of the first geometrical element and the second geometrical element; and
measuring a desired dimension on the basis of the relative positions of the first geometrical element and the second geometrical element.

* * * * *